US011685304B2

United States Patent
Osorio et al.

(10) Patent No.: US 11,685,304 B2
(45) Date of Patent: Jun. 27, 2023

(54) SLEEPER BUNK SYSTEM

(71) Applicant: Consolidated Metco, Inc., Vancouver, WA (US)

(72) Inventors: Julian Osorio, Vancouver, WA (US); Damian Lucaciu, Vancouver, WA (US); Stephen Green, Vancouver, WA (US); Terence H. Boulton, Portland, OR (US)

(73) Assignee: Consolidated Metco, Inc., Vancouver, WA (US)

( * ) Notice: Subject to any disclaimer, the term of this patent is extended or adjusted under 35 U.S.C. 154(b) by 162 days.

(21) Appl. No.: 16/911,505

(22) Filed: Jun. 25, 2020

(65) Prior Publication Data

US 2020/0406810 A1 Dec. 31, 2020

Related U.S. Application Data

(60) Provisional application No. 62/894,551, filed on Aug. 30, 2019, provisional application No. 62/866,608, filed on Jun. 25, 2019.

(51) Int. Cl.
*B60P 3/39* (2006.01)
*B60N 3/00* (2006.01)

(52) U.S. Cl.
CPC ............... *B60P 3/39* (2013.01); *B60N 3/008* (2013.01)

(58) Field of Classification Search
CPC .............. B60N 3/008; B60P 3/38; B60P 3/39
See application file for complete search history.

(56) References Cited

U.S. PATENT DOCUMENTS

| | | | |
|---|---|---|---|
| 1,241,705 | A | 10/1917 | Brandt |
| 3,898,704 | A | 8/1975 | Gallaher |
| 4,084,276 | A | 4/1978 | Trexler, Jr. |
| 4,473,250 | A | 9/1984 | Truex |
| 5,432,963 | A | 7/1995 | Coral |
| 6,470,517 | B1 | 10/2002 | Kang |
| 6,574,807 | B1 | 6/2003 | Gonzalez |

(Continued)

FOREIGN PATENT DOCUMENTS

| | | | |
|---|---|---|---|
| DE | 3639086 A1 | * 5/1988 | |
| DE | 10144353 A1 | * 3/2003 | ............... B60P 3/39 |

(Continued)

OTHER PUBLICATIONS

Invitation to Pay Additional Fees from corresponding PCT Application No. PCT/US2020/039511, dated Aug. 26, 2020; 2 pages.

(Continued)

*Primary Examiner* — David R Hare
*Assistant Examiner* — Alexis Felix Lopez
(74) *Attorney, Agent, or Firm* — Fitch, Even, Tabin & Flannery LLP

(57) ABSTRACT

In one aspect, a sleeper bunk is provided that includes a support for a mattress. The support includes an assembly of support portions each having at least one surface arranged to support an underside of the mattress. The sleeper bunk includes at least one mount connected to the support and configured to facilitate movement of the support and the mattress thereon between a raised orientation and a lowered orientation. The support portions have overlapping portions configured to distribute a load from the mattress between the support portions.

38 Claims, 67 Drawing Sheets

(56) References Cited

U.S. PATENT DOCUMENTS

| | | |
|---|---|---|
| 6,698,040 B1 | 3/2004 | Acevedo |
| 6,859,966 B2 | 3/2005 | Helmsderfer |
| 6,911,407 B2 | 6/2005 | Sherrod |
| 7,051,384 B1 * | 5/2006 | Guillot .................. A47C 21/08 |
| | | 5/430 |
| 7,104,593 B2 | 9/2006 | Hungerford |
| 7,543,340 B2 | 6/2009 | Kenny |
| 8,015,635 B1 | 9/2011 | Miga |
| 2008/0052824 A1 | 3/2008 | Stoltzfus |
| 2009/0134648 A1 | 5/2009 | Maximilien |
| 2010/0325810 A1 | 12/2010 | Dahlin |
| 2019/0217752 A1 * | 7/2019 | Johnson .................. B60P 3/39 |

FOREIGN PATENT DOCUMENTS

| | | |
|---|---|---|
| GB | 2324266 A | 12/2001 |
| GB | 2518886 A | 4/2015 |
| WO | WO-9015555 A1 * | 12/1990 |

OTHER PUBLICATIONS

International Search Report and Written Opinion from corresponding PCT Application No. PCT/US2020/039511 dated Dec. 8, 2020; 12 pages.

* cited by examiner

SLEEPER BUNK SYSTEM

CROSS-REFERENCE TO RELATED APPLICATIONS

This application claims the benefit of U.S. Provisional Application No. 62/866,608, filed Jun. 25, 2019, and U.S. Provisional Application No. 62/894,551, filed Aug. 30, 2019, which are all hereby incorporated by reference herein in their entireties.

FIELD

This disclosure relates to sleeper bunks for vehicles.

BACKGROUND

Vehicles, such as commercial vehicles and recreational vehicles, have sleeper areas that include one or more sleeper bunks. The bunks may move between a stored position that provides more area within the vehicle to move about and an operable position that exposes a bed held in the bunk for use.

DETAILED DESCRIPTION

Figure 1:
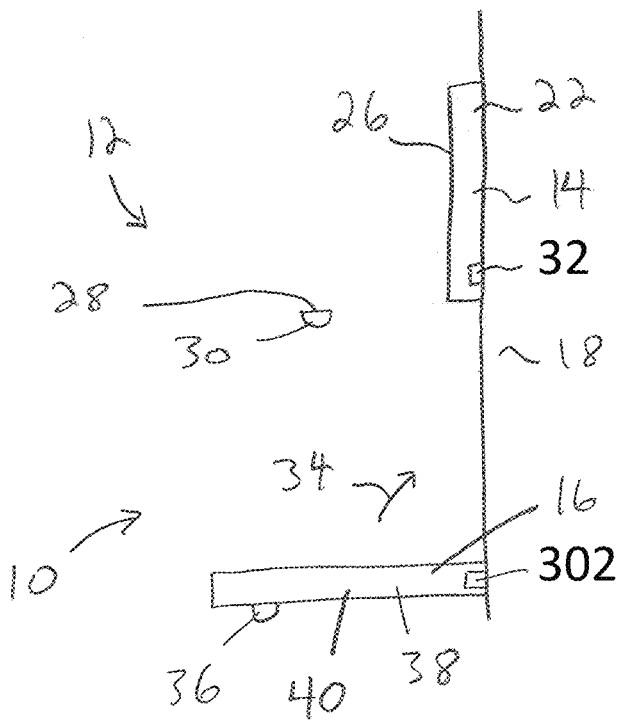
FIG. 1 is a schematic view of a sleeper system including an upper sleeper bunk in a stored, vertical position and a lower bunk in an open, horizontal position.
Figure 2:
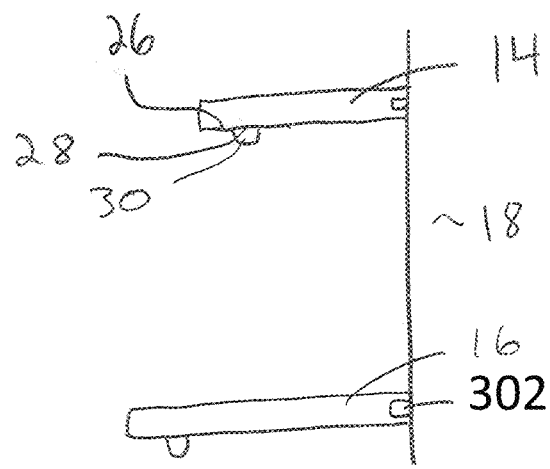
FIG. 2 is a schematic view similar to FIG. 1 showing the upper bunk pivoted downward to an open, horizontal position.

With reference to FIGS. 1 and 2, a sleeper system 10 is provided in a sleeping area 12 of a vehicle, such as a truck. The sleeper system 10 includes an upper sleeper bunk 14 and a lower sleeper bunk 16. The upper and lower sleeper bunks 14, 16 are mounted to a structure of the vehicle, such as a wall 18. The upper sleeper bunk 14 includes one or more mounts 32 that permit the upper sleeper bunk 14 to pivot from a closed or stored, vertical position of FIG. 1 to an open or operable horizontal position as shown in FIG. 2. The mounts 32 may permit different of movement in other embodiments, such as a linear movement. The upper sleeper bunk 14 includes end caps 22, 24 (see FIG. 3) at opposite longitudinal ends of the upper sleeper bunk 14 that have one or more lower surfaces 26 that are configured to contact and be supported by a surface 28 of a support 30 of the vehicle. The support 30 and mounts 32 support the weight of a user when the user is in the upper sleeper bunk 14.

The lower sleeper bunk 16 includes one or more mounts 302 that connect the lower sleeper bunk 16 to the wall 18. In one approach, the one or more mounts 302 permit the lower sleeper bunk 16 to pivot in direction 34 from an operable, horizontal position as shown in FIGS. 1 and 2 to a stored, vertical position. This pivoting of the lower sleeper bunk 16 in direction 34 may expose, for example, a table of a kitchenette that was covered by the lower sleeper bunk 16 when the lower sleeper bunk 16 was in the operable position. Further, the sleeper system 10 may include a support 36 that supports a lower surface 38 of end caps 40, 42 (see FIG. 21) of the lower sleeper bunk 16.

Figure 3:
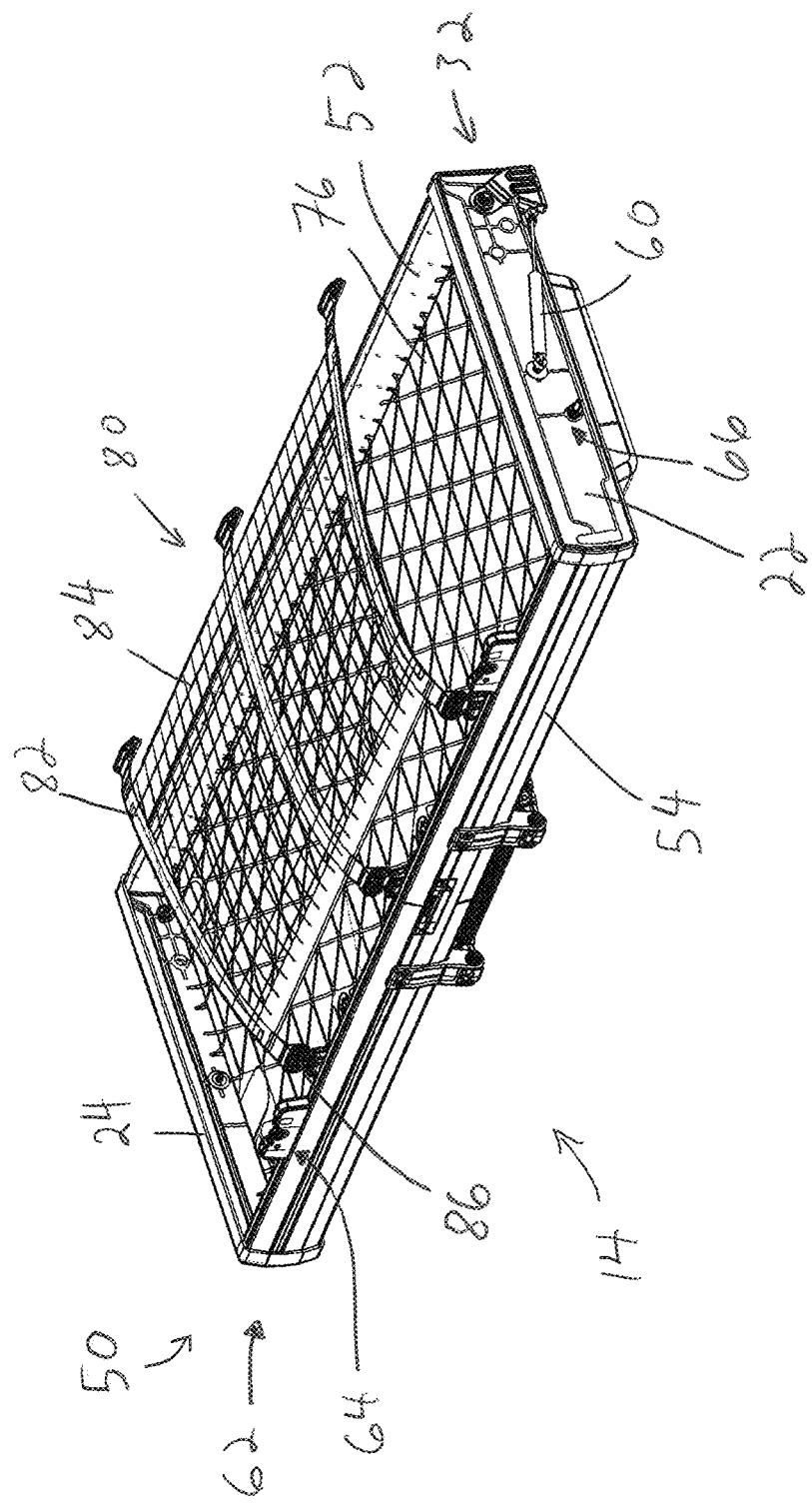
FIG. 3 is a perspective view of the upper sleeper bunk of FIG. 1 showing a frame of the upper sleeper bunk extending about a recess for receiving a mattress.

Regarding FIG. 3, the upper sleeper bunk 14 includes a frame 50 extending about a recess 52 sized to receive a mattress. The frame 50 includes a longitudinal frame member, such as a rail 54, and transverse frame members, such as the end caps 22, 24. The rail 54 may be elongated and have substantially the same cross-section taken perpendicular to the length of the rail 54 along the entirety of the rail 54. The rail 54 has a cross-section and is made of a material configured to provide rigidity to the upper sleeper bunk 14. The rail 54 may operate as the structural backbone for the upper sleeper bunk 14 and provides strength for the substrate or support, such as lattice support 70. In one embodiment, the lattice support 70 is rigidly mounted to the mounts 32 and transfers loading from the mattress to the mounts 302. In one approach, end caps 22, 24 are a plastic component, such as counter pressure structural foam, and the rail 54 is an extruded metal component such as aluminum. The rail 54 may also be configured to contribute to the overall visual appearance of the upper sleeper bunk 14, such as by having a brushed metal finish. The rail 54 provides flexibility in manufacturing the upper sleeper bunk 14 for a given vehicle because the rail 54 is simply extruded to the length required for the vehicle. The manufacturing flexibility provided by the rail 54 offers an improvement over some prior sleeper bunks that utilize a molded shell to support a mattress. In order to provide these prior molded shells for a variety of vehicles, a corresponding number of molds would have to be produced which complicates manufacture.

The mounts 32 of the upper sleeper bunk 14 include a strut or lift support 60 that assists a user in pivoting the upper sleeper bunk 14 between operable and stored positions and a latch system 62 for releasably securing the upper sleeper bunk 14 in the stored position. The latch system 62 may include one or more front latch mechanisms 64 and/or one or more side latch mechanisms 66 as discussed in greater detail below.

Figure 5:
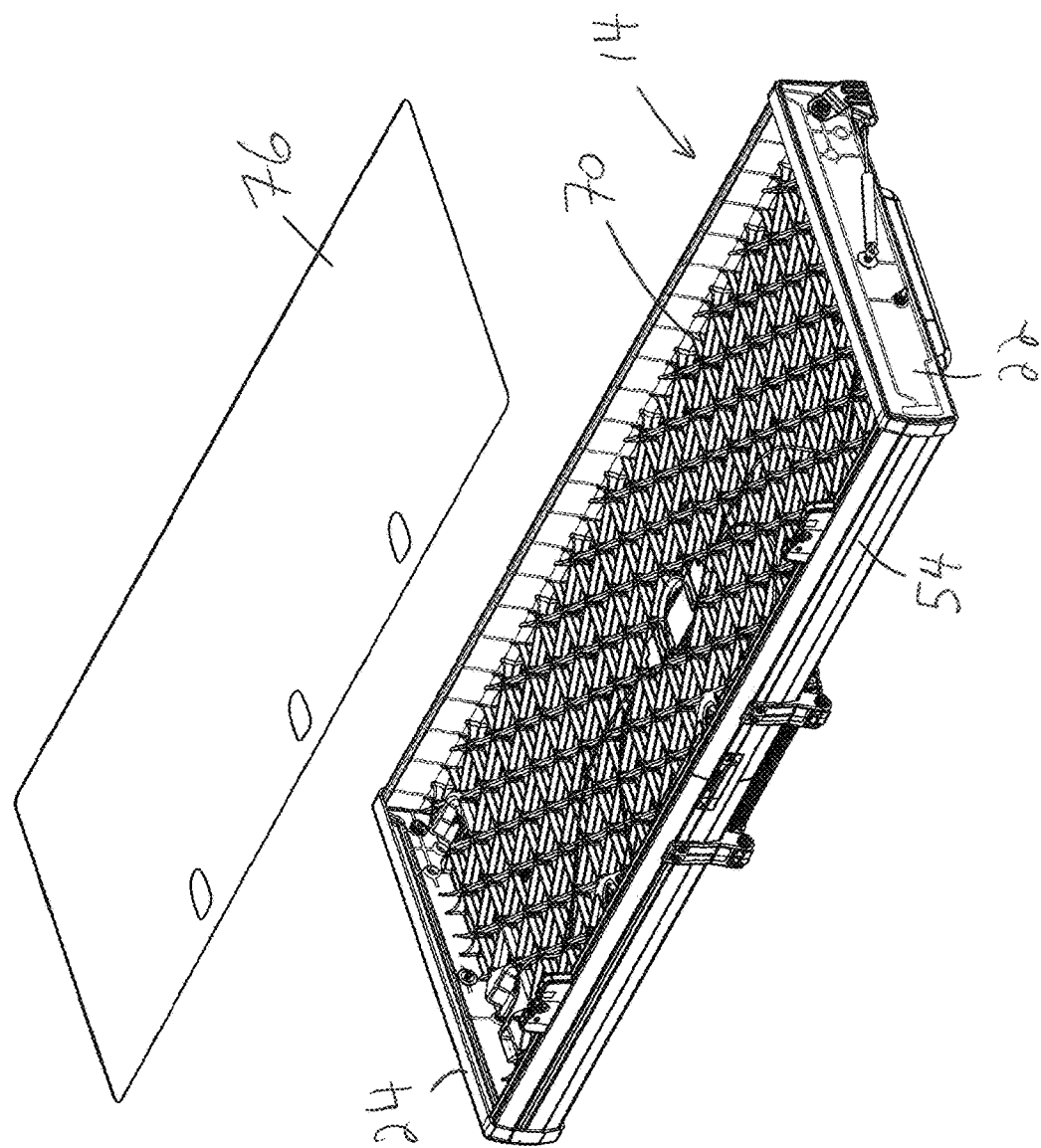
FIG. 5 is an exploded view of a portion of the upper sleeper bunk of FIG. 3 showing a mead board of the upper sleeper bunk removed to show a lattice support of the upper sleeper bunk that is supported by the frame.
Figure 6:
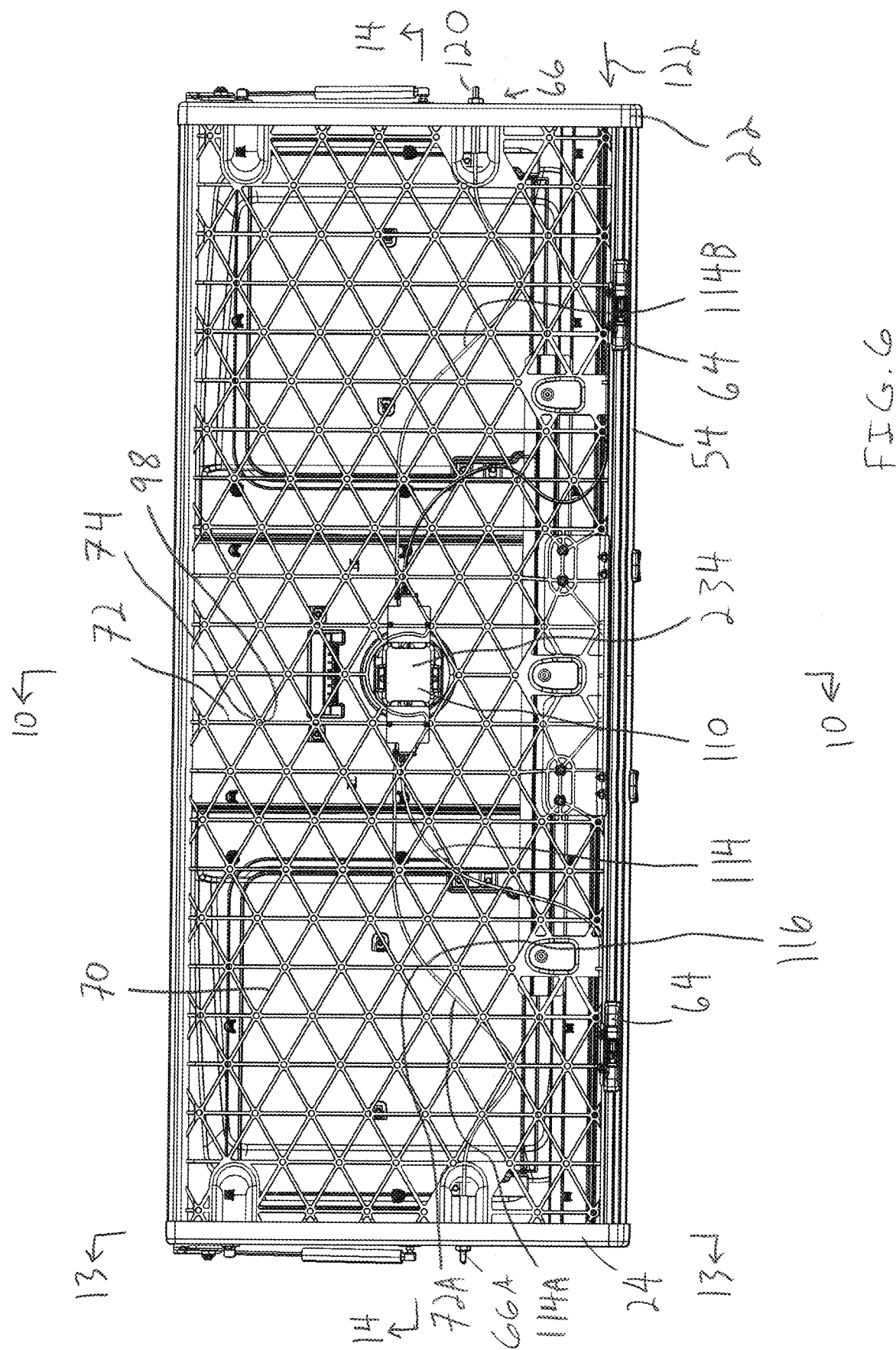
FIG. 6 is a top plan view of the upper sleeper bunk of FIG. 5 showing lattice members of the lattice support forming a pattern of connected triangles.

Regarding FIGS. 3 and 5, the upper sleeper bunk 14 includes the lattice support 70 which is supported by the end caps 22, 24 and the rail 54. The lattice support 70 transfers the load from the weight of the user on the mattress to the end caps 22, 24 and the rail 54. The lattice support 70 includes a plurality of support members, such as lattice members 72, connected by connections such as vertices 74 as shown in FIG. 6. The lattice members 72 form a contiguous pattern of lattice members 72 configured to support a mattress support, such as a mead board 76. The mead board 76 may be, for example, a wood sheet or a composite plastic material as some examples. The mead board 76 provides a flat upper surface for supporting a mattress received in the recess 52.

The contiguous pattern of the lattice members 72 also improves manufacturability of the upper sleeper bunk 14 for a variety of vehicles because the pattern of lattice members 72 may be repeated or truncated as needed to meet the size requirements for a given vehicle. For example, a lattice support 70 for a longer upper sleeper bunk 14 may have more lateral rows of triangles of lattice members 72 than for a shorter upper sleeper bunk 14. Further, the rail 54 may simply be extruded to a desired length to match the selected length of the lattice support 70. In this manner, the upper sleeper bunk 14 may be readily designed and manufactured for a variety of sizes of a vehicle. The lattice members 72 may have uniform or different sizes, and the contiguous pattern may include a plurality of shapes formed by the lattice members 72.

Regarding FIG. 3, the upper sleeper bunk 14 includes a safety restraint 80 having one or more straps 82 and a netting 84 that extend across the mattress received in the recess 52 to hold the mattress in the recess 52 when the upper sleeper bunk 14 is in the stored position. The safety restraint 80 may include, for example, one or more connections 86 for connecting to the rail 84 and a wall 18 of the vehicle.

Figure 4:
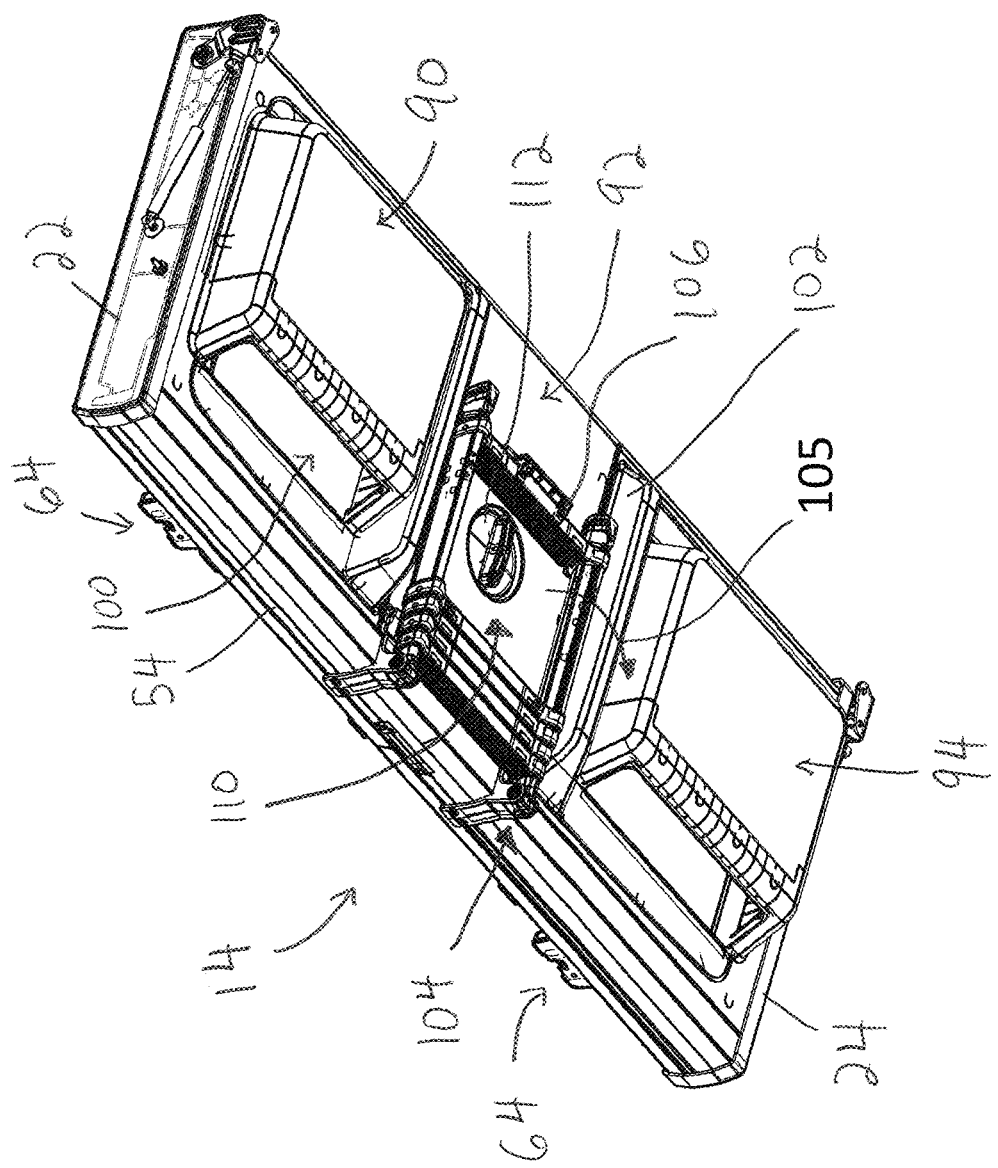
FIG. 4 is a bottom perspective view of the upper sleeper bunk of FIG. 3 showing exterior panels of the upper sleeper bunk including storage compartments.

Regarding FIG. 4, the upper sleeper bunk 14 includes one or more exterior panels 90, 92, 94 that are connected to an underside 96 (see FIG. 7) of the lattice support 70, the rail 54, and/or the end caps 22, 24. Regarding FIG. 6, the vertices 74 of the lattice support 70 include through openings 98 and annular walls 99 extending about the through openings 98. The exterior panels 90, 92, 94 may be connected to the lattice support 70 using a number of approaches. For example, the lattice support 70 may have one or more filled-in triangular areas (rather than triangular openings) between the lattice members 72 with female features formed in the filled-in triangular areas. The exterior panels 90, 92, 94 may have molded projections with clips connected thereto that engage the female features of the filled-in triangular areas of the lattice support 70. Alternatively or additionally, the lattice support 70 may be provided with filled-in triangular areas each having a hole that receives a screw. The shank of the screw engages a metal U-clip supported on a plastic projection of the exterior panel 90, 92, 94.

The upper sleeper bunk 14 may be tailored to a particular vehicle in that the rail 54, lattice support 70, and panels 90, 92, 94 may be selected for a particular application and assembled. Further, the end caps 22, 24 may be the same for varying lengths of the rail 54, lattice support 70, and different types of panels 90, 92, 94 which simplifies assembly. For example, the exterior panels 90, 92 include compartments 100 (see FIG. 4) for storing items and the exterior panel 92 includes guide protrusions 102 for directing movement of a ladder 104 mounted to the rail 54. The ladder 104 has a stored configuration wherein the ladder 104 is generally parallel to the exterior panel 92 and may pivot in a direction 105 to an extended position transverse to the exterior panel 92 that positions a step 106 of the ladder 104 below the upper sleeper bunk 14. By contrast and with reference to FIG. 20, in another embodiment, an upper sleeper bunk 110 is provided that includes exterior panels 111, 113, 115. The exterior panels 111, 115 do not include compartments 100 which may be desired in some applications. By having the exterior panels 90, 92, 94 or 111, 113, 115 connect to the underside of the respective lattice support, the exterior panels 90, 92, 94 or 11, 113, 115 may be selected for a particular application. This further improves the ease of manufacturing the upper sleeper bunk 14, 110 for different types of vehicles and different sizes of sleeping areas.

With reference to FIG. 4, the upper sleeper bed 14 includes an actuator 110 operable to reconfigure the latch system 62 from a locked configuration to an unlocked configuration and permit the upper sleeper bed 14 to pivot downward from the stored position thereof. In one embodiment, the actuator 110 includes a handle 112 that is turned in a first direction to shift the latch system 62 from the locked to the unlocked configuration. The handle 112 may be spring-biased in a reverse direction in order to automatically return the latch system 62 to the locked configuration once the user removes his hand from the handle 112.

Figure 28:
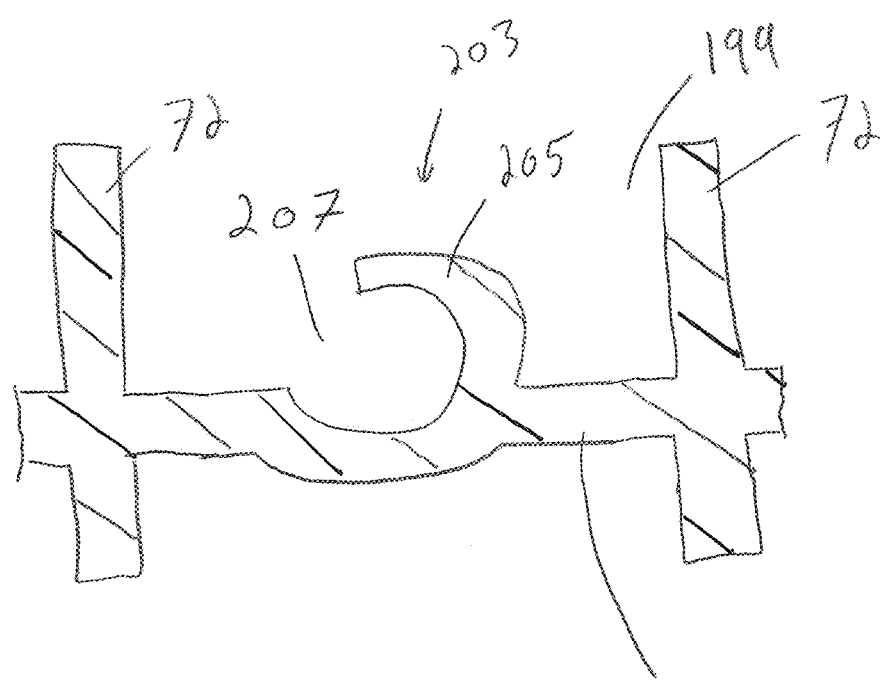
FIG. 28 is a cross-sectional view of a cable mount of a lattice support.

Regarding FIG. 6, the actuator 110 includes latch cable assemblies 114 that extend around or through lattice members 72 and/or the vertices 40 of the lattice support 70. For example, the latch cable assembly 114A extends through an opening 116 of the lattice member 72A. Alternatively or additionally, and with reference to FIG. 28, the lattice support 70 may include one or more filled-in triangle portions 201 including a retainer 203 in an opening 199 between lattice members 72. The retainer 203 includes a retainer member 205 extending about an opening 207 sized to receive a portion of a latch cable assembly 114. The opening 207 is sized slightly smaller than the diameter of the portion of the latch cable assembly 114 so that the retainer member 205 engages the exterior of the portion of the latch cable assembly 114 and holds the portion of the latch cable assembly 114 relative to the lattice support 70.

The latch cable assemblies 114 each include a housing, such as a tube, and a latch cable that extends through the housing and operably connects the handle 112 to a latch member of the front latch mechanism 64 or the side latch mechanisms 66. For example, the side latch mechanism 66 has a latch member 120 coupled to the latch cable assembly 114B. When the handle 112 is turned in the unlocking direction, the cable of the latch cable assembly 114 shifts toward the handle 112 and shifts the latch member inward in direction 122 toward the end cap 22. The inward movement of the latch member 120 positions the latch member 120 in clearance with a structure of the vehicle such that the latch member 120 may permit the upper sleeper bed 14 to pivot from the stored position to the operable position.

Figure 7:
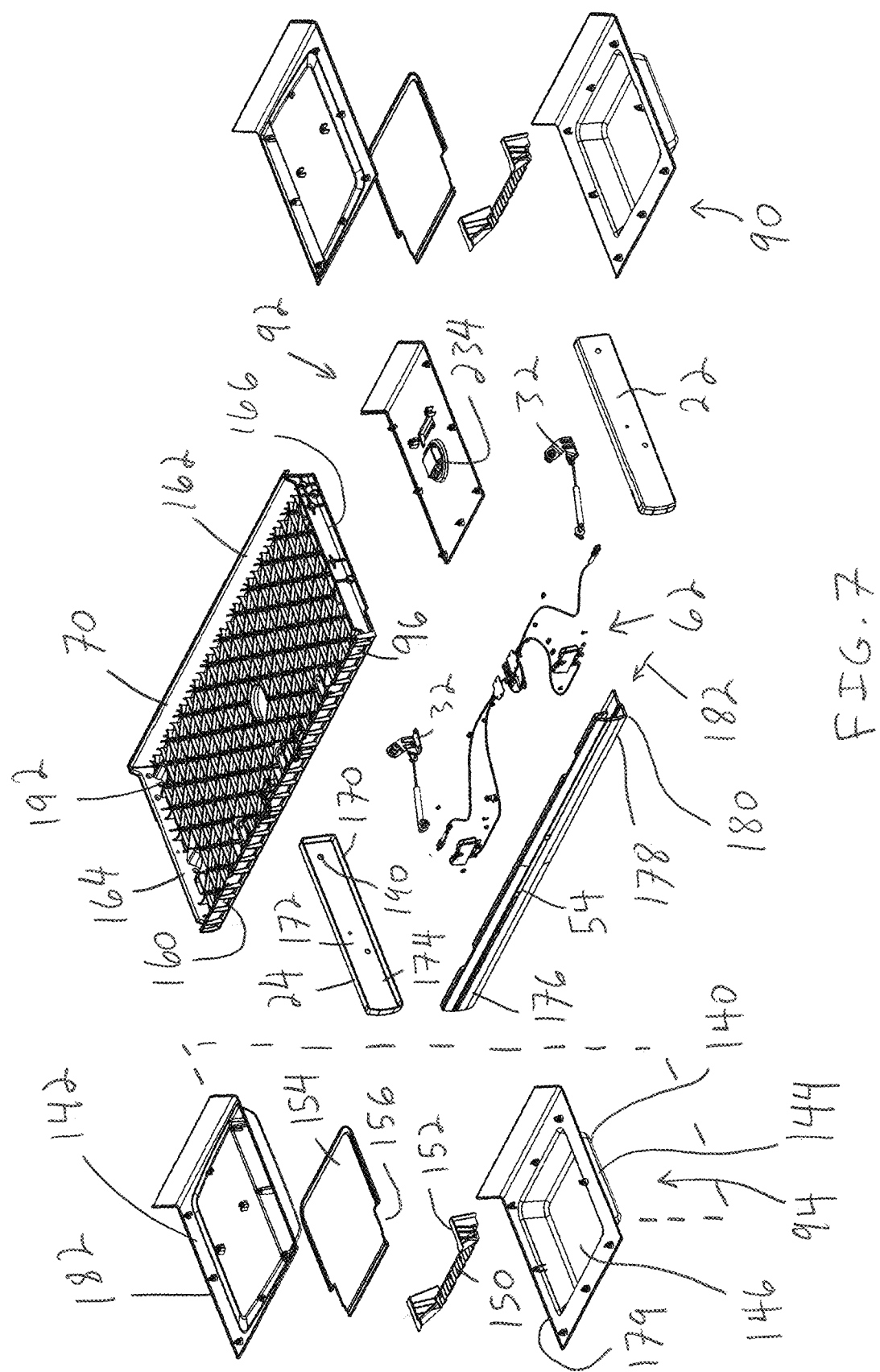
FIG. 7 is an exploded view of the upper sleeper bunk of FIG. 6 showing a rail of the frame and end caps of the frame that are connected to opposite ends of the rail.

The exterior panels 90, 94 may each be an assembly of parts or, in other embodiments, may be a single part. In the embodiment of FIG. 7, the exterior panels 90, 94 are mirror images of each other but, in other embodiments, the exterior panels 90, 94 may be different. With respect to the exterior panel 94, the exterior panel 94 includes a panel base 140 that is connected to the lattice support 70 and a panel exterior 142 that covers lower surfaces of the panel base 140. The panel base 140 includes a projection 144 that forms a cavity 146 of the panel base 140 and defines a portion of the compartment 100. The exterior panel 94 includes a reinforcement 150 that is received in the cavity 146 and includes mounting portions 152 that connect to the lattice support 70 to strengthen the projection 144. The exterior panel 94 also includes a cover 154 having notches 156 that provide clearance for the mounting portions 152 of the reinforcement 150 to connect to the lattice support 70. The cover 154 closes the cavity 146 and separates the cavity 146 from the lattice support 70.

As shown in FIG. 7, the lattice support 70 includes a front wall 160, a taller, rear wall 162, and side walls 164, 166. In one embodiment, the lattice support 70 has a unitary, one-piece construction. For example, the lattice support 70 may be made of a plastic material and may be manufactured using molding or additive manufacturing techniques. As an example, the lattice support 70 may be injection molded using a glass filled polypropylene material.

The end caps 22, 24 each include a skirt 170 extending from a lateral wall 172 and forming a recess 174 that receives an end portion 176 of the rail 54 as well as the front wall 160, side wall 164 and rear wall 162 of the lattice support 70. The recess 174 of the end cap skirt 170 may also receive flanges 179, 182 of the panel base 140 and panel exterior 142.

The rail 54 has opposite end portion 178 with a recess 180 extending from the end portion 178 to the end portion 176. To connect the lattice support 70 and the rail 54, the front wall 160 is slid in direction 182 into the recess 180 of the rail 54 to form a slide connection therebetween. The lattice support 70 is slid along the rail 54 until the front wall 160 is fully engaged along the length thereof with the rail 54. The lateral wall 172 of the end cap 24 has an opening configured to receive a fastener 360 (see FIG. 12) extending through an opening 192 of the side wall 164 of the lattice support 70. The fastener 360 extending through the openings 190, 192 connects to the mount 32 and transfers loading from the lattice support 70 to the mount 32. Further, the mount 32 includes another fastener at the lift support 60 that extends through an opening in the end cap 24 (see FIG. 5) and through an opening in the side wall 164 of the lattice support 70 to further enable load transfer between the lattice support 70 and the mount 70. The end cap 22 forms a similar connection with the lattice support 70, rail 54, exterior panel 90, and the other mount 32. In some embodiments, the end caps 22, 24 have through openings that receive additional fasteners for connecting the end caps 22, 24 to the lattice support 70, such as M6 screws, and the lattice support 70 includes U-nuts that engage the fasteners.

Figure 8:
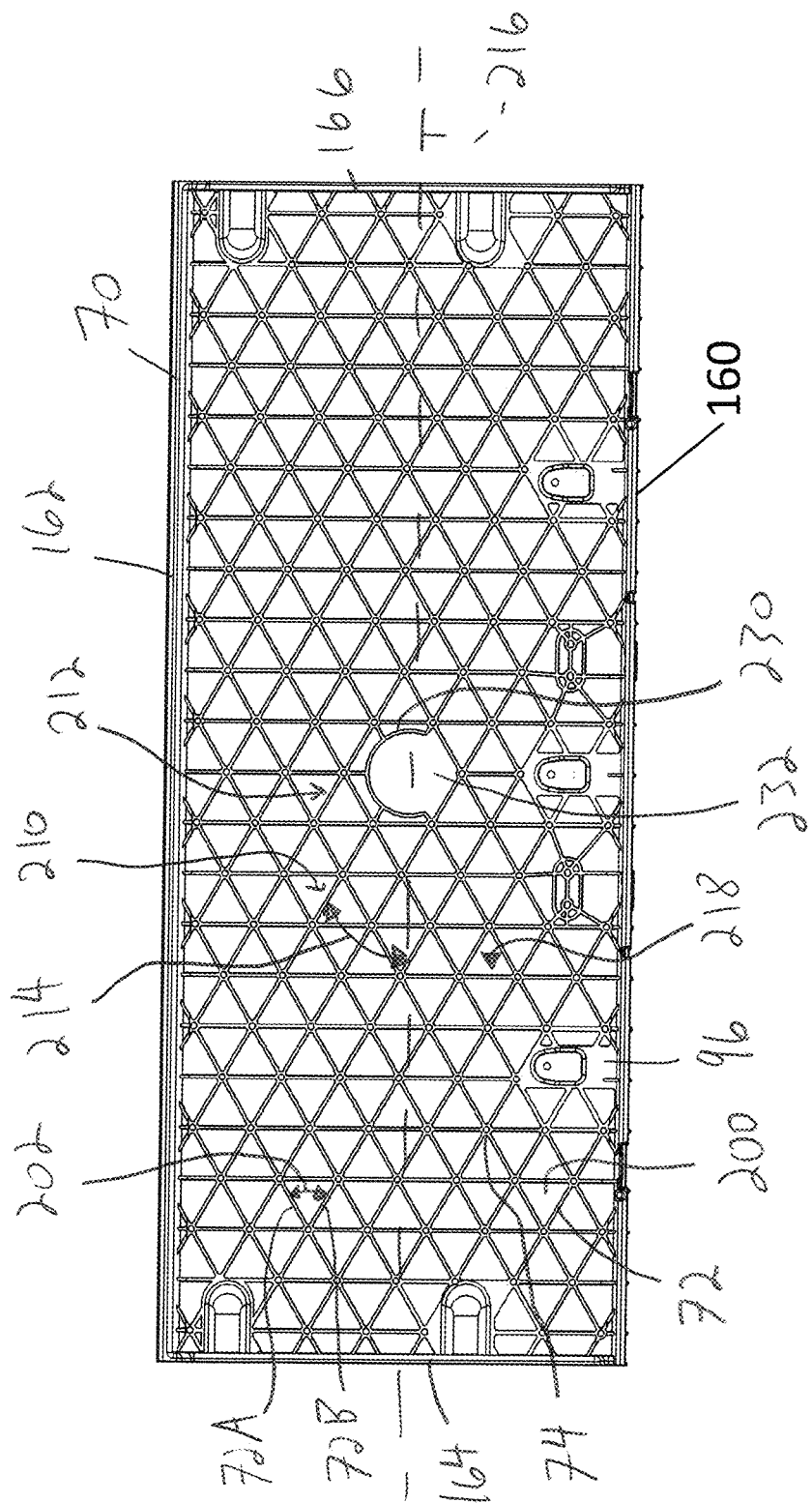
FIG. 8 is a top plan view of the lattice support of FIG. 7 showing a central opening that receives an actuator for controlling latches of the upper sleeper bunk.

Regarding FIG. 8, the lattice support 70 includes the lattice members 72 extending about through openings 200 and joined together at the vertices 74. The lattice members 72 are arranged in a pattern, such as a polygonal pattern, that provides rigidity to the lattice support 70 and may be repeated for longer sleeper bunk configurations or reduced for shorter sleeper bunk configurations. The lattice member 72 include lattice members 72A, 72B extending at an angle 202 relative to one another, such as 60 degrees. In one embodiment, the lattice members 72 are arranged in a triangular shape with vertices 74 at the intersection of the lattice members 72. In other forms, the lattice members 72 may be arranged in other polygonal shapes or may include curved portions, such as circles, as some examples. With the lattice members 72 forming equilateral triangles, the lattice support 70 has parallel transverse cords such as cords 210, 212 extending at an angle 214 relative to a longitudinal axis 216 of the lattice support 70. The lattice members 72 also include lateral cords, such as cord 218, extending perpendicular to the longitudinal axis 216. The cords 210, 212 and 218 extend between the walls 160, 162, 164, 166 and bridge across the recess 52. The cords 210, 212, 218 thereby transfer the weight of the mattress and user to the walls 160, 162, 164, 166 which in turn transfers the load to the frame 50.

Regarding FIG. 8, the lattice support 70 includes a collar 230 extending about an opening 232. The opening 232 receives a housing 234 (see FIG. 6) of the actuator 110. The actuator housing 234 may be mounted to the collar 230, such as by fasteners and/or interlocking portions of the housing and the collar 230.

Figure 9:
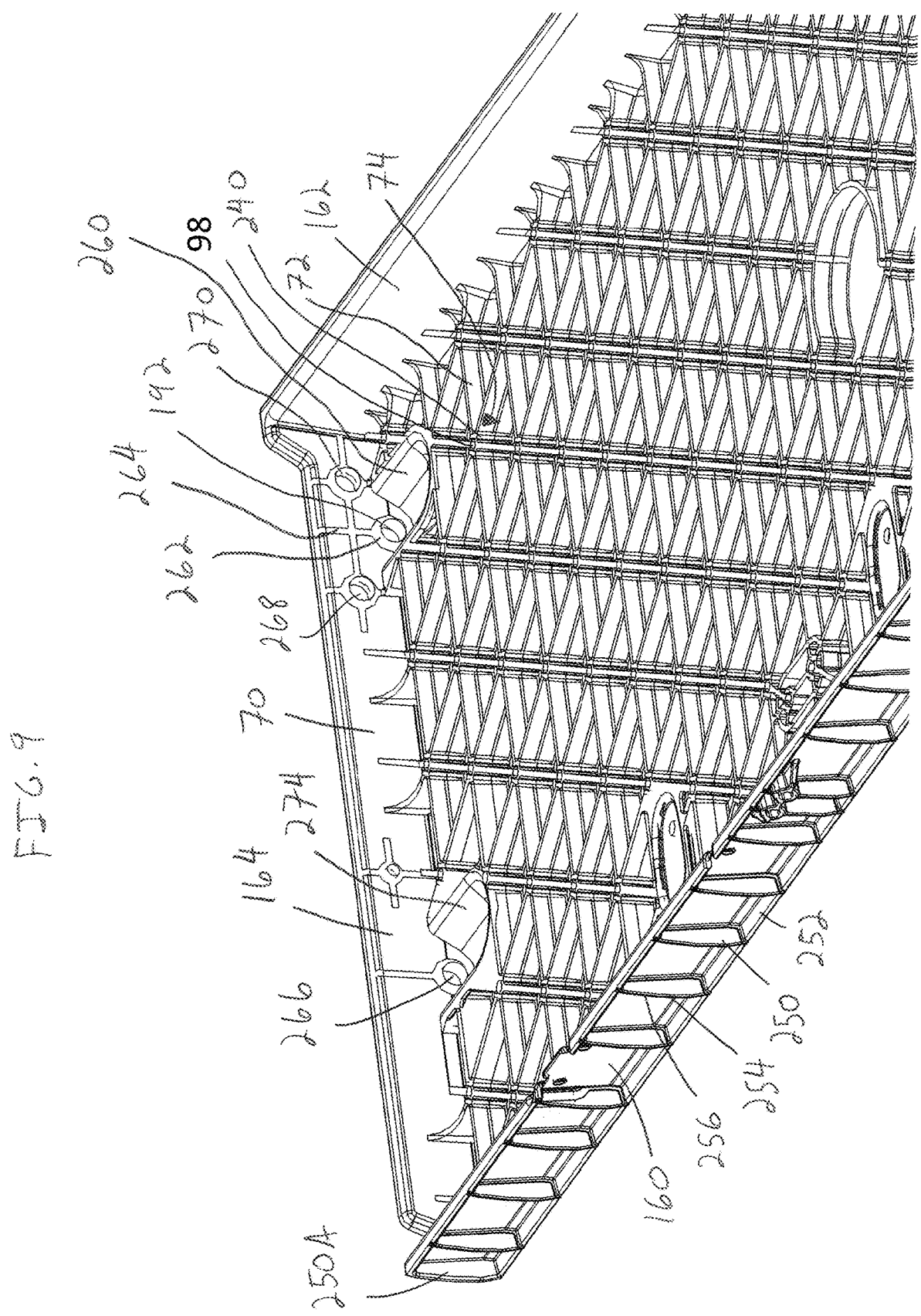
FIG. 9 is a perspective view of the lattice support of FIG. 8 showing an opening of the side wall that receives a fastener to connect the lattice support to one of the end caps.

Regarding FIG. 9, each vertex 74 may include an annular wall 240 extending about the through opening 98. The annular wall 240 provides rigidity to the interface and the opening 98 may improve the ease of manufacturing the lattice support 70. For example, the annular wall 240 provides a substantially uniform wall thickness of the vertices 74 and the lattice members 72 which improves the flow of material when injection molding the lattice support 70.

The front wall 160 includes ribs 250 separated by gaps 252 therebetween. The ribs 250 have an edge 254 with an outer surface 256 thereon. The edges 254 of the ribs 250 provide spaced line contacts between the front wall 160 of the lattice support 70 and an interior of the rail 54 to improve the ease of advancing the front wall 160 in direction 182 (see FIG. 7) into the rail 54. The ribs 250 include end rib 250A that is received in the skirt recess 174 of the end cap 24 and a corresponding end rib 250 at the opposite end of the front wall 160 that is received in a similar skirt recess of the end cap 22.

Regarding FIG. 9, the side wall 164 includes the opening 192 for receiving the fastener 360 therethrough to connect the lattice support 70 to the end cap 24 and a pocket 260 that provides clearance for inserting the fastener 360, such as a bolt, into the opening 192 and the associated opening 190 of the skirt 124. The side wall 164 also includes reinforcing structures, such as a reinforcing collar 262 extending about the opening 192 and one or more ribs 264 that extend away from the reinforcing collar 262 and increase the thickness of the side wall 164 adjacent the opening 192 which inhibits crack propagation. The fastener 360 that extends through the opening 192 may connect to one of the mounts 32 on the opposite side of the end cap 24 from the lattice support 70. The side wall 164 may include other openings 268, 270 that may be used in other embodiments to connect the lattice support 70 to the end cap 24 and/or mount 32. The provision of the openings 268, 192, 270 provides flexibility in permitting the lattice support 70 to be used with different types of end caps and mounts 32.

Regarding FIG. 9, the side wall 164 includes an opening 266 that receives a portion of a side latch mechanism 66A (see FIG. 6). The portion of the side latch mechanism 66A may also operate as fastener to connect the side wall 164 to the end cap 24. The lattice support 70 includes a pocket 274 that receives a portion of the side latch mechanism 66A and improves the ease of assembling the side latch mechanism 66A with the lattice support 70.

Figure 10:
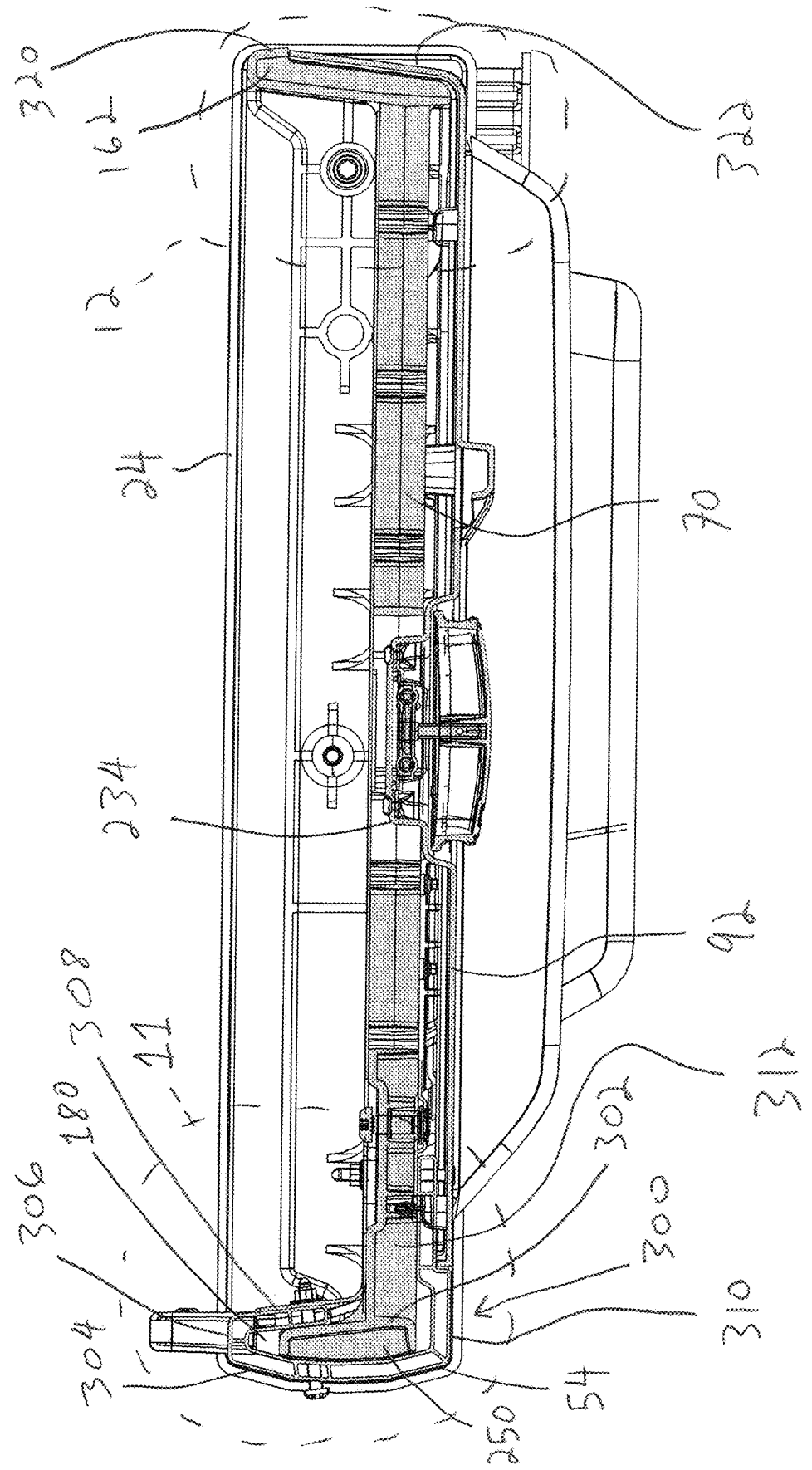
FIG. 10 is a cross-sectional view taken across line 10-10 in FIG. 6 showing a projection of the lattice support received in a recess of the rail.
Figure 11:
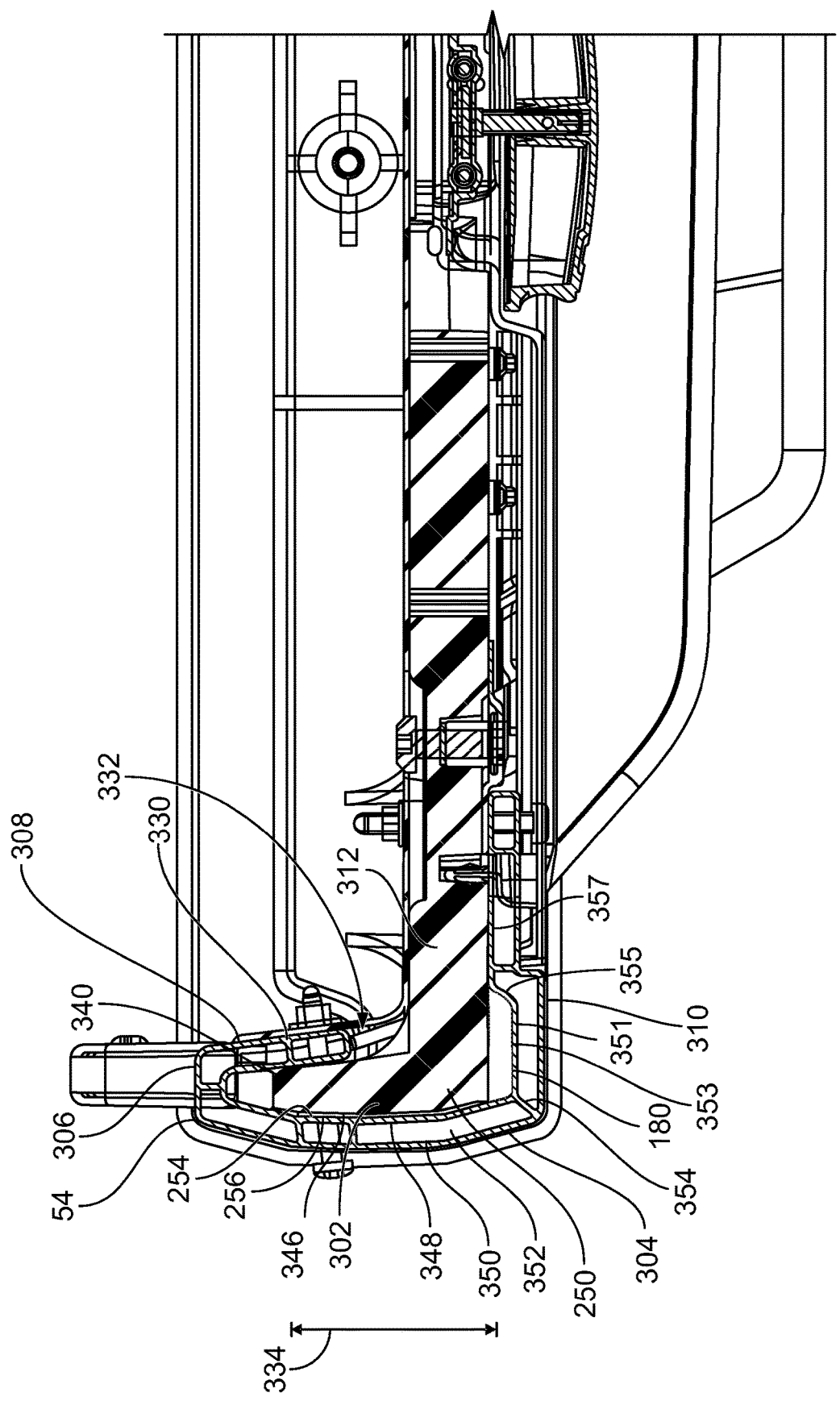
FIG. 11 is an enlarged view of the dashed circle 11 in FIG. 10 showing a mating profile of the projection of the lattice support and the recess of the rail that permits the lattice support to be slid longitudinally into the recess of the rail to connect the lattice support to the rail.

With reference to FIGS. 10 and 11, the upper sleeper bunk 14 includes an interface 300 between the rail 54 and the lattice support 70 that provides a rigid connection for the lattice support 70 to extend therefrom and support the weight of a user on the upper sleeper bunk 14. More specifically, the lattice support 70 has a projection 302 including the front wall 160 that is received in the recess 180 of the rail 54. The rail 54 has a front wall 304, an upper wall 306, a lip wall 308, and a lower wall 310. The walls 304, 306, 308, 310 form an interlocking engagement with the projection 302 of the lattice support 70 and support a base portion 312 of the lattice support 70 as the base portion 312 extends away from the rail 54. The lower wall 310 include a recessed portion 351 that forms a recess 353 below the projection 302 of the lattice support 70. The lower wall 310 further includes a ramp portion 355 that extends upwardly to a floor portion 357. The floor portion 357 extends along and supports the underside of the base portion 312 of the lattice support 70.

Regarding FIG. 10, at the rear wall 162 of the lattice support 70, rear wall 162 has a projection 320 that cooperates with a rear flange 322 of the exterior panel 22. The rear flange 322 extends upward and along the rear wall 162 to cover the rear walls 162 of the lattice support 70.

Regarding FIG. 11, the lip wall 308 and the lower wall 310 form a neckdown portion 330 of the rail 54 and defines a lateral opening 332 having a height that is smaller than a height 334 of the projection 302 of the lattice support 70. This causes surfaces 340, 342 to abut and resist pull-through of the projection 302 from the recess 180 of the rail 54 as the user's weight pulls downward on the middle of the lattice support 70.

Regarding FIG. 11, the edge 254 of each rib 250 has a shape complementary to an inner surface 346 of an inner wall portion 348 of the front wall 304. The inner surface 346 of the inner wall portion 348 and the surface 256 may have a crenulated profile with straight sections and corners separating the straight sections. In one embodiment, the rail 54 includes inner and outer wall portions for each of the front wall 304, upper wall 306, lip wall 308 and lower wall 310. For example, the front wall 304 includes the inner wall portion 348, an outer wall portion 350, and a void 352 therebetween. There may also be support portions 354 to increase the strength of the cross-section of the rail 54. This dual-wall structure of the rail 54 may provide a desired rigidity of the rail 54 while minimizing the material required to manufacture the rail 54. It is noted that in other embodiments, the rail 54 may be machined or produced using additive manufacturing as some examples.

Figure 12:
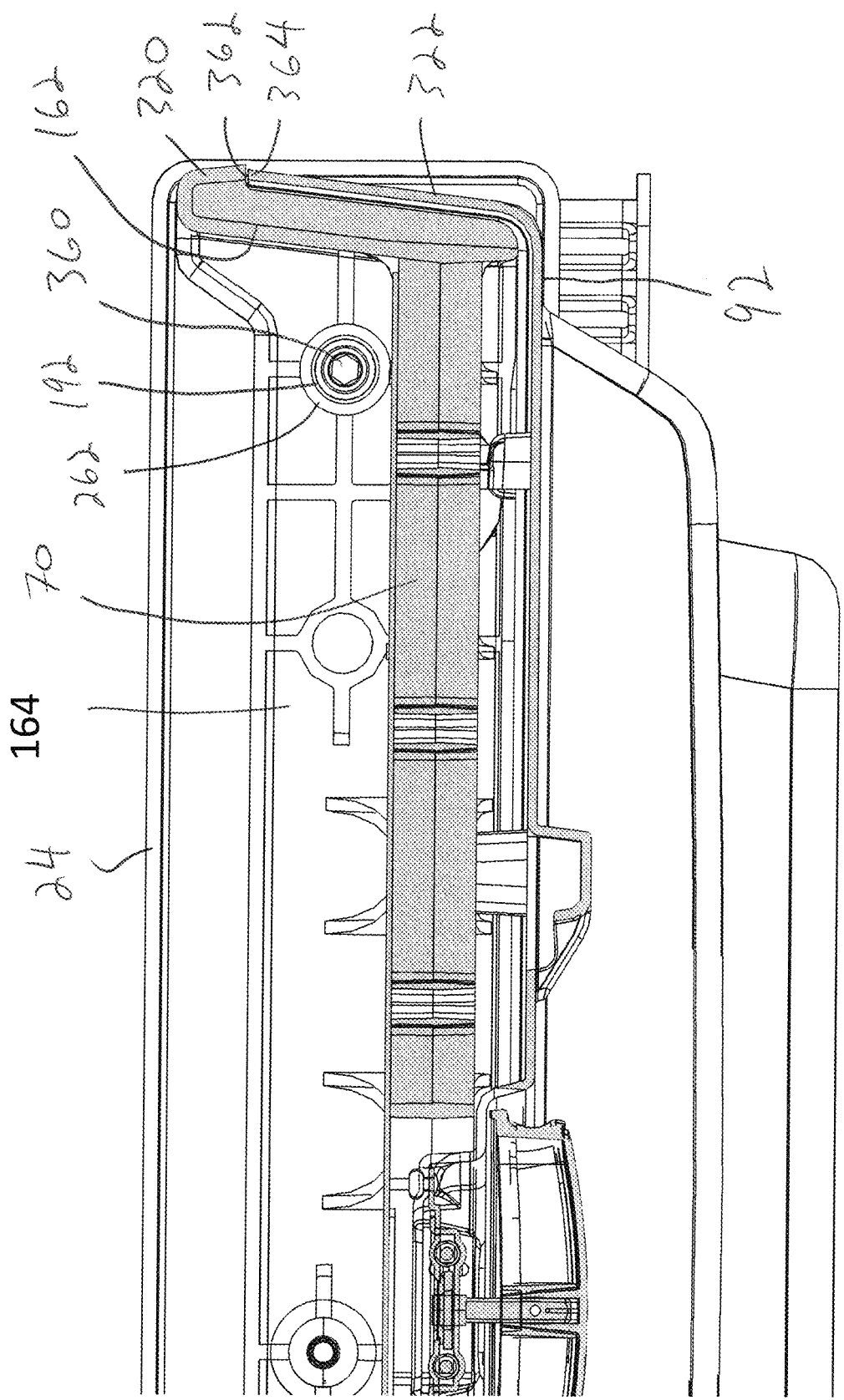
FIG. 12 is an enlarged view of the dashed circle 12 in FIG. 10 showing a rear flange of one of the exterior panels abutting an underside of a rear wall of the lattice support.

Regarding FIG. 12, the lattice support 70 is shown with the fastener 360 extending through the opening 192 of the side wall 164. FIG. 12 also shows the projection 320 of the rear wall 162 of the lattice support 70 having an underside 362 against which an upper edge 364 of the rear flange 322 of the exterior panel 92 abuts. The contact between the underside 362 and the edge 364 may serve to position the exterior panel 92 relative to the lattice support 70.

Figure 13:
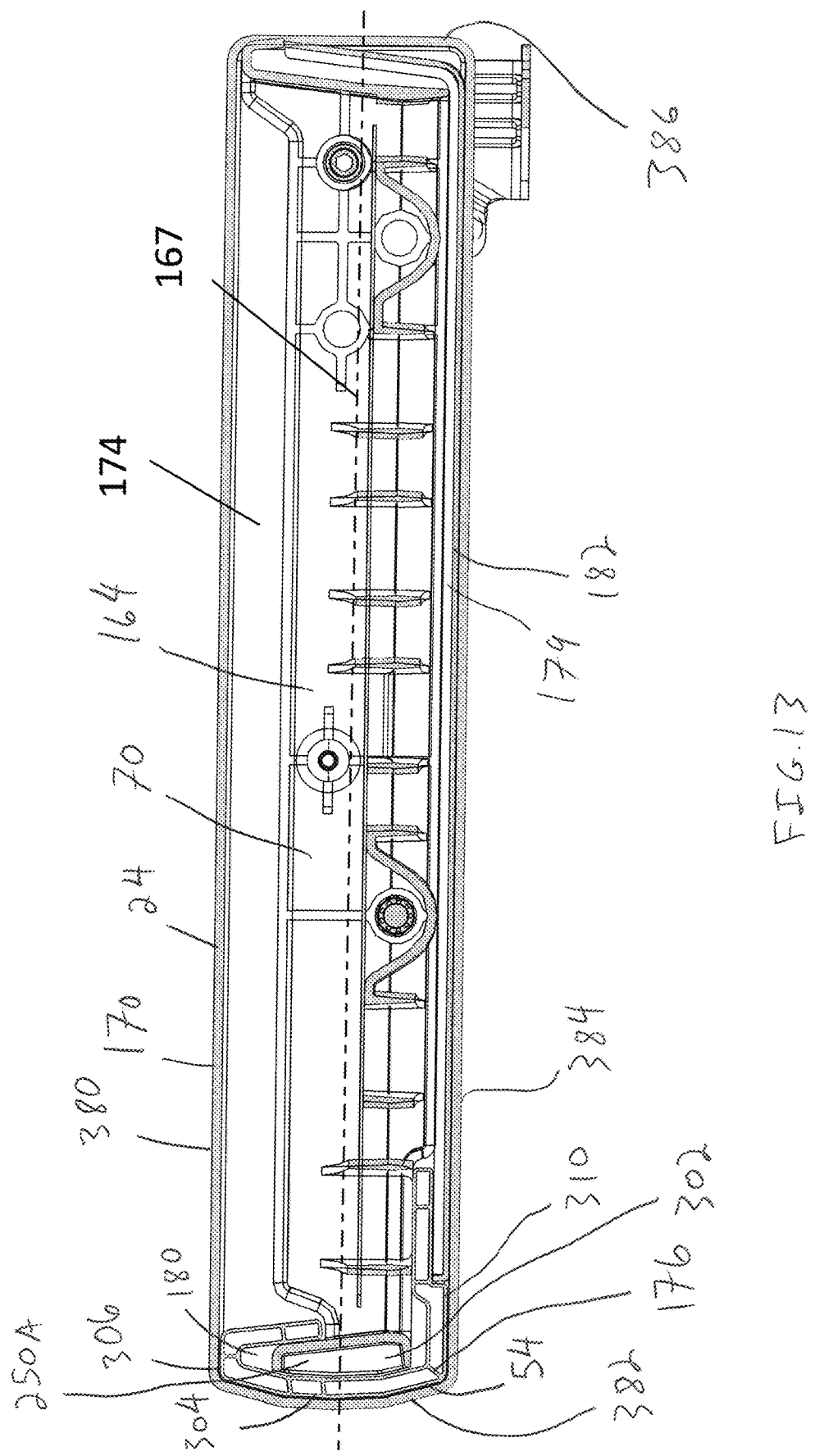
FIG. 13 is a cross-sectional view taken across line 13-13 in FIG. 6 showing an end of the rail and a side wall of the lattice support received in a recess of a skirt of the end cap.

Regarding FIG. 13, the side wall 164 of the lattice support 70, the end portion 176 of the rail 54, and the flanges 179, 182 of the panel base 140 and panel exterior 142 are shown received in the recess 174 formed by the skirt 170 of the end cap 24. The skirt 170 includes an upper skirt wall portion 380, a side skirt wall portion 382, a lower skirt wall portion 384, and a side skirt portion 386. The upper, side, and lower skirt wall portions 380, 382, 384 encircle and form a mating fit with the upper wall 306, the front wall 304, and the lower wall 310 of the rail 54 and the rear wall 162 of the lattice support 70.

Regarding FIG. 13, the end caps 22, 24 each have a lateral midline 167 and the end caps are symmetrical about the midline 167. This permits a manufacturer to make one end cap 22, 24 and have the end cap 22, 24 be assembled to the rail 54 by flipping the end cap 22, 24 about the midline 167 as appropriate to connect to the desired end portion 176, 180 of the rail 54. The upper wall 306, front wall 304, and lower wall 310 of the rail 54 have outer surfaces for contacting inner surfaces of the end cap 22, 24 that are likewise symmetrical about the lateral midline to permit the end caps 22, 24 to be connected to the rail 54. The end caps 22, 24 may have two sets of holes to receive fasteners therethrough so that the correct set of holes are selected depending on which end portion 176, 180 the end cap 22, 24 is connected to. The unused sets of holes may be closed with a plug or left open.

Figure 14:
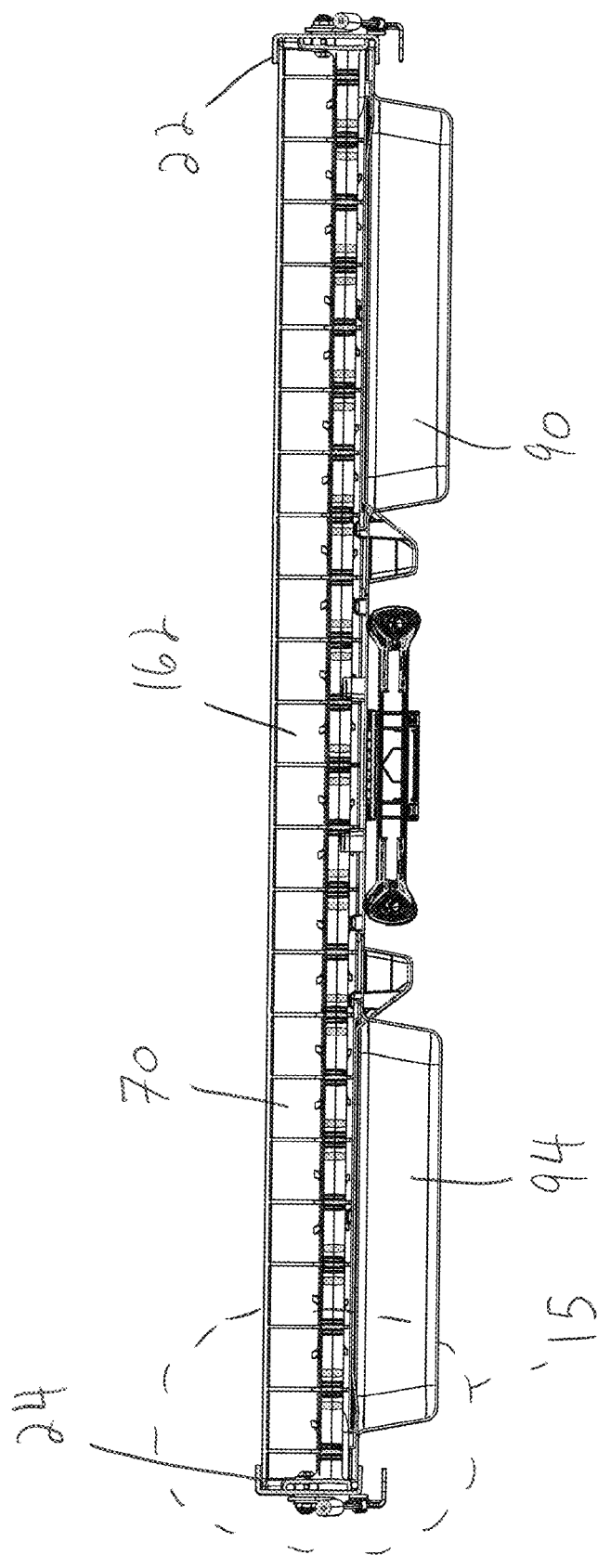
FIG. 14 is a cross-sectional view taken across line 14-14 in FIG. 6 showing the exterior panels connected to an underside of the lattice support.
Figure 15:
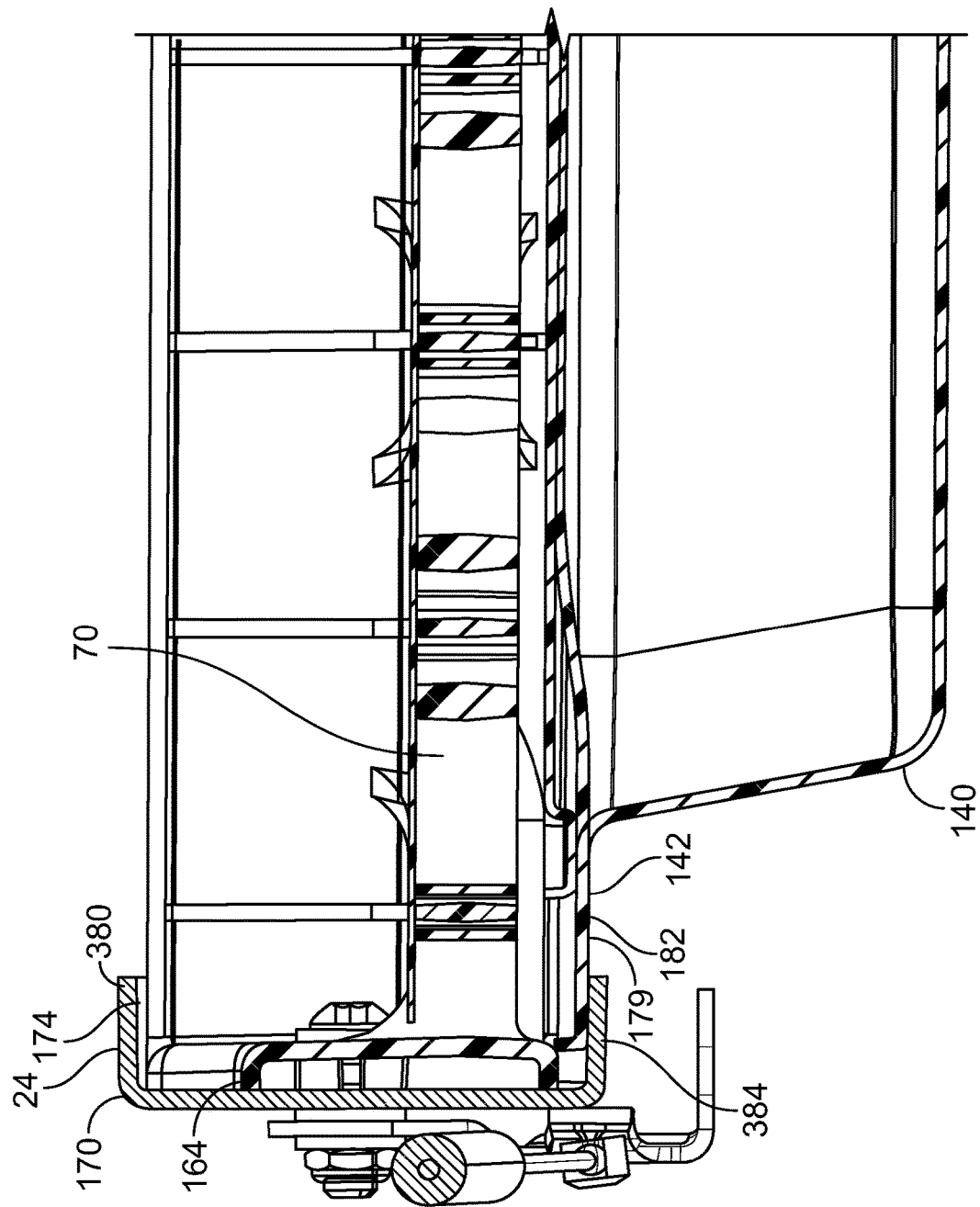
FIG. 15 is an enlarged view of the dashed circle 15 in FIG. 14 showing the side wall of the lattice support and a flange of the exterior panel received within the skirt recess of the end cap.

Regarding FIGS. 14 and 15, the end cap 24 also receives the flanges 179, 182 of the panel base 140 and the exterior panel 142. The connection between the end cap 22, the lattice support 70, and exterior panel 90, are similar. The caps 22, 24 thereby also help secure the exterior panels 90, 94 relative to the rail 54 and lattice support 70.

Figure 16:
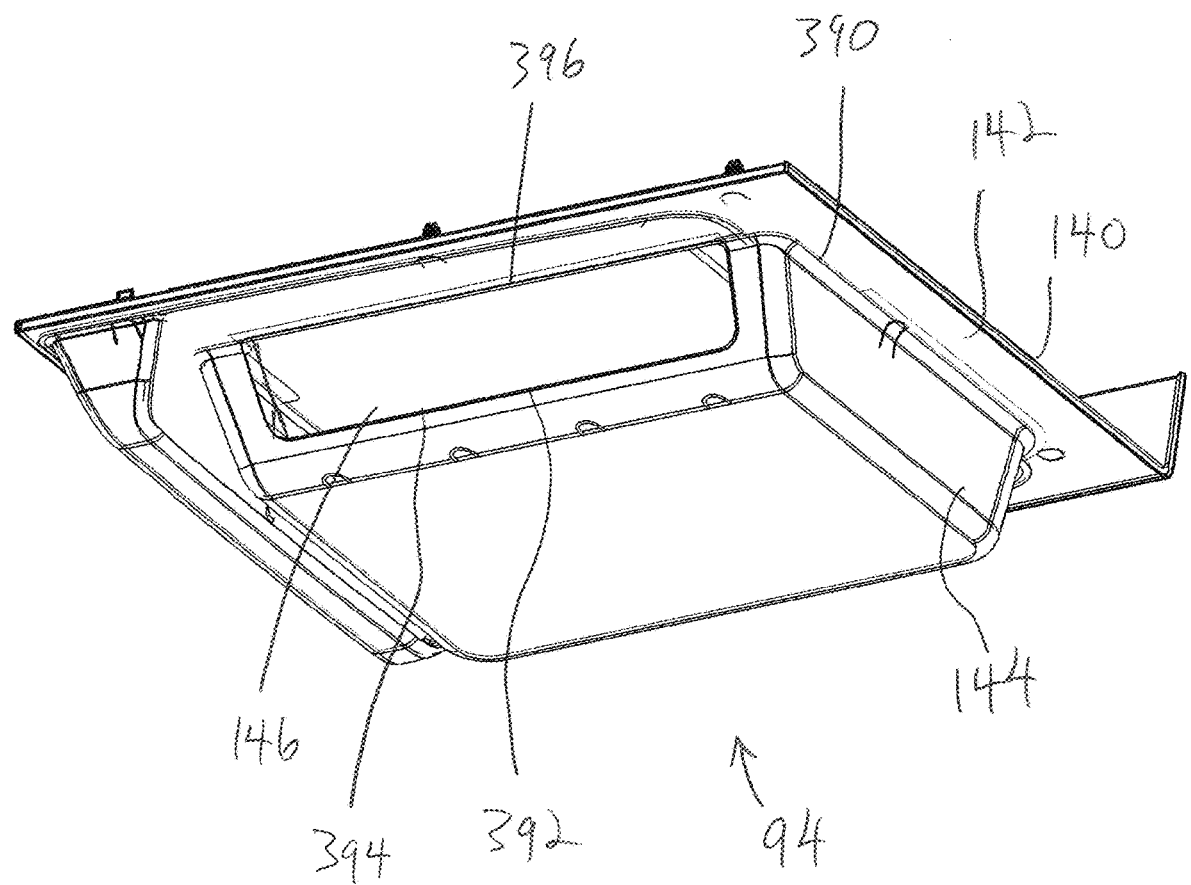
FIG. 16 is a bottom perspective view of one of the exterior panels of the upper sleeper bunk of FIG. 4 showing an opening of the compartment.
Figure 17:
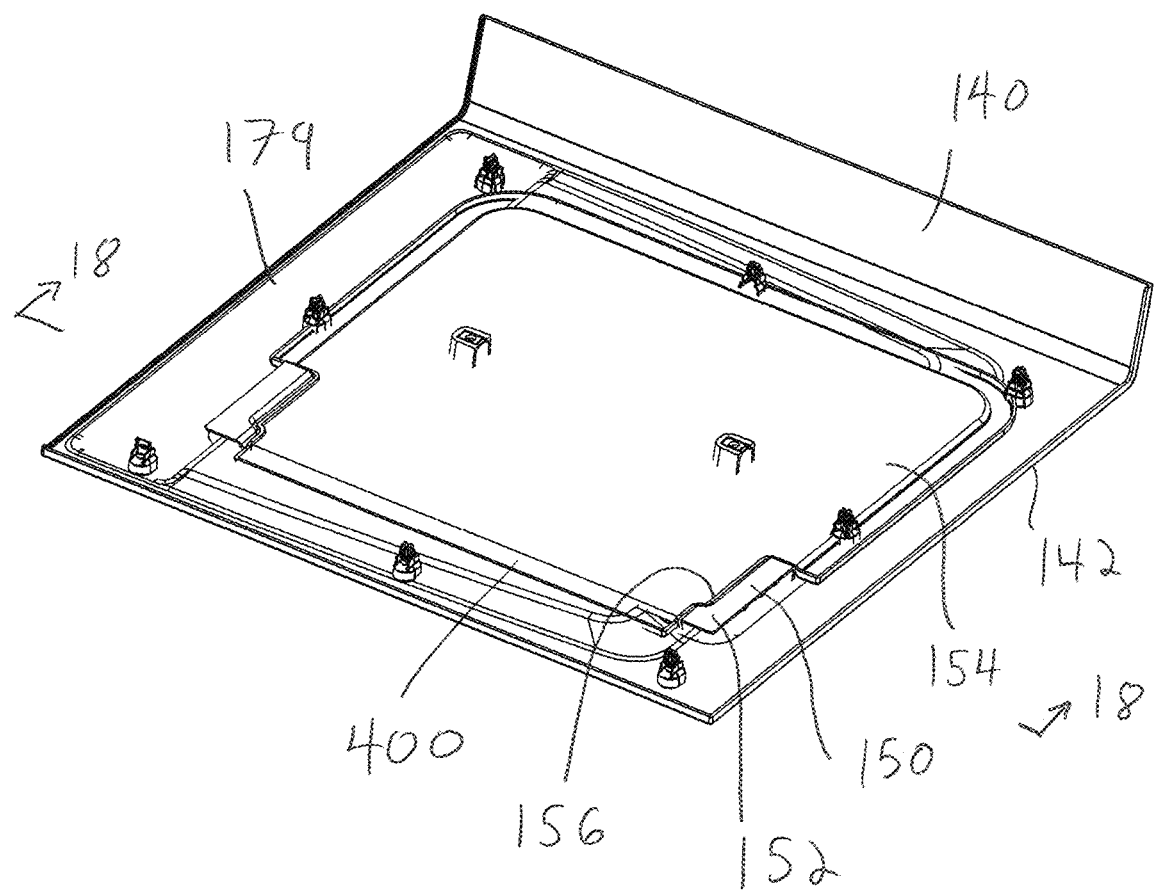
FIG. 17 is a top perspective view of the exterior panel of FIG. 16 showing a panel base, a panel exterior, a cover, and a reinforcement of the exterior panel.
Figure 18:
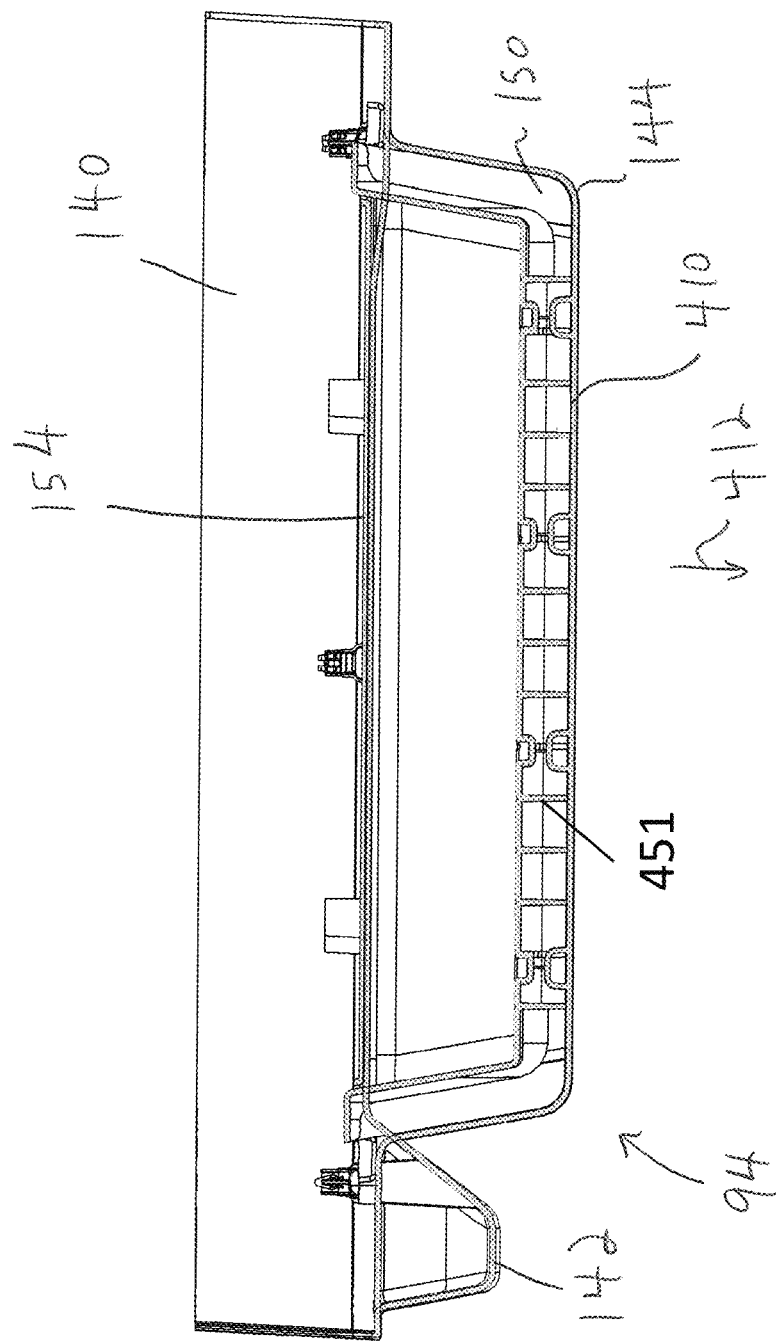
FIG. 18 is a cross-sectional view taken across line 18-18 in FIG. 17 showing the reinforcement reinforcing a lower wall of the panel base.

Regarding FIG. 16, the exterior panel 94 is shown in greater detail. The projection 144 of the panel base 140 extends through an opening 390 of the panel exterior 142. The projection 144 has an edge 392 extending about an opening 394 that opens to the cavity 146. The panel exterior 142 includes an edge 396 that defines a portion of the opening 390 and also defines a portion of the opening 394. Regarding FIG. 17, the cover 154 includes a lip 400 that overlaps the flange 179 of the panel base 140 and may be fastened thereto. The cover 154 has notches 156 providing clearance for the mounting portions 152 of the reinforcement 150 that extend therethrough. Regarding FIG. 18, the reinforcement 150 is secured at a lower portion 451 thereof to a lower wall 410 of the projection 144 of the panel base 140. Further, the mounting portions 152 of the reinforcement 150 are secured to the lattice support 70. The reinforcement 150 resists deformation of the lower wall 410 in direction 412, such as by a user accidentally pulling downward on the lower wall 410 near the opening 394.

Figure 19:
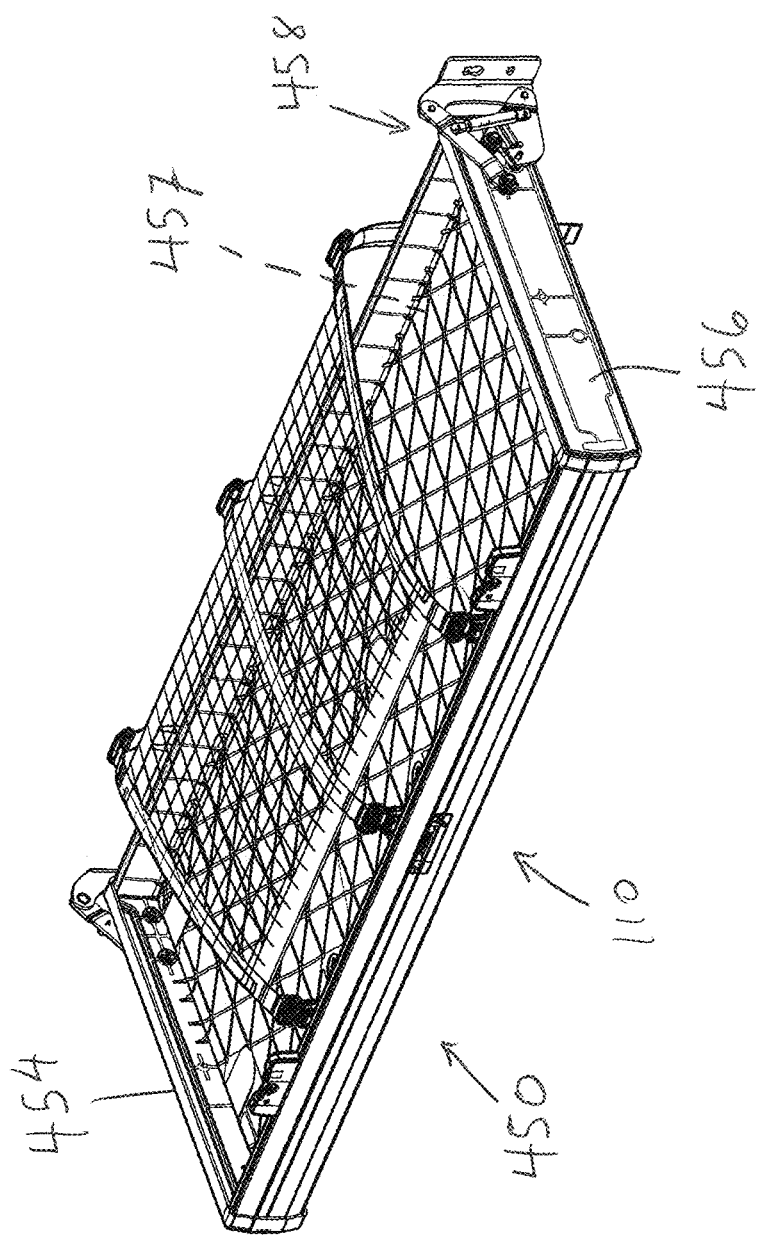
FIG. 19 is a perspective view of an upper sleeper bunk showing a frame extending about a recess for receiving a mattress.
Figure 20:
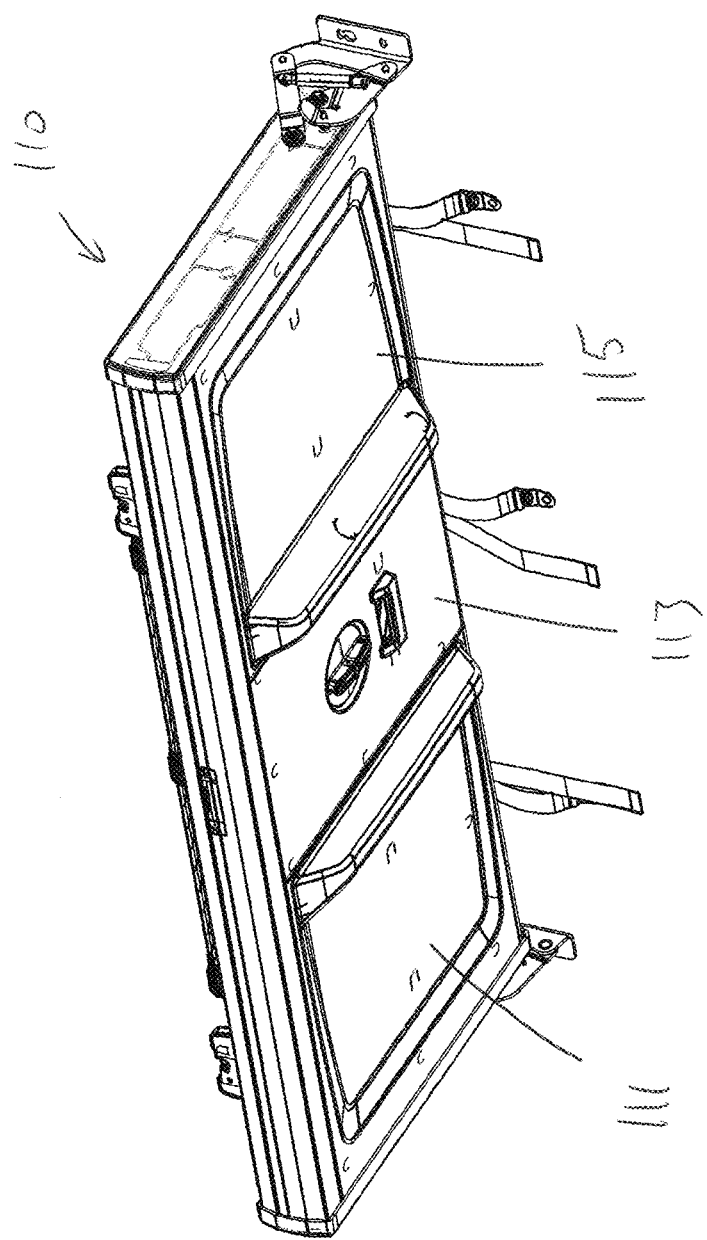
FIG. 20 is a bottom perspective view of the upper sleeper bunk of FIG. 19 showing lower exterior panels of the upper sleeper bunk.

Regarding FIGS. 19 and 20, the upper sleeper bunk 110 is provided that is similar in many respects to the upper sleeper bunk 14 discussed above. The upper sleeper bunk 110 includes a frame 450 having a rail 452 and end caps 454, 456 and a lattice support 457 received in the frame 450. The upper sleeper bunk 110 has mounts 458 that may be different than the mounts 32 discussed above. Regarding FIG. 20, the upper sleeper bunk 110 includes exterior panels 111, 115 that do not include compartments for storage. Further, the upper sleeper bunk 110 does not include a ladder. It will be appreciated that the exterior panels 111, 113, 115 may be selected for a particular application and connected to the rail 450, end caps 454, 456, and lattice support 457.

Figure 21:
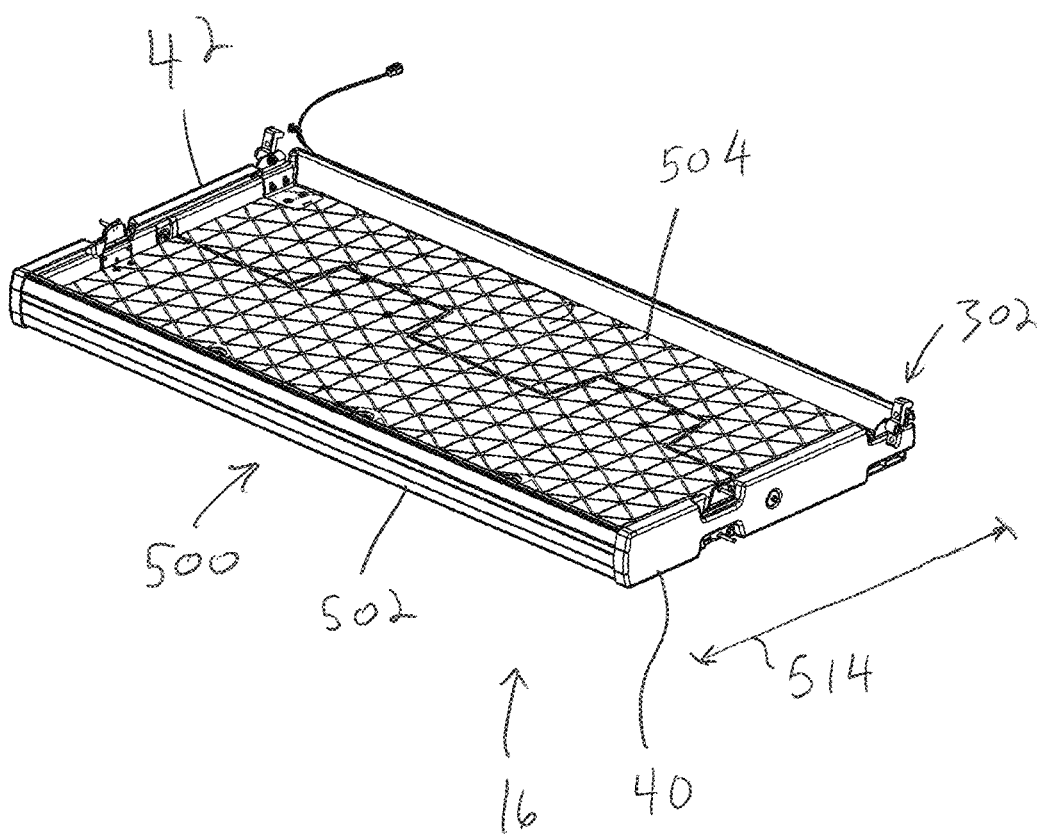
FIG. 21 is a perspective view of a lower sleeper bunk showing a frame extending about a recess for receiving a mattress.
Figure 22:
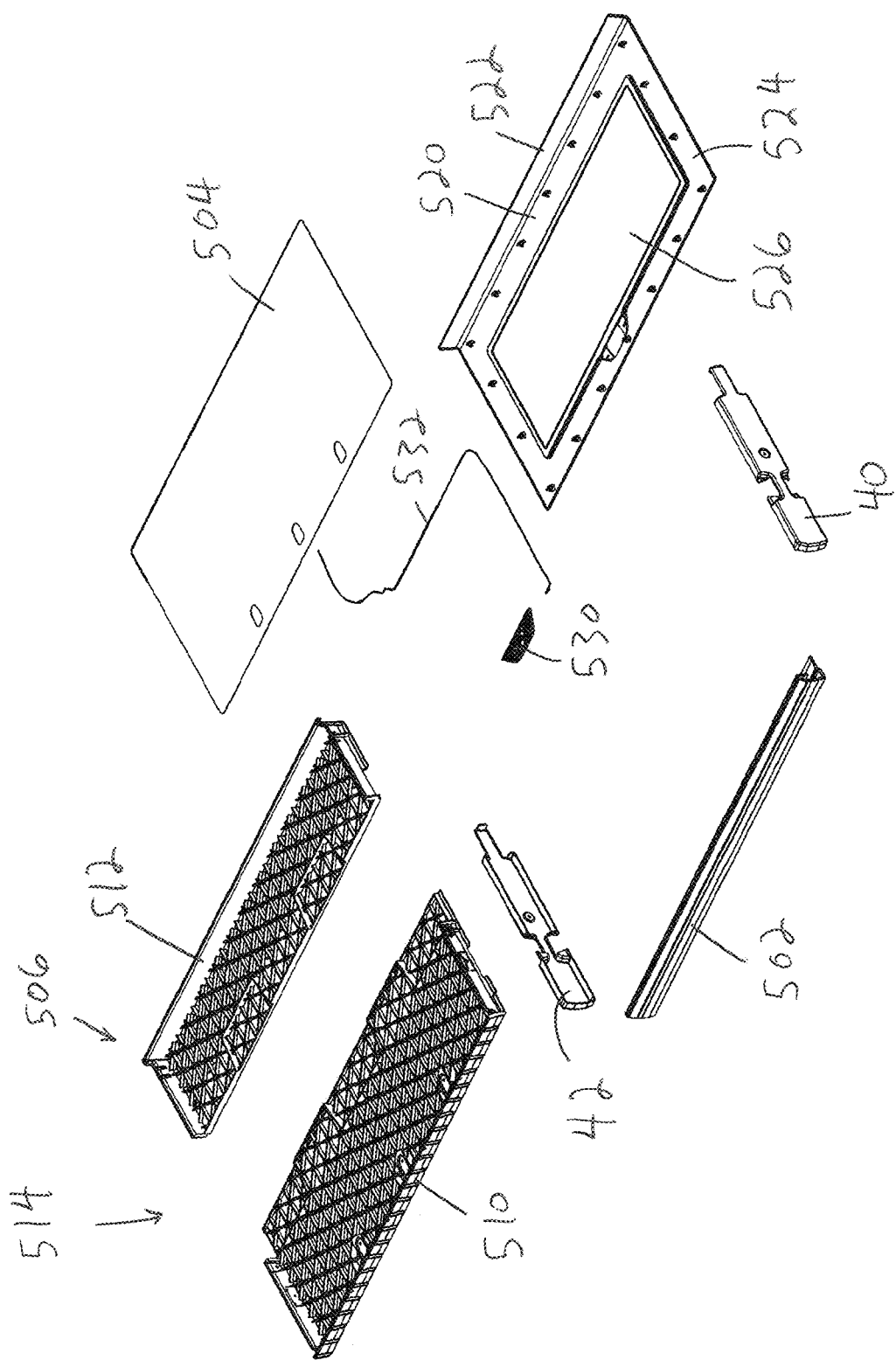
FIG. 22 is an exploded view of the lower sleeper bunk of FIG. 21 showing a rail and a pair of end caps of the frame and a lattice support including a front portion and a rear portion.

Regarding FIGS. 21 and 22, the lower sleeper bunk 16 is similar in many respects to the upper sleeper bunk 14 discussed above such that differences between the two will be highlighted. The lower sleeper bunk 16 includes a frame 500 including a rail 502 and the end caps 40, 42. The lower sleeper bunk 16 includes a mattress base 504 received on a lattice support 506. The lower sleeper bunk 16 also includes mounts 302 that may permit the lower sleeper bunk 16 to be moved from a stored configuration to an operable configuration. In other embodiments, the mounts 302 do not permit movement of the lower sleeper bunk 16. Regarding FIG. 22, the lattice support 506 includes a plurality of lattice support portions, such as a lattice support front portion 510 and a lattice support rear portion 512. The lattice support front and rear portions 510, 512 form a connection 514 therebetween that provides rigidity for the lattice support 506 despite the multiple components being utilized.

The multiple lattice support portions may be utilized because the lower sleeper bunk 16 may have a lateral width 514 (see FIG. 21) larger than the upper sleeper bunk 14. Due to the larger width 514, it may be desirable to form the lattice support 506 using a plurality of components to ease manufacture. For example, if the lattice support 506 is injection molded, the two-piece construction of the lattice support 506 may require a smaller injection mold volume to mold the components of the lattice support 506 than if the lattice support 506 had a single-piece construction. Another advantage of utilizing the two-piece lattice support 506 is that the lattice support front portion 510 may be connected to a first lattice support rear portion 512 to provide a first lateral width, or the lattice support front portion 510 may be connected to a second lattice support rear portion 512 to provide a smaller lateral width. This further improves the flexibility of the lower sleeper bunk 16 to be tailored to a particular vehicle.

The lower sleeper bunk 16 also includes an exterior panel 520 that is connected to an underside of the lattice support 506. The exterior panel 520 includes a rear wall 522, and a flange 524 extending about a central opening 526. The opening 526 provides access to an underside of the lattice support 506 and improves air flow through the lower sleeper bunk 16. The lower sleeper bunk 16 may also include a light 530 and a cable 532 for providing electricity to the light 530. The light 530 may provide light for a lounge area when the lower sleeper bunk 16 is moved to the stored position.

Figure 23:
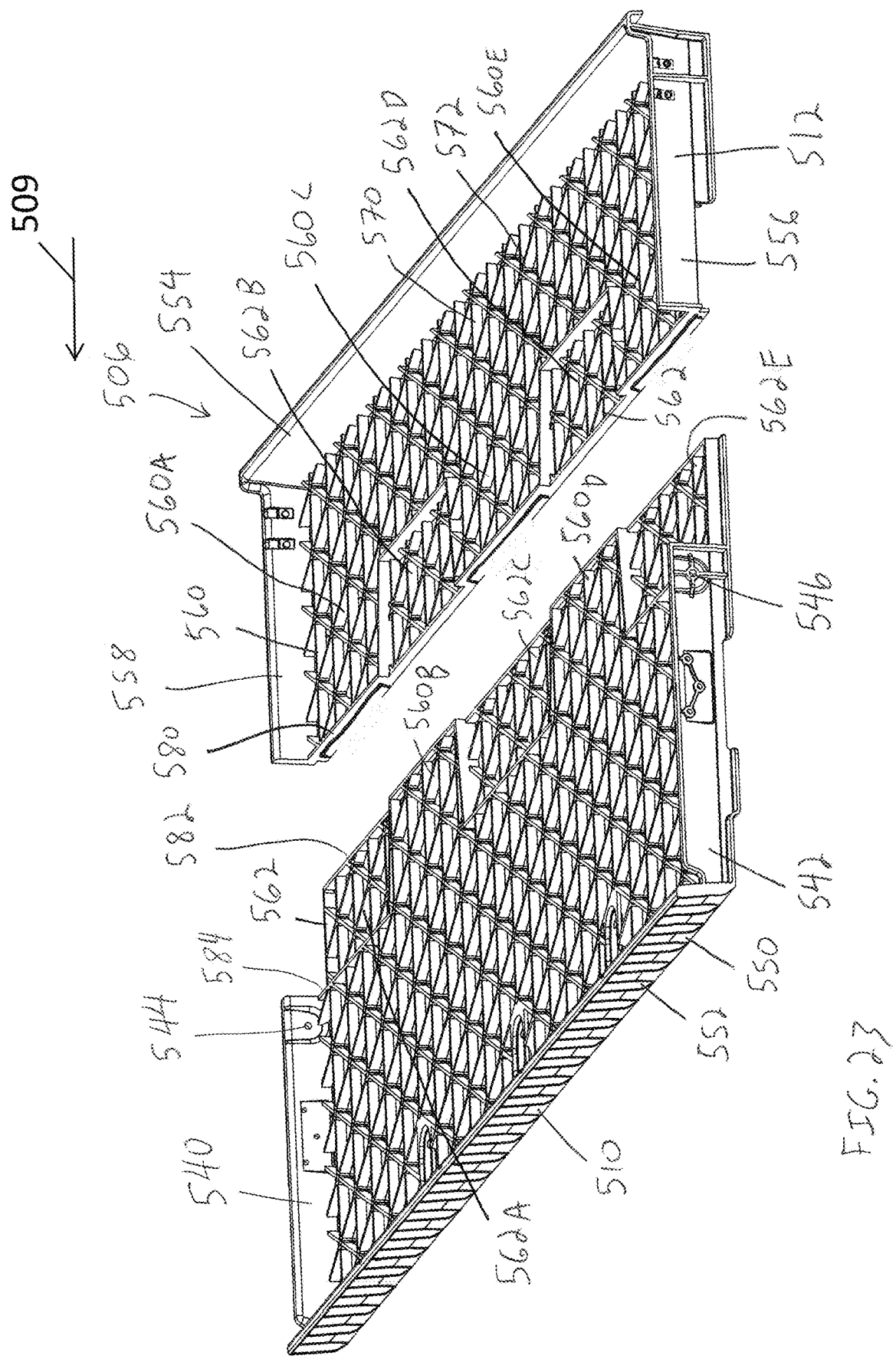
FIG. 23 is a perspective view of the lattice support of FIG. 22 showing upper and lower portions of the lattice support front and rear portions that interlace to support the weight of a mattress and user on the lattice support.

Regarding FIG. 23, the lattice support front portion 510 includes side walls 540, 542 that may include openings 544, 546 for receiving fasteners to connect the side walls 540, 542 to the end caps 40, 42. In other approaches, the side walls 540, 542 may include interlocking features with the end caps 40, 42, as some examples. The lattice support front portion 510 also includes a front wall 550 having ribs 552 and is similar to the front wall 160 of the lattice support 70 discussed above. The lattice support rear portion 512 includes a rear wall 554 extending between side walls 556, 558 of the lattice support rear portion 512.

Figure 24:
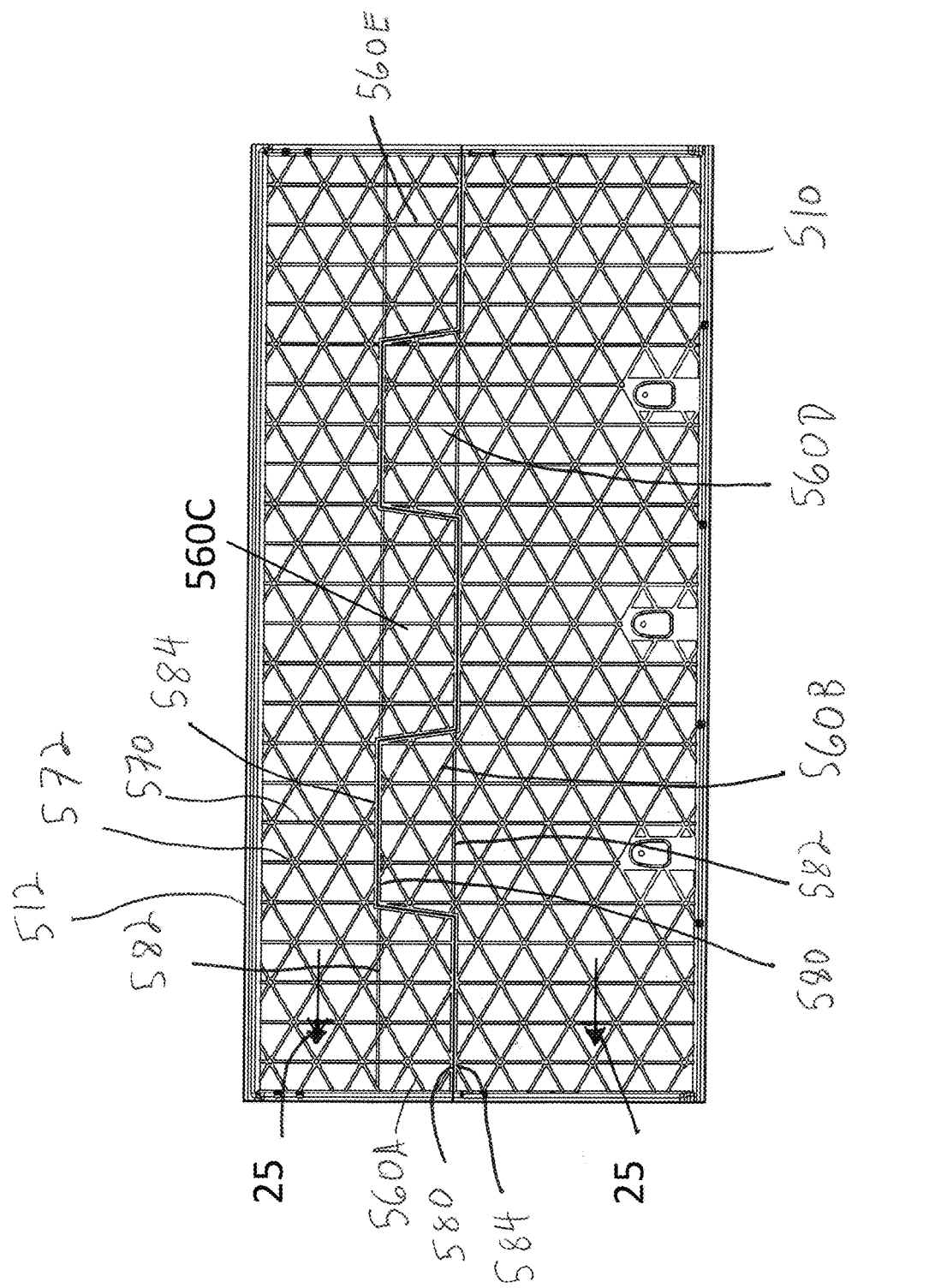
FIG. 24 is a top plan view of the lattice support of FIG. 22 showing the laced portions of the lattice support.

Regarding FIGS. 23, 24, the interface 514 between the lattice support front and rear portions 510, 512 includes one or more upper portions 560 that rest upon one or more lower portions 562 to transfer the shared loading between the lattice support front and rear portions 510, 512. The lattice support front and rear portions 510, 512 have upper surfaces 609A, 609B to support a mattress resting, either directly or indirectly, on the lattice support front and rear portions 510, 512. The lattice support front portion 510 includes upper portions 560B, 560D that overlap with lower portions 562B, 562D of the lattice support rear portion 512. Likewise, the lattice support rear portion 512 includes upper portions 560A, 560C, 560E that overlap with lower portions 562A, 562C, 562E of the lattice support front portion 510. The lattice support front and rear portions 510, 512 may be connected by sliding the lattice support rear portion 512 in direction 509 until the upper and lower portions 560, 562 overlap. The front and rear portions 510, 512 may each include one or more slots between the upper and lower portions of the front and rear portions 510, 512 to facilitate nesting of the upper and lower portions of the front and rear portions 510, 512. The lattice support front and rear portions 510, 512 may be secured together using a variety of approaches, such as metal u-nuts on one of the portions 510, 512 that receive screws from the other of the portions 510, 512.

Further, the lattice support front and rear portions 510, 512, include lattice members 570 connected by vertices 572. The upper portions 560 include an upper end wall 580, the lower portions 562 include a lower end wall 582, and an intermediate end wall 584. The upper end wall 580 abuts against the intermediate end wall 584 with the upper portion 560A overlapping the lower portion 562A. The lower end wall 582 of the lower portion 562A extends below the lattice members 570 of the upper portion 560A and supports the undersides thereof. In this manner, the upper and lower portions 560A, 562A of the lattice support front and rear portions 510, 512 provide a laced arrangement of the upper portions 560 of the lattice support front and rear portions 510, 512 as shown in FIG. 24.

Figure 25:
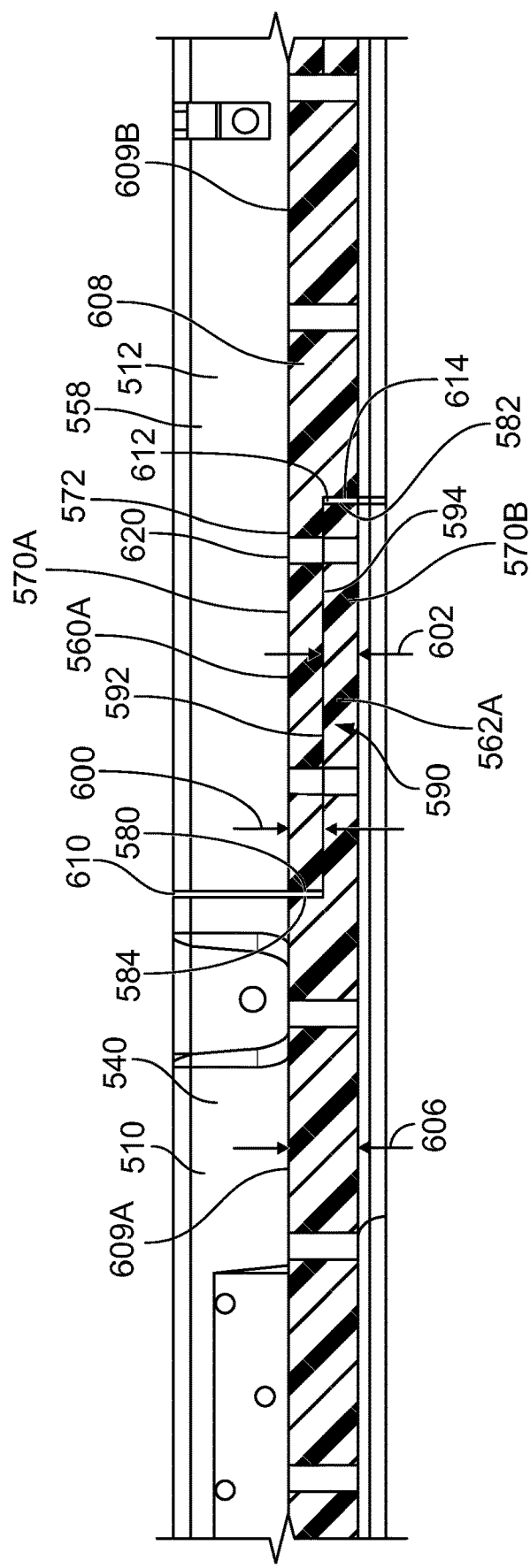
FIG. 25 is a cross-sectional view taken across line 25-25 in FIG. 24 showing a lap joint between an upper portion of the lattice support front portion and a lower portion of the lattice support rear portion.

Regarding FIGS. 24 and 25, the upper portion 560A of the lattice support rear portion 512 is shown forming a lap joint 590 with the lower portion 562A of the lattice support front portion 510. The upper portion 560 includes the lattice members 570A having lower surfaces 592 that contact upper surfaces 594 of lattice members 570B of the lower portion 562A. The upper portion 560A has a thickness 600, and the lower portion 562 has a thickness 602. With the upper and lower portions 560A, 562A overlapping, the overall thickness of the upper and lower portions 560A, 562A is approximately equal to the thickness 606 of the body portion 608 of the lattice structure front and rear portions 510, 512. Further, there may be a gap 610 between the intermediate end wall 584 and the upper end wall 580 as well as a gap 612 between the lower end wall 582 and a recessed end wall 614 of the lattice support rear portion 512. The gaps 610, 612 may accommodate variation in manufacturing of the lattice support front and rear portions 510, 512. In other embodiments, the walls 580, 584 and 582, 614 are abutting. With the lattice support front and rear portions 510, 512 connected, openings 620 of the vertices 572 of the upper and lower portions 560A, 562A are coaxially aligned. This may permit a fastener to be inserted through the aligned opening 620 and connect a component, such as the exterior panel 520, to the lattice support 506.

Figure 26:
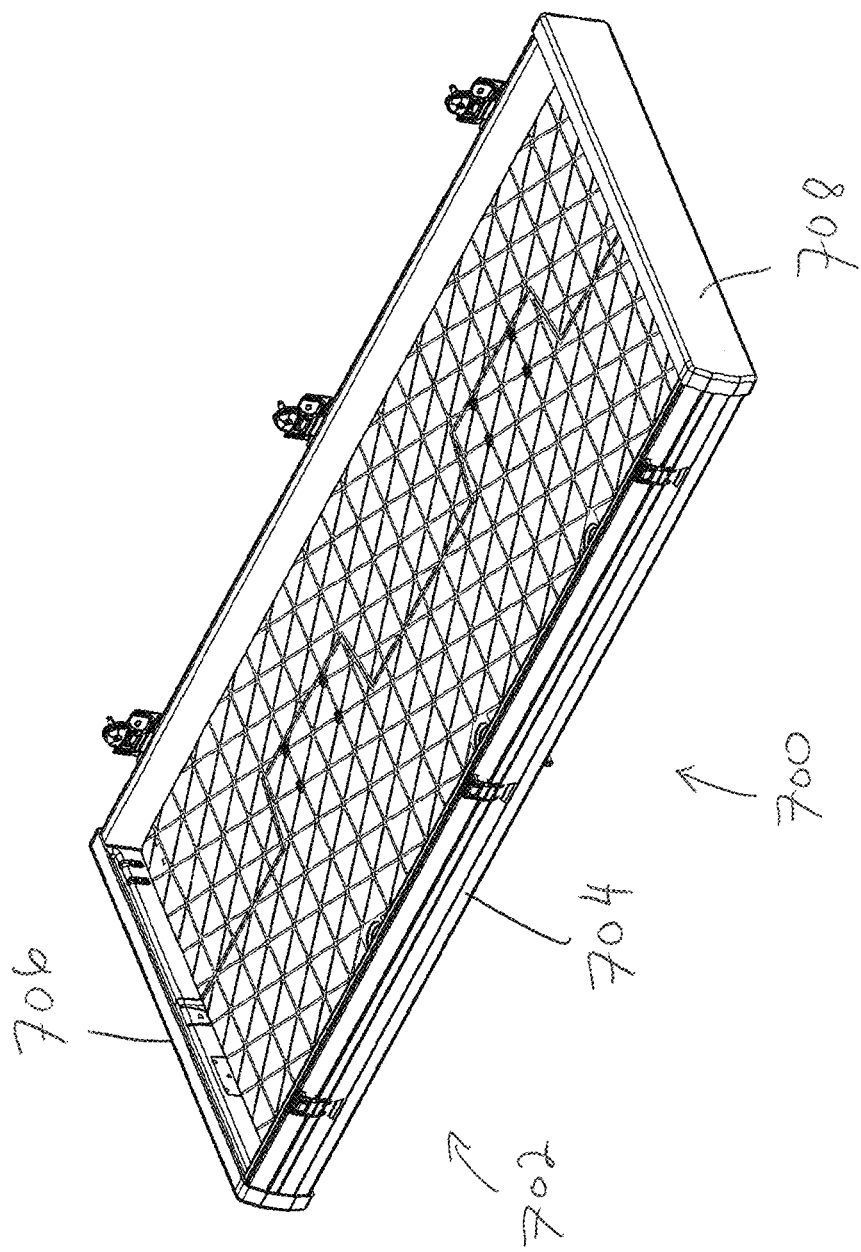
FIG. 26 is a perspective view of another lower bunk showing a frame of the lower bunk including end caps connected to opposite ends of a rail.
Figure 27:
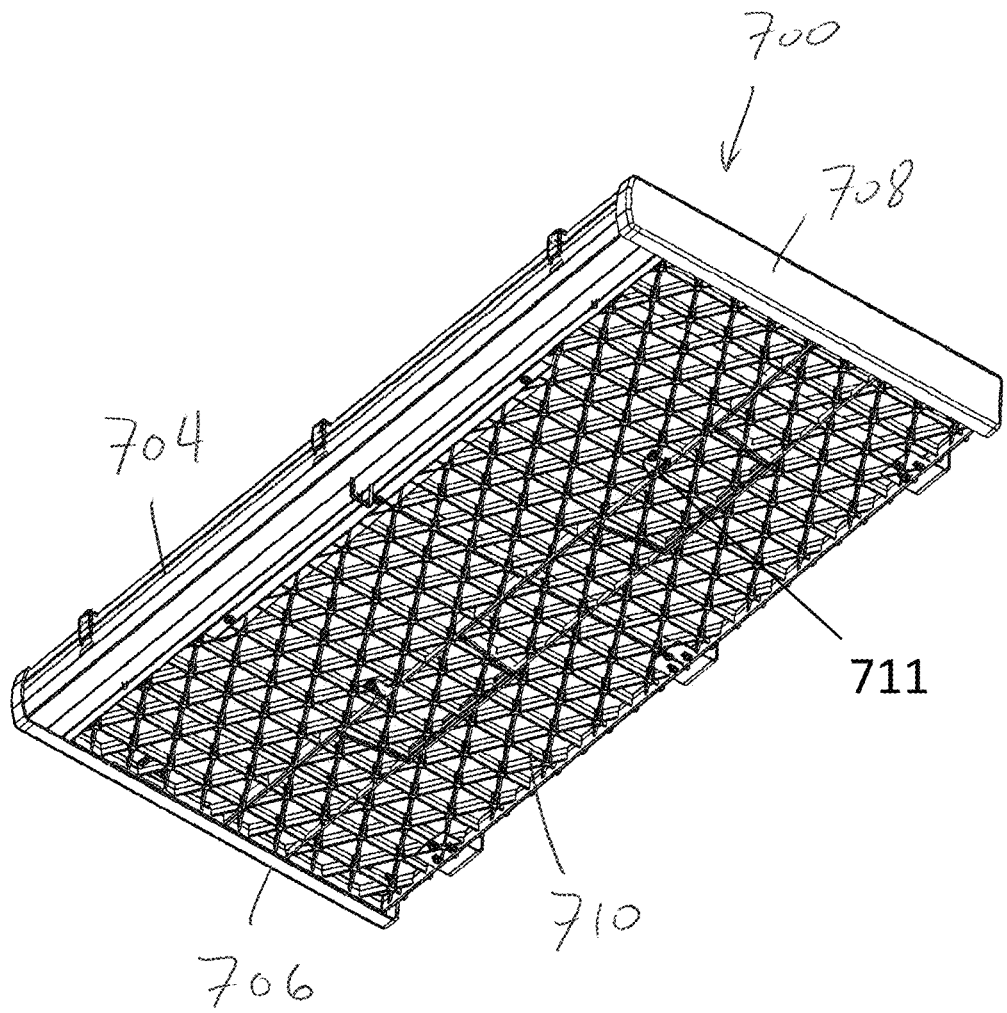
FIG. 27 is a bottom perspective view of the lower bunk of FIG. 26 showing a two-part lattice support of the lower bunk.

Regarding FIG. 26, a lower sleeper bunk 700 is provided that is similar in many respects to the lower sleeper bunk 16 discussed above. The lower sleeper bunk 700 includes a frame 702 having a rail 704 and end caps 706, 708. The lower sleeper bunk 700 is different than the lower sleeper bunk 16 discussed above in that the lower sleeper bunk 700 does not include an exterior panel like the exterior panel 520 discussed above. Rather, a lattice support 710 of the lower sleeper bunk 700 is visible from below as shown in FIG. 27. The lower sleeper bunk 700 also includes one or more mounts 711 each having a ball joint that connects with a strut of a bulkhead below the lower sleeper bunk 700. The lower sleeper bunk 700 may be pivoted upward from a horizontal, operative position to provide access to the interior of the bulkhead and the struts assist in lifting the lower sleeper bunk 700.

Figure 29:
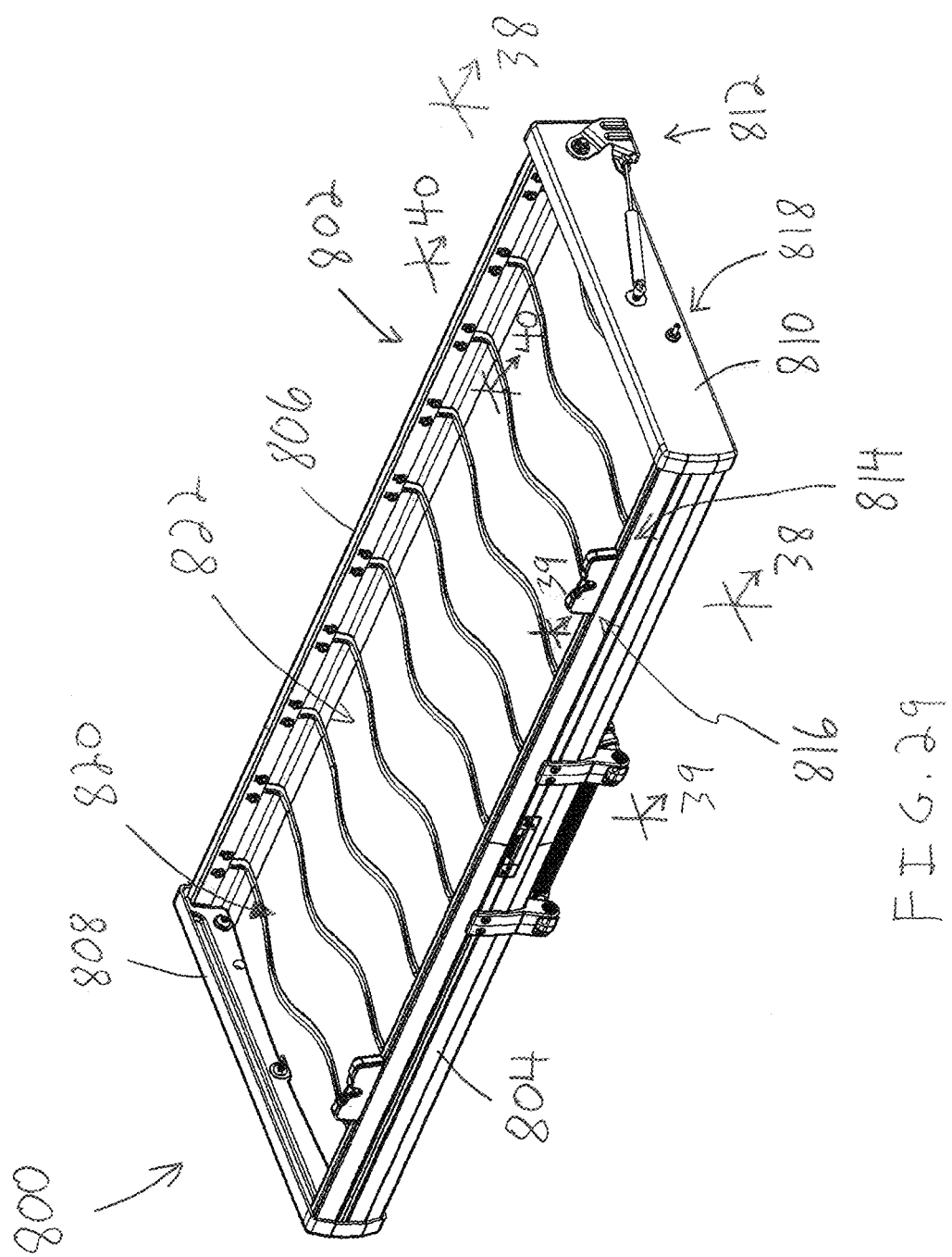
FIG. 29 is a top perspective view of an upper sleeper bunk showing a frame of the upper sleeper bunk extending about a recess for receiving a mattress.

Regarding FIG. 29, an upper sleeper bunk 800 is provided that is similar in many respects to the sleeper bunks discussed above such that differences will be highlighted. The upper sleeper bunk 800 includes a frame 802 extending about a recess 820 and including a longitudinal frame member, such as a front rail 804, and another longitudinal frame member, such as a rear rail 806. The frame 802 further includes end caps 808, 810 that cover the ends of the front and rear rails 804, 806.

The upper sleeper bunk 800 further includes one or more lateral supports, such as support members 822, extending intermediate the front and rear rails 804, 806. In one embodiment, the support members 822 span the distance between the front and rear rails 804, 806. A mead board and mattress may be received in the recess 820 on the support members 822. The support members 822 transfer the weight of the mead board, mattress, and user to the front and rear rails 804, 806.

In one embodiment, the support members 822 each have a body 944 (see FIG. 33) having a unitary, one-piece construction. The body 944 may be made of a plastic material, and may be made using an injection molding process. Regarding FIG. 34, each support member 822 includes one or more beam portion, such as beam portions 854, 856 and one or more web portions, such as web portion 858, extending from the beam portions 854, 856. The beam portions 854, 856 are thicker in the vertical direction than the web portion 858 and may include a tubular wall 1010 (see FIG. 36). The beam portions 854, 856 increase the rigidity of the support members 822 while permitting the support member body 944 to have a relatively thin wall thickness, such as in the range of approximately 3 mm to approximately 4 mm. This reduces the amount of plastic utilized to form each of the support members 822 and may improve the flow of plastic material within the mold. In one approach, the tubular wall 1010 defines a cavity 1012. The cavity 1012 is formed by gas-assist or liquid-assist injection molding. The gas or liquid utilized to form the cavity 1012 provides a secondary effect of cooling the plastic material, which reduces the cycle time required to mold the support members 822.

Regarding FIG. 29, the upper sleeper bunk 800 includes one or more mounts 812 that permit pivoting of the upper sleeper bunk 800 between a stored, vertical position and an open, lower horizontal position. The upper sleeper bunk 800 further includes a latch system 814 having one or more front latch mechanisms 816 and one or more side latch mechanisms 818.

Figure 30:
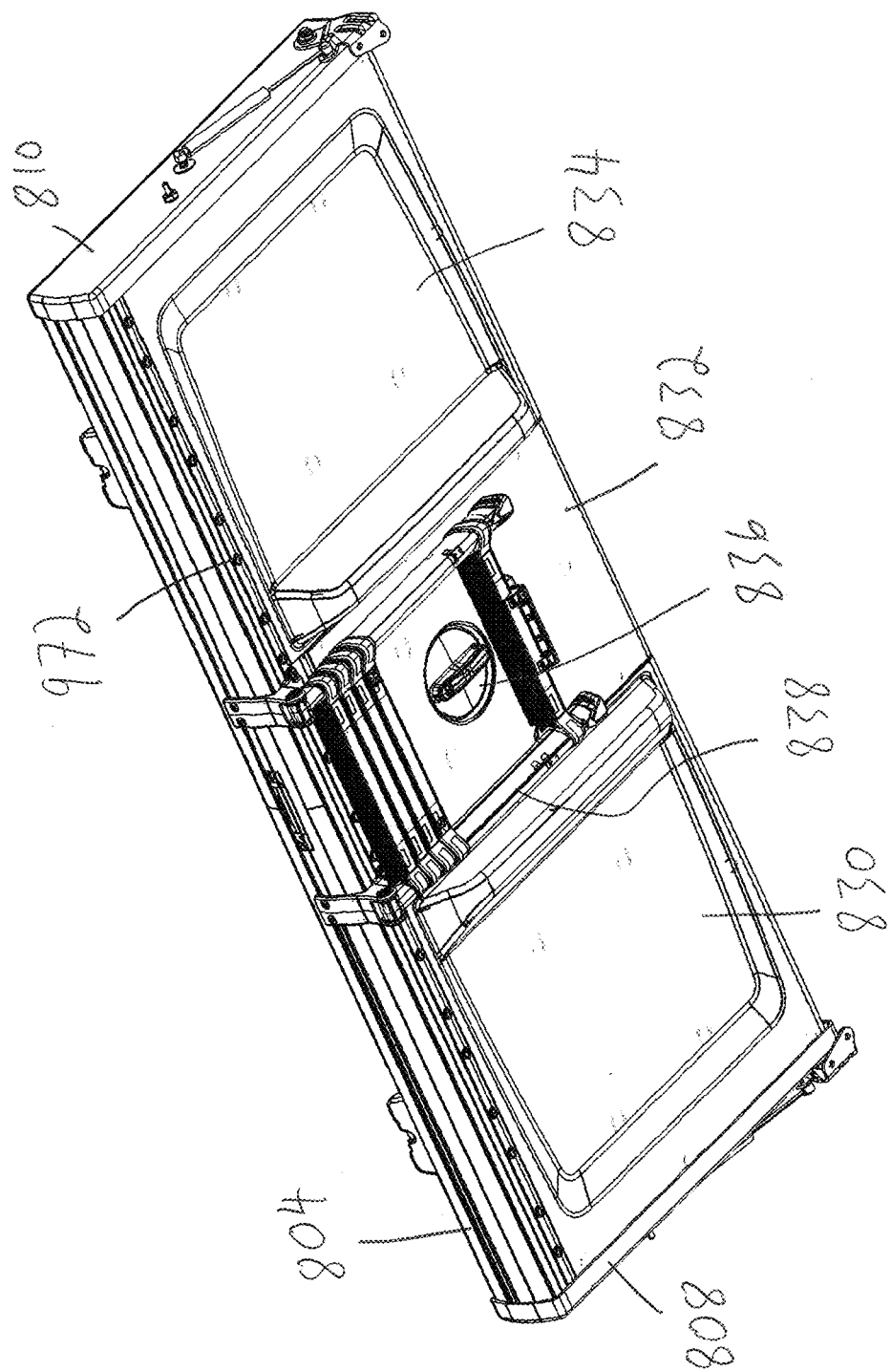
FIG. 30 is a bottom perspective view of the sleeper bunk of FIG. 29 showing exterior panels of the upper sleeper bunk.

Regarding FIG. 30, the upper sleeper bunk 800 includes exterior panels 830, 832, 834 that may include compartments as discussed above. The latch system 814 includes an actuator 836 that a user may manipulate, such as turning, to shift the front and side latch mechanisms 816, 818 between locked and unlocked configurations. The upper sleeper bunk 800 may also include a ladder 838 that may pivot downward to permit a user to climb into the upper sleeper bunk 800.

Figure 31:
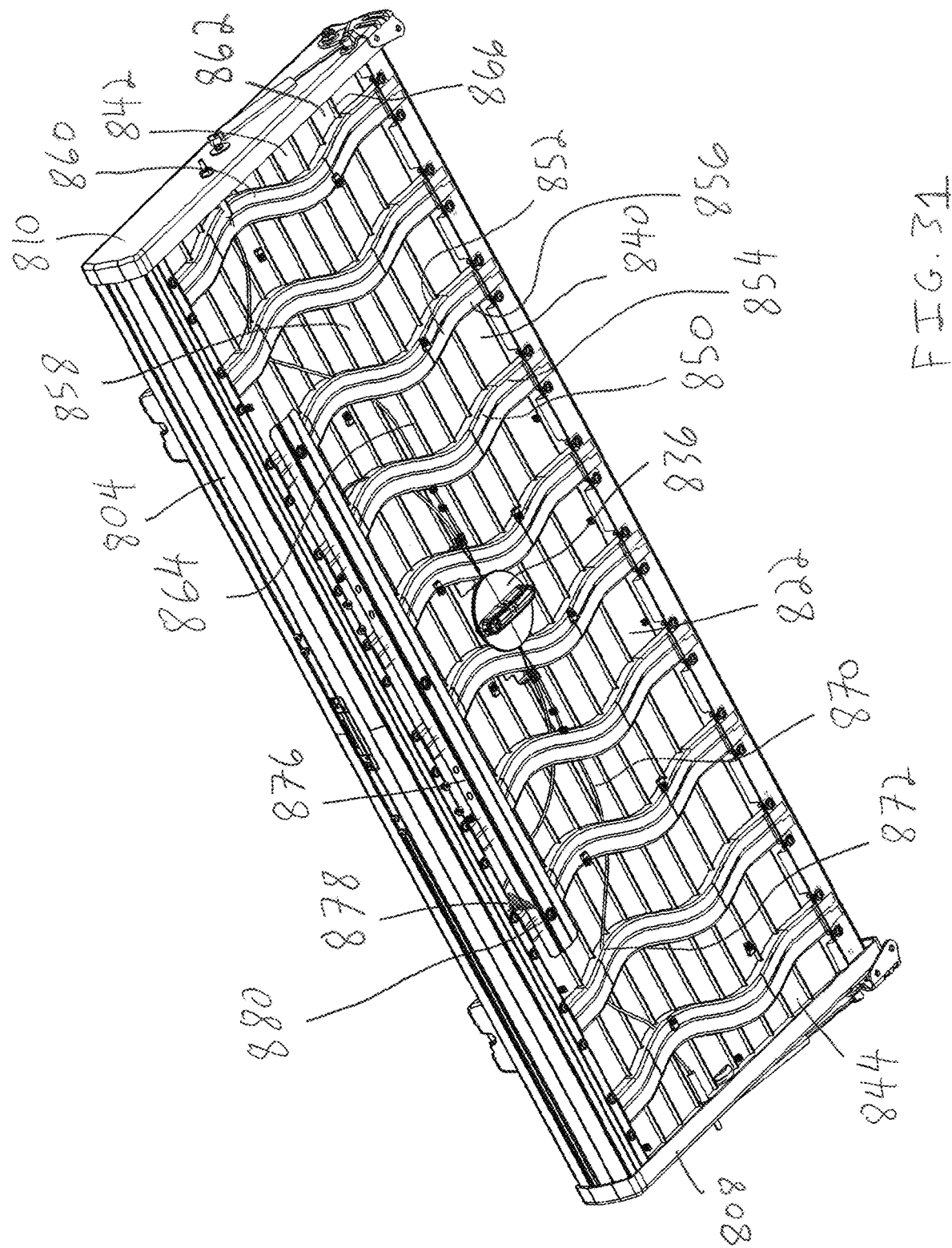
FIG. 31 is a bottom perspective view similar to FIG. 30 with the exterior panels and the ladder of the upper sleeper bunk removed to show a safety restraint bracket and an actuator of the upper sleeper bunk.

Regarding FIG. 31, the support members 822 include one or more intermediate support members 840 that may be identical and one or more end support members 842, 844 that may be mirror images of one another. The intermediate support members may include side portions 850, 852 that engage adjacent intermediate support members 840 or the adjacent end support member 842, 844. The intermediate support members 840 further include one or more reinforcing portions, such as the beam portions 854, 856, and the web portion 858 extending longitudinally between the beam portions 854, 856. The beam portions 854, 856 provide rigidity to the intermediate support members 840 and the web portions 858 provide a surface area to support a portion of the mead board and/or mattress. Similarly, the end support members 842, 844 include a beam portion 860 that is similar to the beam portions 854, 856 and a web portion 862 similar to the web portion 858. In one embodiment, the intermediate support members 840 include strengthening ribs 864 that project downwardly from and extend along the undersides of the web portions 858. Likewise, the end support members 842, 844 may include ribs 866 projecting downward from and extending along the underside of the web portions 862.

Regarding FIG. 31, the latch system 814 may include one or more latch cable assemblies 870 that are routed through or around the support members 822. In one embodiment, one or more of the latch cable assemblies 870 extend through openings 872 in the beam portions 854, 856 and/or 860.

In one embodiment, the upper sleeper bunk 800 includes a safety restraint, similar to the safety restraint 80 shown in FIG. 3. Regarding FIG. 31, the upper sleeper bunk 800 includes a safety restraint bracket 876 that includes anchor portions 878 that receive nut inserts 880. The safety restraint has bolts that each extend through an opening (not shown in FIG. 33) of the intermediate support members 822 and engage the nut inserts 880. The safety restraint bracket 876 may be secured to the underside of one or more of the support members 822 via one or more fasteners, as one example.

Figure 32:
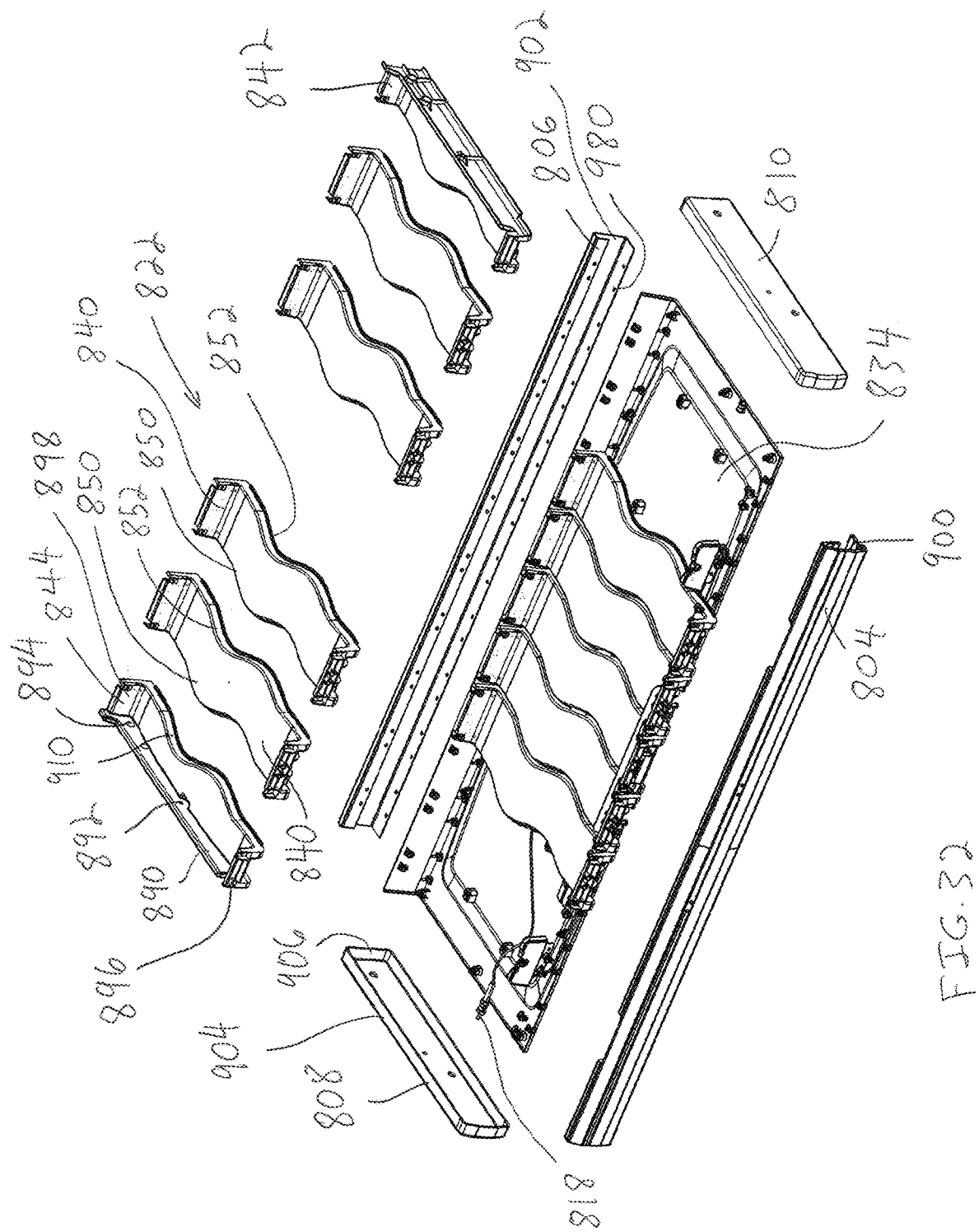
FIG. 32 is an exploded view of portions of the upper sleeper bunk of FIG. 29 showing a front rail and a rear rail of the frame and support members for extending laterally between the front and rear rails.

Regarding FIG. 32, the end support members 842, 844 each include an end wall 890 with openings 892, 894 to mounting hardware of the mounts 812. The mounts 812 are rigidly secured to the end support members 842, 844. The end support members 842, 844 operate as a primary structural connection between the mounts 812 and the front and rear rails 804, 806. The front and rear rails 804, 806 thereby transfer loading from the intermediate support members 840 to the mounts 812 via the end support members 842, 844. The end support members 842, 844 each include a front projection, such as a front wall 896, and a rear projection, such as a rear wall 898, that are received respectively in channels or recesses 900, 902 of the front and rear rails 804, 806. The front and rear walls 896, 898 are configured to form a mating engagement with the front and rear rails 804, 806 and resist pull-through from within the recesses 900, 902. Further, the front and rear rails 804, 803 connect the support members 822 together, strengthen the construct, and operate as a pair of structural backbones of the upper sleeper bunk 800.

The end caps 808, 810 each include a skirt 904 extending about a recess 906 that receives the end wall 890 of one of the end support members 842, 844. The end caps 808, 810 cover the interfaces between the end support members 842, 844 and the front and rear rails 804, 806. The end caps 808, 810 also include openings to permit hardware associated with the side latch mechanism 818 and mount 812 to pass therethrough.

As shown in FIG. 32, the intermediate support members 840 include a side portion 850 that mates with a side portion 852 of an adjacent intermediate support member 840. Likewise, the end support members 842 include side portions 910 that mate with the side portion 850 or 852 of the adjacent intermediate support member 840. The side portions 850, 852, 910 have a sinusoidal or undulating profile that interlocks and forms a rigid, load-sharing construct of the support members 822.

Figure 33:
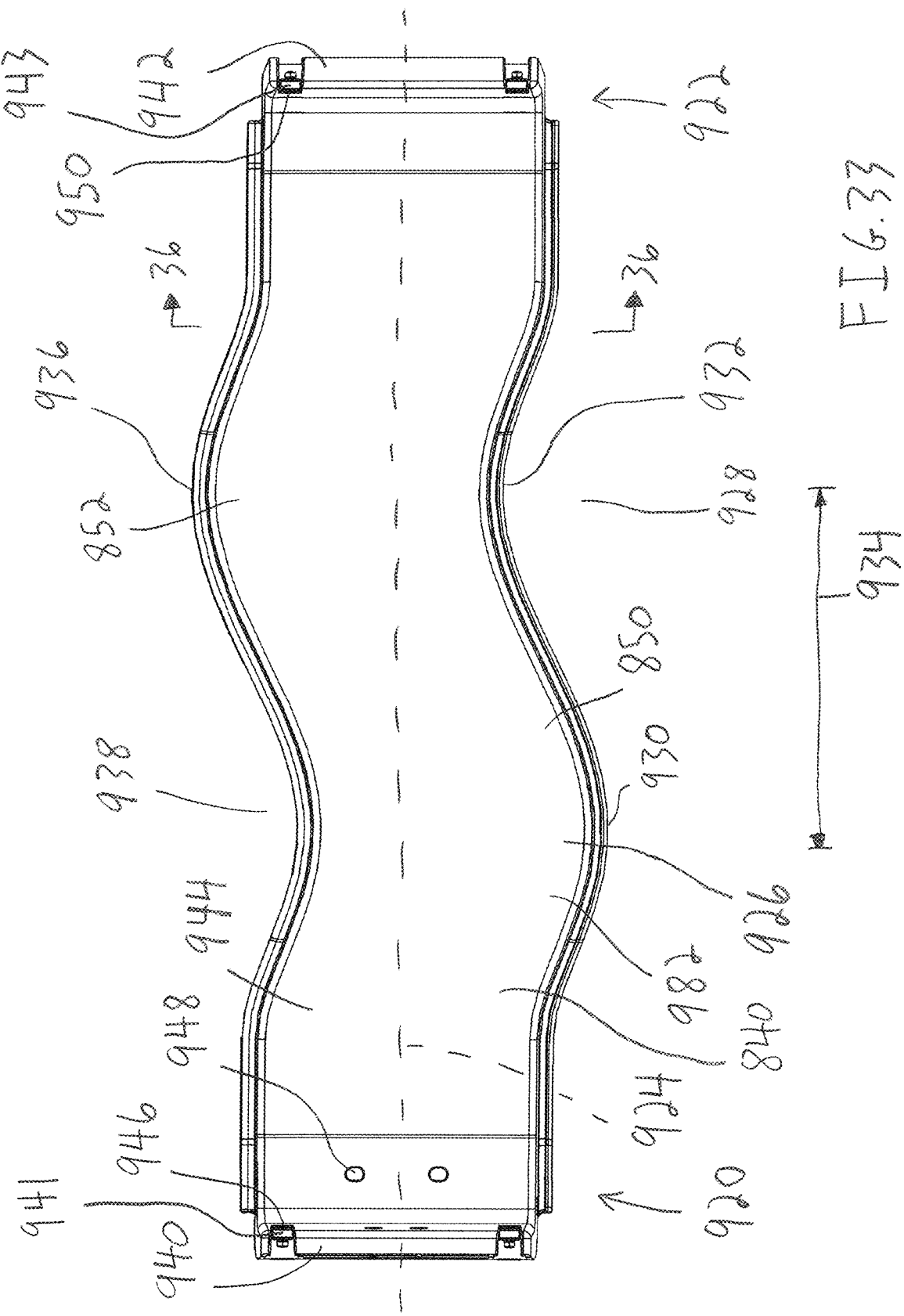
FIG. 33 is a top plan view of an intermediate support member of FIG. 32 showing a sinusoidal shape of the intermediate support member.

Regarding FIG. 33, in one embodiment each intermediate support member 840 has a body 944 with a unitary, one-piece construction. The intermediate support members 840 are made of a plastic material, such as an injection molded plastic. The body 944 has one or more connecting portions for securing the body 944 to the front and rear rail 804, 806. The connecting portions may carry thereon clips, such as resilient metal clips, that receive fasteners for securing the connecting portions of the body 944 to the front and rear rails 804, 806. Likewise, the end support members 842, 844 may each have a body with a one-piece construction that may be made of a plastic material and include one or more connecting portions that carry thereon metal clips that receive fasteners for securing the end support members 842, 844 to the front and rear rails 804, 806. In other embodiments, the body 944 of the support member 940 and the bodies of the end support members 842, 844 may include one or more assembled components.

Regarding FIG. 33, the intermediate support member 840 includes a front end portion 920, a rear end portion 922, and a longitudinal axis 924 extending therebetween. The side portion 850 includes a protrusion 926 and a recess 928 with a peak 930 and a valley 932 thereof being separated by a distance 934 which is less than half of the overall length of the intermediate support member 840. Likewise, the side portion 852 includes a protrusion 936 and a recess 938. The front end portion 920 includes a front protrusion, such as a front wall 940, and the rear end portion 922 includes a rear protrusion, such as a rear wall 942. The front and rear walls 940, 942 are configured to form mating connections in the recesses 900, 902 of the front and rear rails 804, 806.

The front wall 940 includes one or more openings 946 that receive fasteners to connect the front wall 940 to the front rail 804. The front wall 940 includes clips 941 having plate portions on opposite sides of a portion of the front wall 940 that permit a fastener to extend through the opening 946 of the front wall 940 and secure the front wall 940 to the front rail 804. The plate portions of the clips 941 provide metal surfaces for the fastener, which may also be metal, to contact. Further, the rear wall 942 includes one or more openings 950 to receive fasteners for connecting the rear wall 942 to the rear rail 806. The rear wall 942 includes clips 943 similar to the clips 941.

The body 944 further includes one or more openings 948 to receive fasteners of a bracket of the ladder 838. In one embodiment, the intermediate support members 840 are identical. Because the intermediate support members 840 are identical, all of the intermediate support members 840 are configured to be connected to the ladder 838 even though only two of the intermediate support members 840 are actually connected to the ladder 838 when the front sleeper bunk 800 is assembled.

Figure 34:
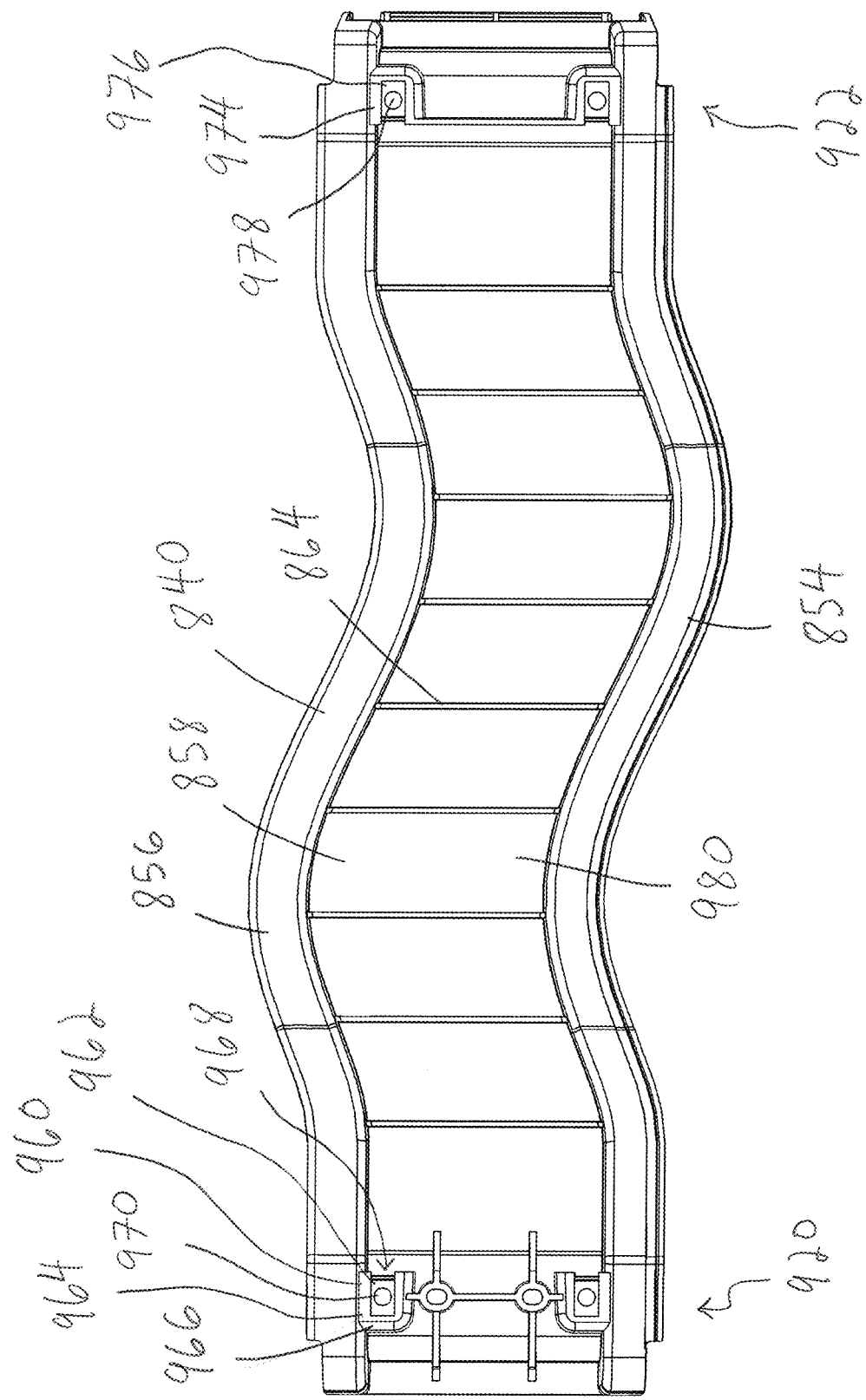
FIG. 34 is a bottom plan view of the intermediate support member of FIG. 33 showing beam portions extending along opposite sides of the intermediate support member and a web portion extending between the beam portions.

Regarding FIG. 34, the intermediate support member 840 includes the beam portions 854, 856 extending between the front end portion 920 and the rear end portion 922. The intermediate support member 840 includes transverse reinforcements, such as the ribs 864, extending between the beam portions 854, 856. The front end portions 920 includes one or more connecting portions, such as doghouses 960, and fastener receiving elements such as clips. The term doghouse is used herein to refer to a substantially box-shaped structure having one wall of the box missing or an opening formed in one of the walls of the box. The box-shaped doghouse has an inner void that may be utilized, for example, to receive a shank of a fastener. The missing wall or opening of the doghouse may be formed during molding of the intermediate support member body 944 by a portion of the mold that shifts during molding. It is intended that the opposing walls of the doghouse may be parallel or may be inclined relative to each other.

The clips of the doghouse 960 may be metal clips 962 that are connected to a bottom wall 964 of the doghouse 960. The doghouses 960 further includes one or more side walls 966 that extend vertically, which may be normal to the page in FIG. 34 or inclined relative to normal, and space the bottom wall 964 from the web portion 858. The doghouses 960 each have a recess 968 within the doghouse 960 for receiving a shank of a fastener. Further, the doghouse 960 and metal clip 962 therein define a through opening 970 for receiving a fastener that extends through one of the openings 972 (see FIG. 30) of the front rail 804 to connect the bottom of the front end portion 920 of the intermediate support member 840 to the front rail 804.

Likewise, the rear end portion 922 of the intermediate support member 840 includes one or more connecting portions, such as doghouses 974, that each receive a clip 976. The doghouses 974 and clips 976 form a through opening 978 that receives a fastener extending through an opening 980 (see FIG. 32) of the rear rail 806 to connect the bottom of the rear end portion 922 of the intermediate support member 840 to the rear rail 806. The intermediate support member 840 is shown with a pair of doghouses 960 and openings 946 at the front end portion 920 and a pair of doghouses 974 and openings 950 of the rear end portion 922. In other embodiments, the front and rear end portions 920, 922 of the intermediate support members 840 may each include any number (e.g., 1, 3, 4) dog houses and openings or other structures as appropriate.

Figure 35:
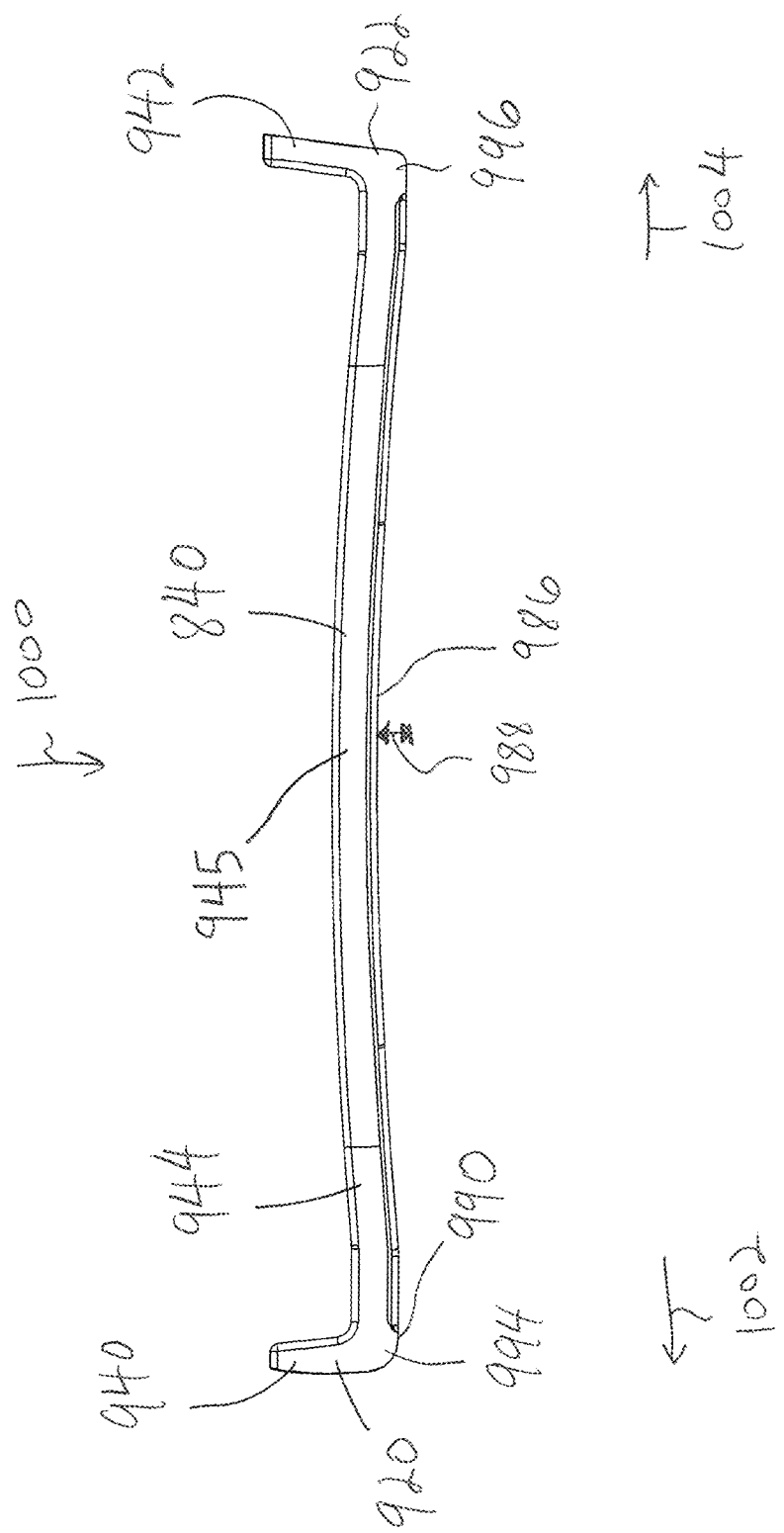
FIG. 35 is a side elevational view of the intermediate support member of FIG. 33 showing an arched profile of the intermediate support member.

Regarding FIGS. 33 and 34, the body 944 includes a lower surface 980 and an upper surface 982 opposite the lower surface 980. The upper surface 982 may be generally flat, rounded, or have other shapes/structures as appropriate. Regarding FIG. 35, the intermediate support member 840 has a middle portion 945 with an arched configuration such that a lower surface portion 986 near a center of the body 944 is a distance 988 vertically above a lower surface portion 990 of the front end portion 920. The front end portion 920 includes a bend 994 connecting the upright front wall 940 to the middle portion 945 and a bend 996 connecting the upstanding rear wall 942 to the middle portion 945. Regarding FIGS. 35, 39 and 40, as a load is applied in direction 1000 upon a mattress in the recess 820, the middle portion 945 may deform slightly, e.g., straighten, and urge the end portions 920, 922 apart in directions 1002, 1004 which tightly engages the bends 994, 996 and/or walls 940, 942 within the recesses 900, 902 of the front and rear rails 804, 806. In other embodiments, the intermediate support member 840 may not have an arched configuration.

Figure 36:
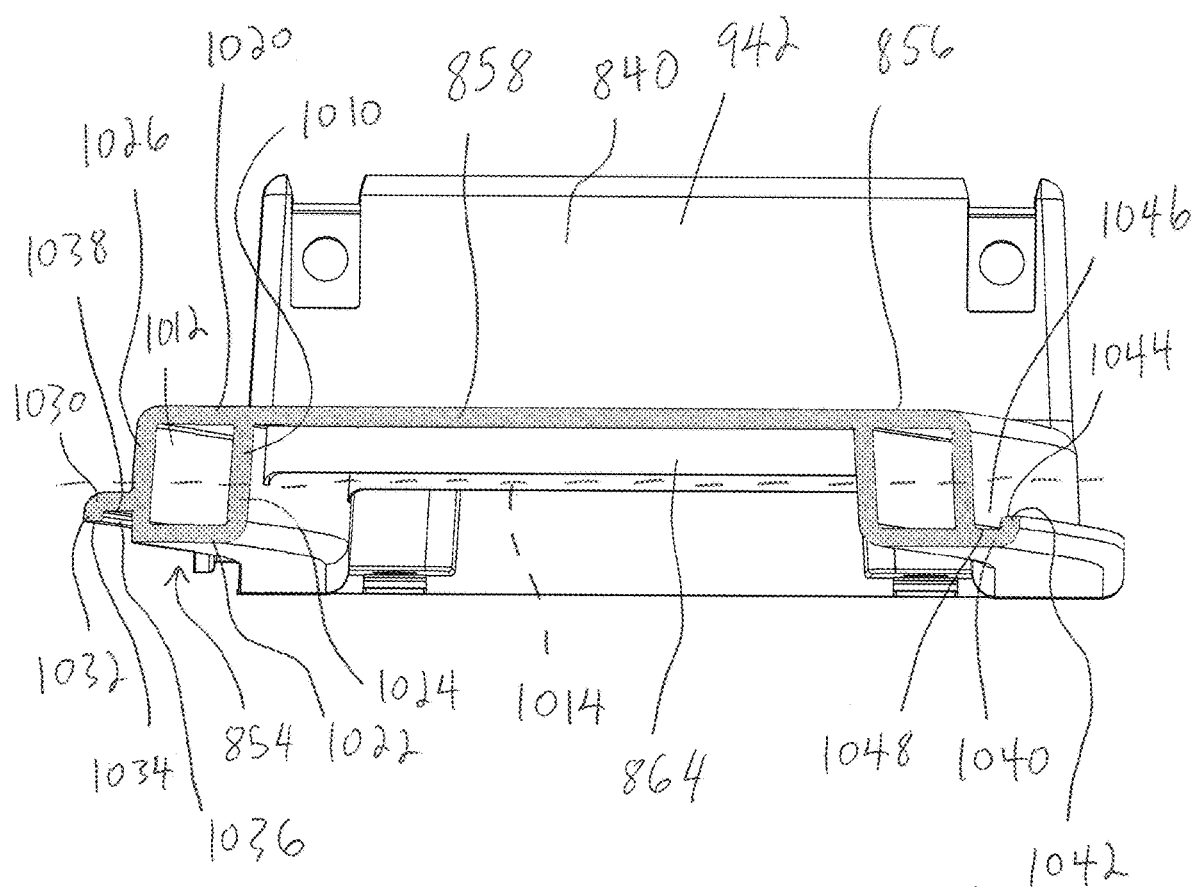
FIG. 36 is a cross-sectional view taken across line 36-36 in FIG. 33 showing a tubular cross-section of the beam portions of the intermediate support member.

Regarding FIG. 36, in one embodiment, the beam portions 854, 856 include the tubular wall 1010 extending about the cavity 1012. The cavity 1012 may be formed by gas-assist or water-assist injection molding. The use of gas- or water-assisted injection molding to form the intermediate support member 840 may decrease cycle time required to mold the body 944 of the intermediate beam portion 840 because the gas or water cools the material of the intermediate support member 840 within the mold. Further, the tubular wall 1010 increases the moment of inertia of the intermediate support member 840 at the opposite sides of the intermediate support member 840 about a neutral axis 1014. Due to the larger moment of inertia, the beam portions 854, 856 are more resistant to bending as a load is applied downward in direction 1000 (see FIG. 35) onto the intermediate support member 840.

In one embodiment, the tubular side wall 1010 includes an upper wall 1020, lower wall 1022, an inner wall 1024, and an outer wall 1026. The inner and outer walls 1022, 1024 extend vertically away from the neutral axis 1014 which positions material farther away from the neutral axis 1014 and increases the moment of inertia of the beam portion 854. Further, the upper wall 1020 and the bottom wall 1022 are spaced vertically away from the neutral axis 1014 which positions additional material away from the neutral axis 1014 and further increases the rigidity of the beam portion 854.

The beam portions 854, 856 provide strength for the intermediate support member 840 to resist bending while minimizing the average wall thickness of the intermediate support member 840. For example, the beam portions 854, 856 may each have an overall height of approximately 30 mm while the average wall thickness of the intermediate support member body 944 is approximately 4 mm.

Regarding FIG. 36, the beam portion 854 further includes a flange 1030 having a downwardly directed lip 1032 with a lower surface 1034 and a recess, such as a channel 1036, having a surface 1038. In an opposite manner, the beam portion 856 includes a flange 1040 having an upwardly directed lip 1042 with an upper surface 1044 and a channel 1046 with an upper surface 1048.

Figure 37:
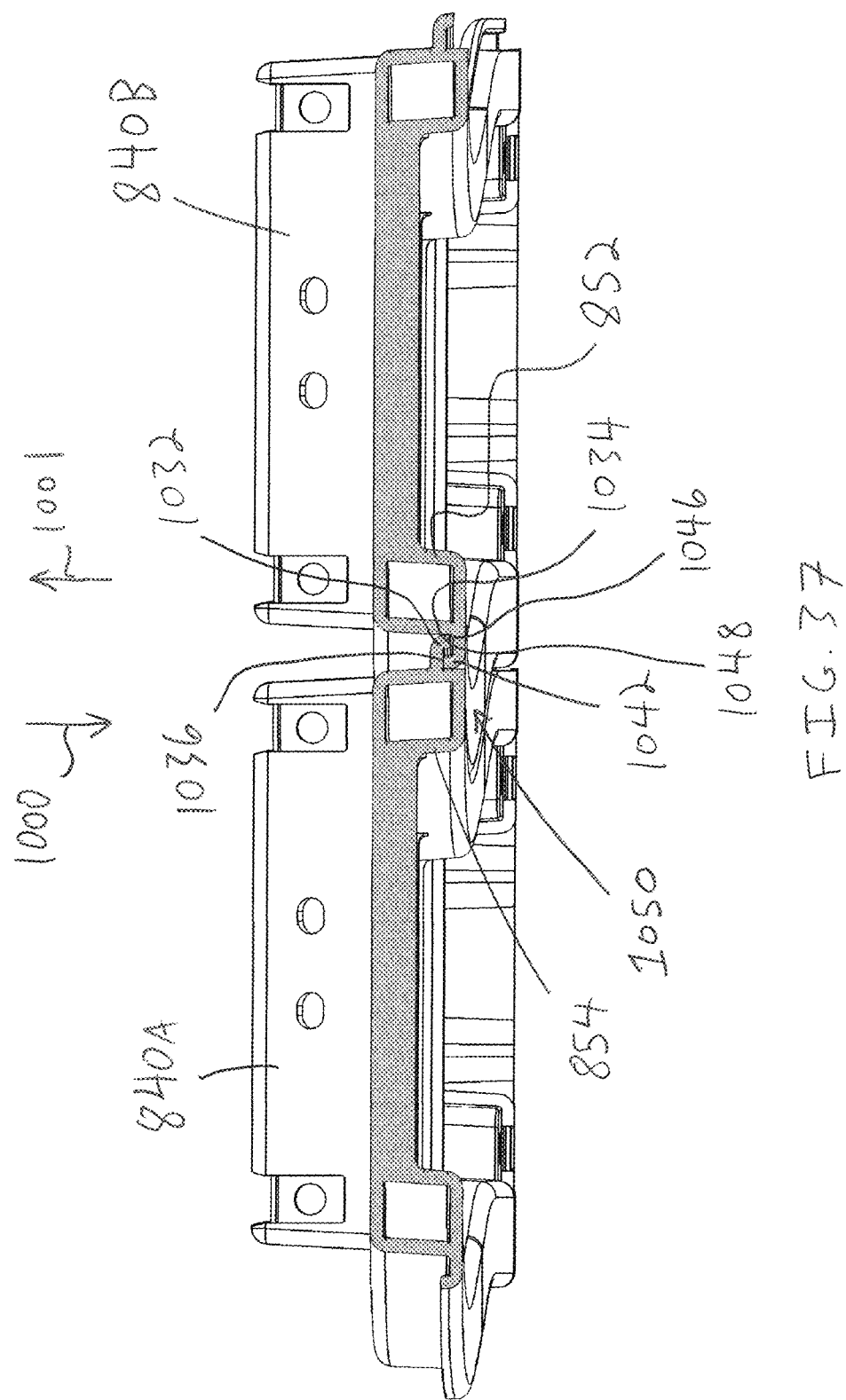
FIG. 37 is a cross-sectional view of a pair of intermediate support members showing flanges of adjacent intermediate support members engaged which distributes load between the support members.

Regarding FIG. 37, a cross-sectional view of two intermediate support members 840A, 840B is provided taken toward the front wall 940 of the intermediate support members 840A, 840B (FIG. 36 was taken toward the rear wall 942). In FIG. 37, the flanges 1030, 1040 of adjacent intermediate support members 840A, 840B form a joint 1050 extending laterally across the upper sleeper bunk 800. Specifically, the downwardly directed lip 1032 of the beam portion 854 is received in the channel 1046 of the beam portion 852 of the intermediate support member 840B and the upwardly directed lip 1042 is received in the channel 1036 of the beam portion 854 of the intermediate support member 840A. The surface 1034 of the downwardly directed lip 1032 is in contact with the surface 1048 of the channel 1046 while the surface 1044 (see FIG. 36) of the upwardly directed lip 1042 is in contact with the surface 1038 of the channel 1036. In this manner, the vertically overlapping flanges 1030, cause a downward load applied in direction 1000 on the intermediate support member 840A to be transferred to the intermediate support member 840B with the intermediate support member 840B applying a reactive force in direction 1001. This load sharing between the intermediate support members 840 as well between the intermediate support members 840 and the end support members 842, 844 distributes loading evenly across the support members 822.

Figure 38:
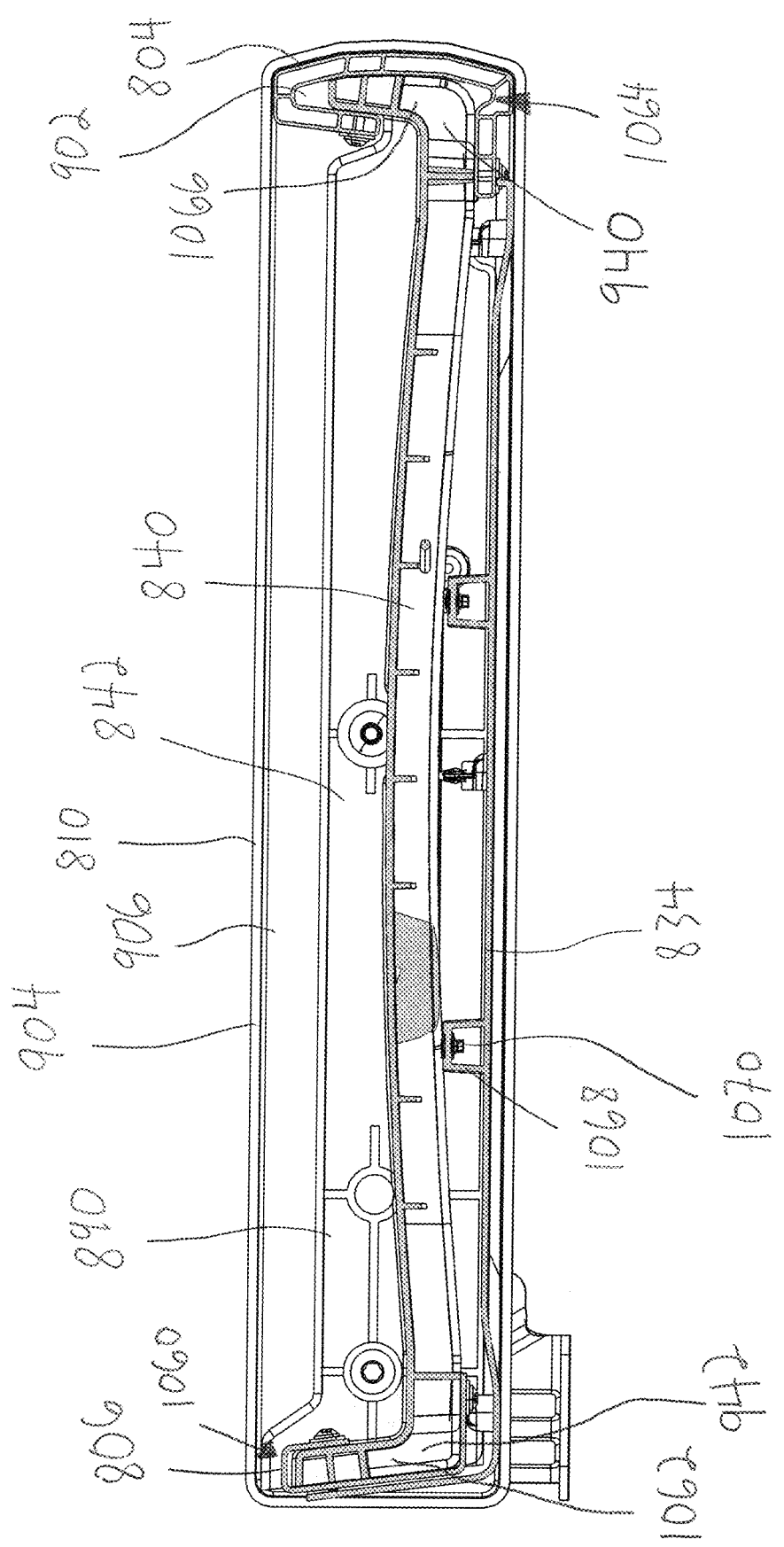
FIG. 38 is a cross-sectional view taken across line 38-38 in FIG. 29 showing a skirt of an end cap of the frame extending about the front rail, rear rail, and end support member.

Regarding FIG. 38, the upper sleeper bunk 800 has an interface 1060 between the rear rail 806 and the rear wall 942 of the intermediate support member 840 and an interface 1064 between the front rail 804 and the front wall 940 of the intermediate support member 840. In one embodiment, the rear wall 942 is slid into the recess 902 of the rear rail 806 and the front wall 940 is slid into the recess 900 of the front rail 804 in a longitudinal direction parallel to the length of the front and rear rails 804, 806.

As shown in FIG. 38, the exterior panels, such as the exterior panel 834, may be connected to the support members 822 via doghouses 1068 of the exterior panel 834. The exterior panels may include one or more fasteners 1070 that are used to connect the doghouses 1068 to the support members 822.

Figure 39:
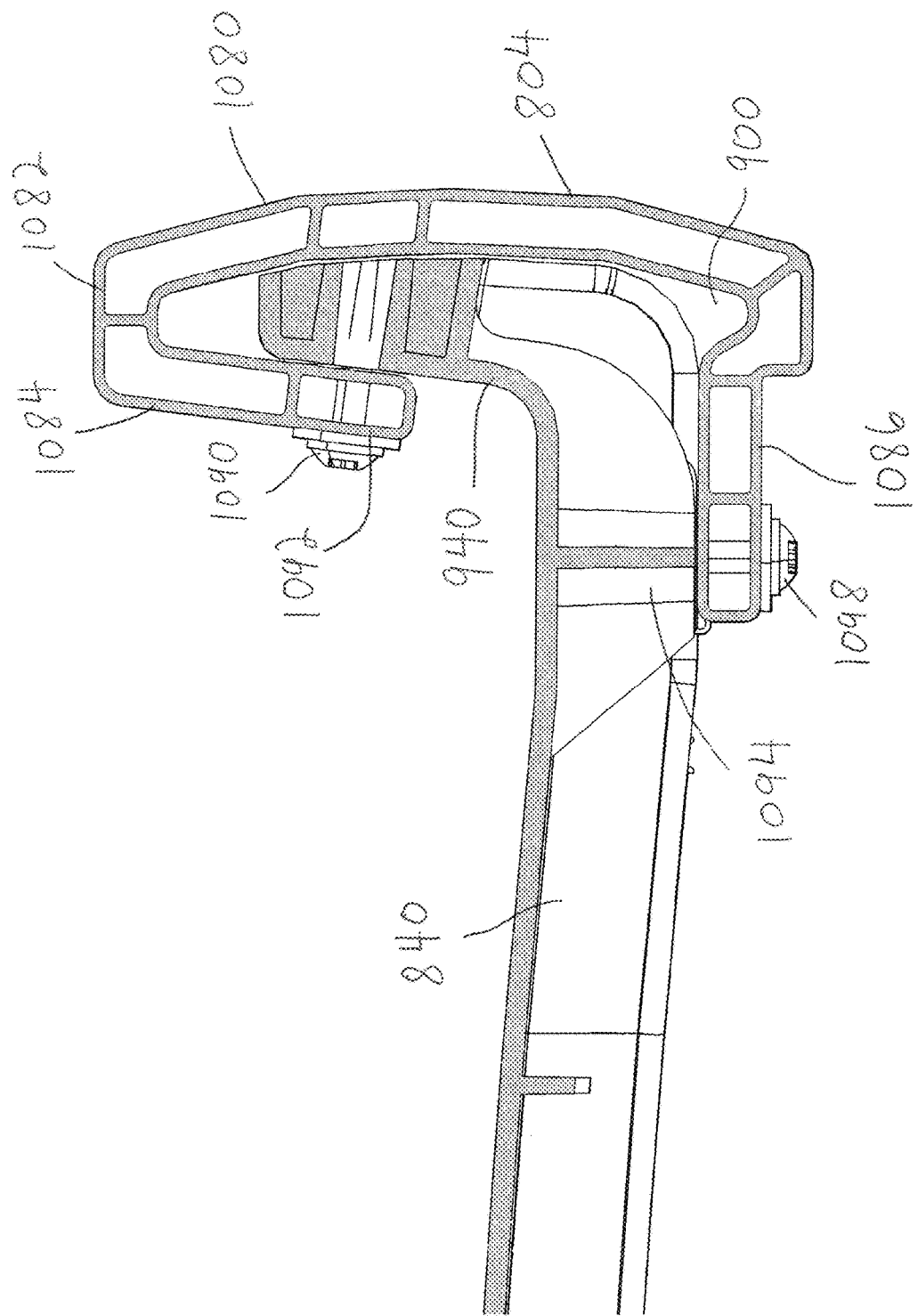
FIG. 39 is a cross-sectional view taken across line 39-39 in FIG. 29 showing a front wall of one of the intermediate support members received in a recess of the front rail.

Regarding FIG. 39, the front rail 804 may include a front wall 1080, an upper wall 1082, a front lip wall 1084 and a lower wall 1086. The front, upper, front lip, and lower walls 1080, 1082, 1084, 1086 may have two-wall configurations as discussed above. The intermediate support member 840 includes a connecting portion, such as a wall having a metal clip 941 (see FIG. 33) carried thereon, that includes the opening 946 for receiving a fastener, such as a screw 1090, that extends through an opening 1092 of the front lip wall 1084 to connect the front wall 940 of the intermediate support member 840 to the front lip wall 1084 of the front rail 804. Further, the support member 840 includes connecting portions 1094 that include the front doghouses 960 (see FIG. 34), metal clips 962, and openings 970 which receive fasteners, such as screws 1098 to secure the intermediate support member 840 to the lower wall 1086 of the front rail 804.

Figure 40:
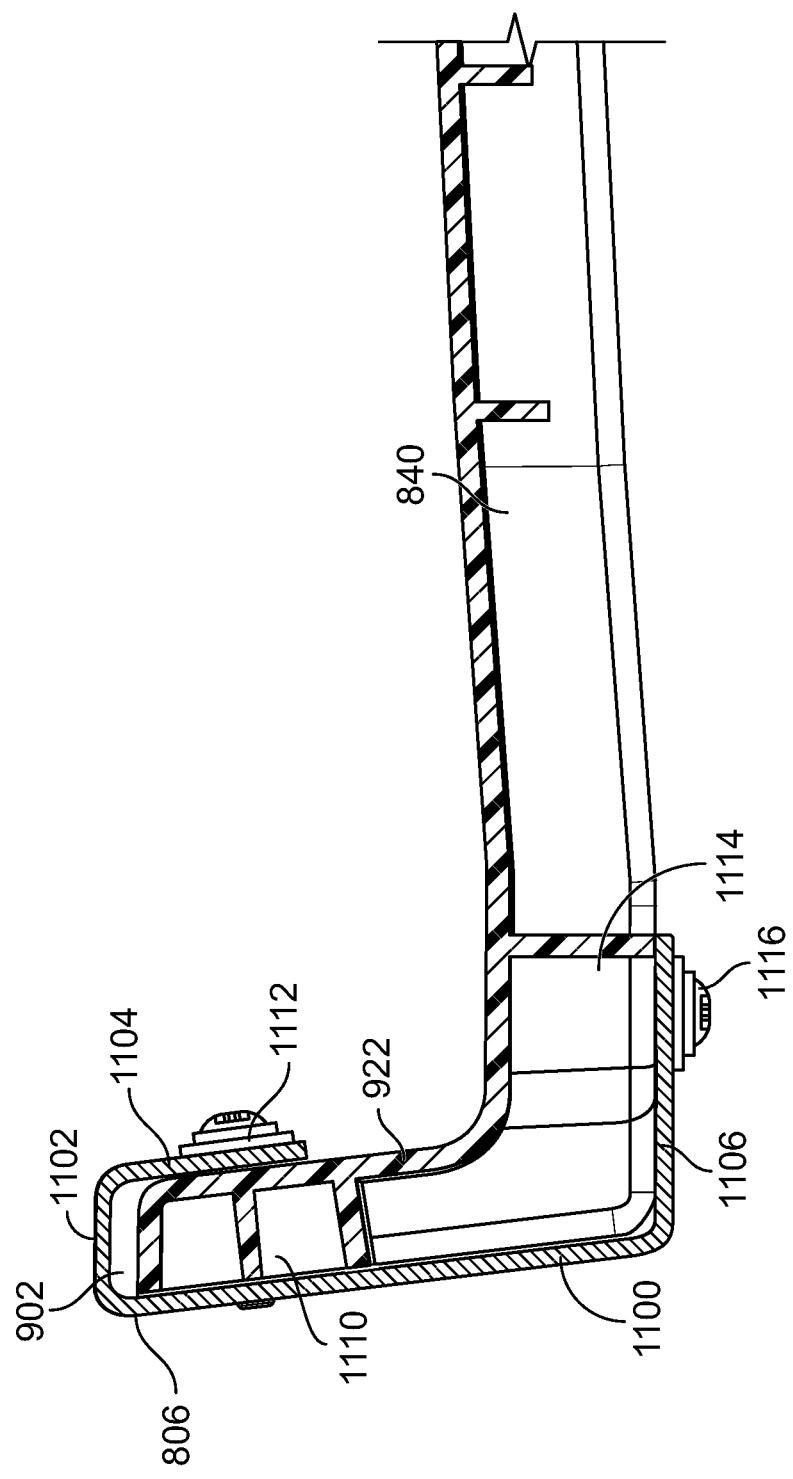
FIG. 40 is a cross-sectional view taken across line 40-40 in FIG. 29 showing a rear wall of one of the support members received in a recess of the rear rail.

Regarding FIG. 40, the rear rail 806 includes a rear wall 1100, an upper wall 1102, a rear lip wall 1104, and a lower wall 1106. The rear wall 922 includes connecting portions 1110 that include the apertures 950 (see FIG. 33) for receiving a fastener, such as a screw 1112, to secure the rear wall 922 to the rear rail 806. The intermediate support member 840 further includes connecting portions 1114 that include the rear doghouses 974 (see FIG. 34), metal clips 976, and openings 978 that receives fasteners, such as a screw 1116, for securing the intermediate support member 840 to the lower wall 1106 of the rear rail 806. In one embodiment, the rear rail 806 is a stamped metal piece, such as steel. The front rail 806, by contrast, may be an extruded metallic piece, such as extruded aluminum.

Figure 41:
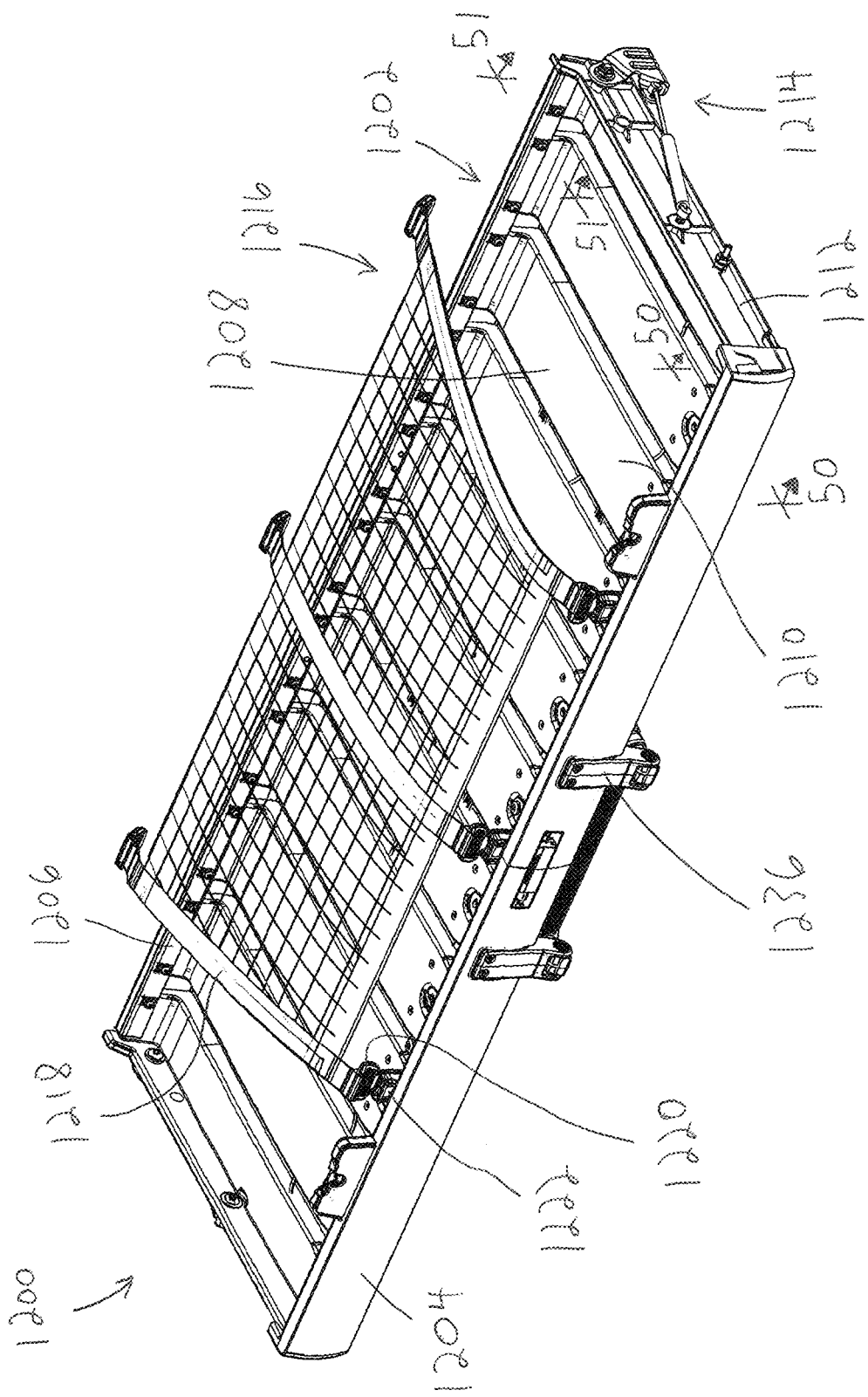
FIG. 41 is a top perspective view of an upper sleeper bunk having a frame including a front rail assembly and a rear rail, the upper sleeper bunk further including support members extending laterally between the front rail assembly and the rear rail.

Regarding FIG. 41, an upper sleeper bunk 1200 is provided that is similar in many respects to the sleeper bunks discussed above such that differences will be highlighted. The upper sleeper bunk 1200 includes a frame 1202 including a front rail assembly 1204 and a rear rail 1206. The upper sleeper bunk 1200 includes one or more support members 1208 extending laterally between the front rail assembly 1204 and the rear rail 1206. The support members 1208 include one or more intermediate support members 1210 and one or more end support members 1212. The end support members are connected to one or more mounts 1214 that permit the upper sleeper bunk 1200 to be reconfigured between different positions. In one embodiment, the upper sleeper bunk 1200 includes a safety restraint 1216 that is similar in many respects to the safety restraint 80 discussed above with respect with FIG. 3. The safety restraint 1216 includes one or more straps 1218 connected to tongues 1220 that are releasably engaged with buckles 1222.

Figure 42:
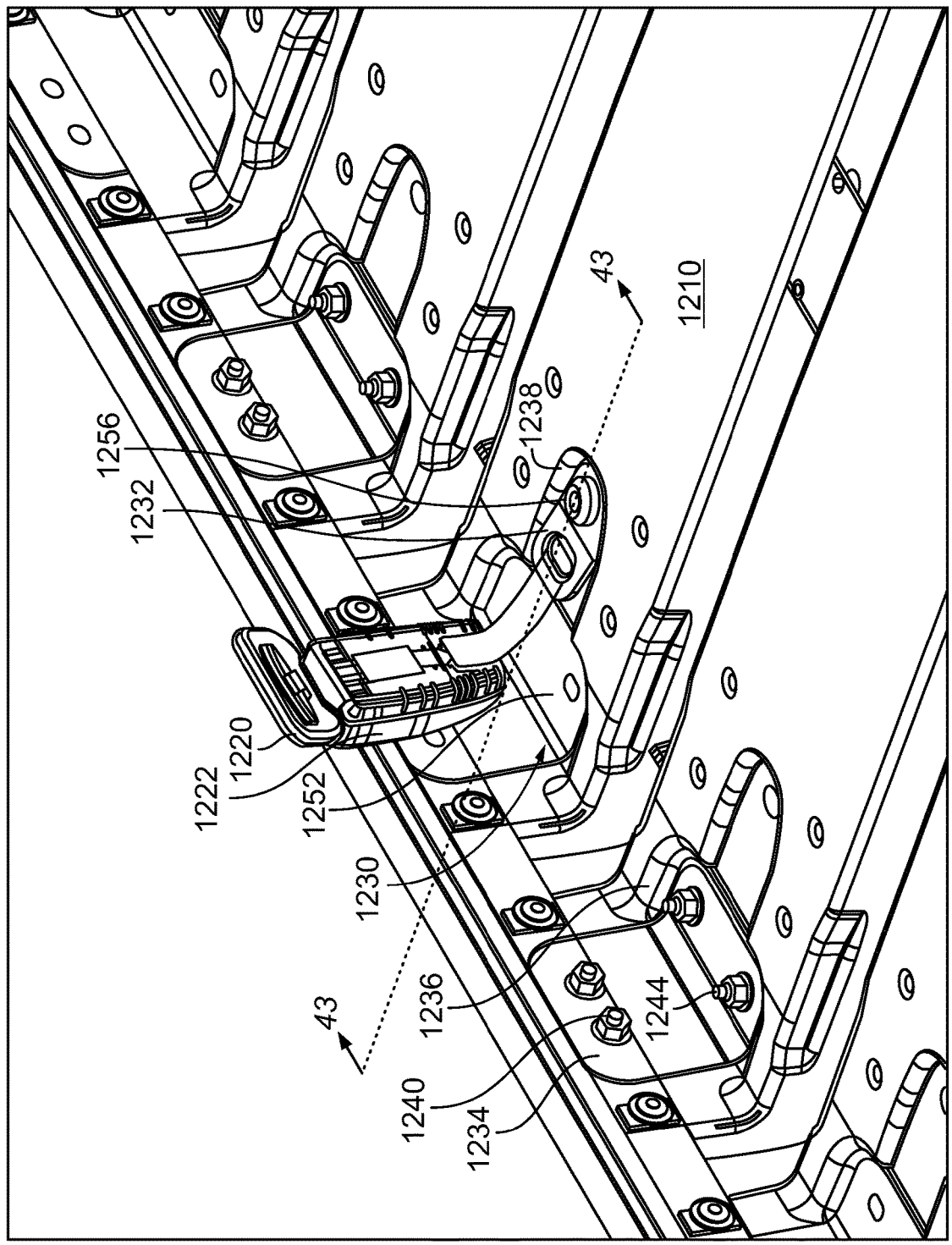
FIG. 42 is a top perspective view of a portion of the upper sleeper bunk of FIG. 41 showing a pocket structure of each of the intermediate support members that permits a either a ladder bracket or a safety restraint anchor to be secured to the intermediate support member.

Regarding FIG. 42, the intermediate support members 1210 each include a pocket structure 1230 that permits the intermediate support member 1210 to be connected to either an anchor 1232 of the safety restraint 1216 or a bracket 1234 of a ladder 1236 (see FIG. 44) of the upper sleeper bunk 1200. The intermediate support members 1210 may be identical, which permits each intermediate support member 1210 to be connected to the ladder bracket 1234 and/or the safety restraint anchor 1232 depending on the location of the intermediate support member 1210. Of course, some of the intermediate support members 1210 may not be connected to either the bracket 1234 or the safety restraint anchor 1232 depending on the position of the intermediate support member 1210. In one embodiment, the pocket structure 1230 includes a ladder bracket pocket 1236 and a safety restraint anchor pocket 1238. The pockets 1236, 1238 may be in communication with one another and the pocket 1236 may be wider in a longitudinal direction than the pocket 1238. The ladder bracket 1234 receives fasteners 1240, 1244 that connect to the front rail assembly 1204.

Figure 43:
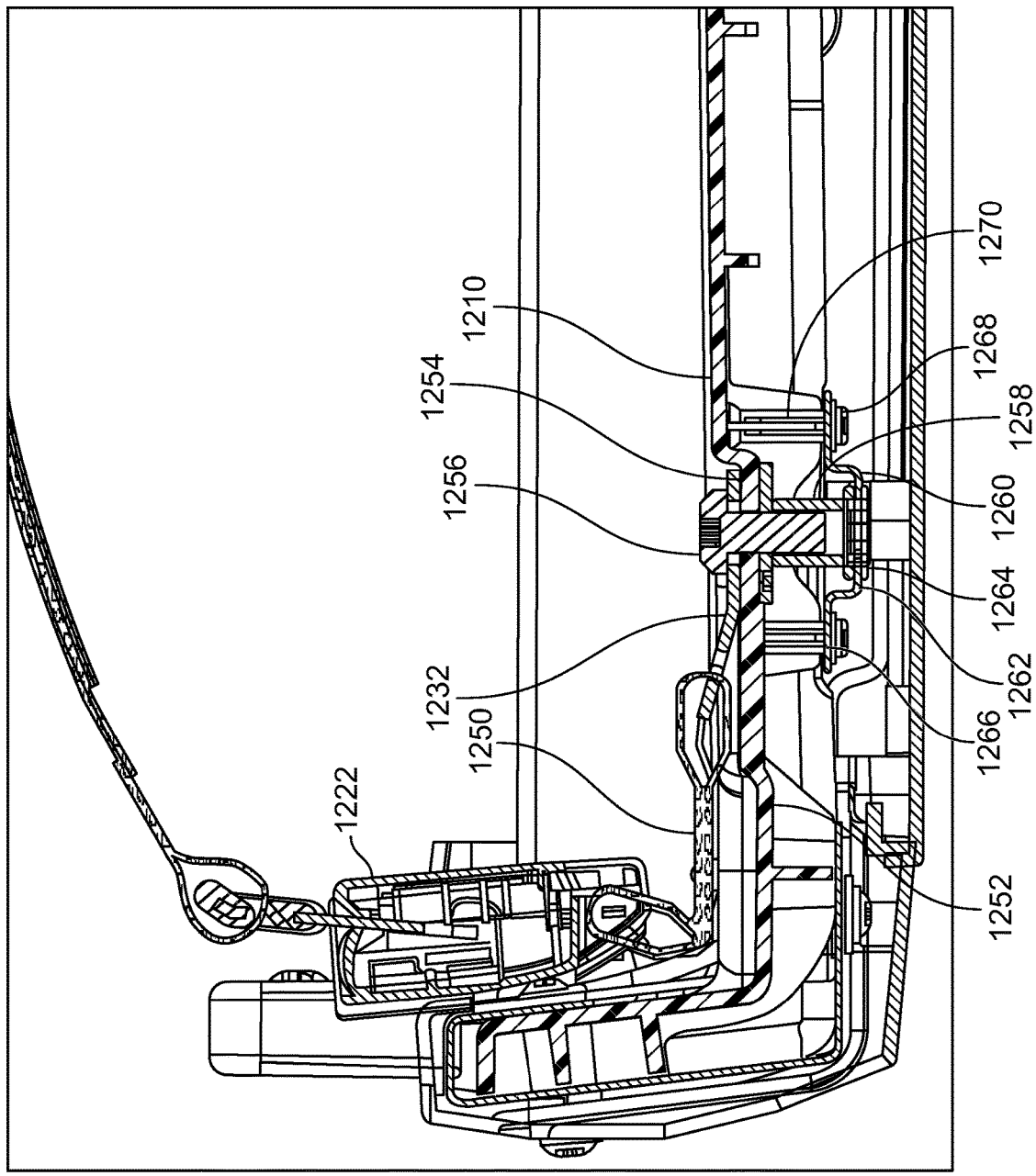
FIG. 43 is a cross-sectional view taken across line 43-43 in FIG. 42 showing a bolt of the safety restraint extending through a safety restraint anchor, through an opening of the intermediate support member, and engaging a nut insert of a safety restraint bracket secured to an underside of the intermediate support member.

Regarding FIGS. 42 and 43, the anchor 1232 connects to the buckle 1222 via a strap 1250. The pocket structure 1230 includes a floor 1252 having an opening 1254 therein through which a fastener, such as a bolt 1256, extends. The fastener 1256 has a head which seats against the anchor 1232 and a threaded shank which engages a nut insert 1258 of a safety restraint bracket 1260. The safety restraint bracket 1260 includes a center portion 1262 that engages a channel 1264 of the nut insert 1258 and opposite side portions 1266 that have apertures to receive fasteners, such as screws 1268. The screws 1268 engage bosses 1270 of the intermediate support member 1210 to secure the safety restraint bracket 1260 to the underside of the intermediate support member 1210.

Figure 44:
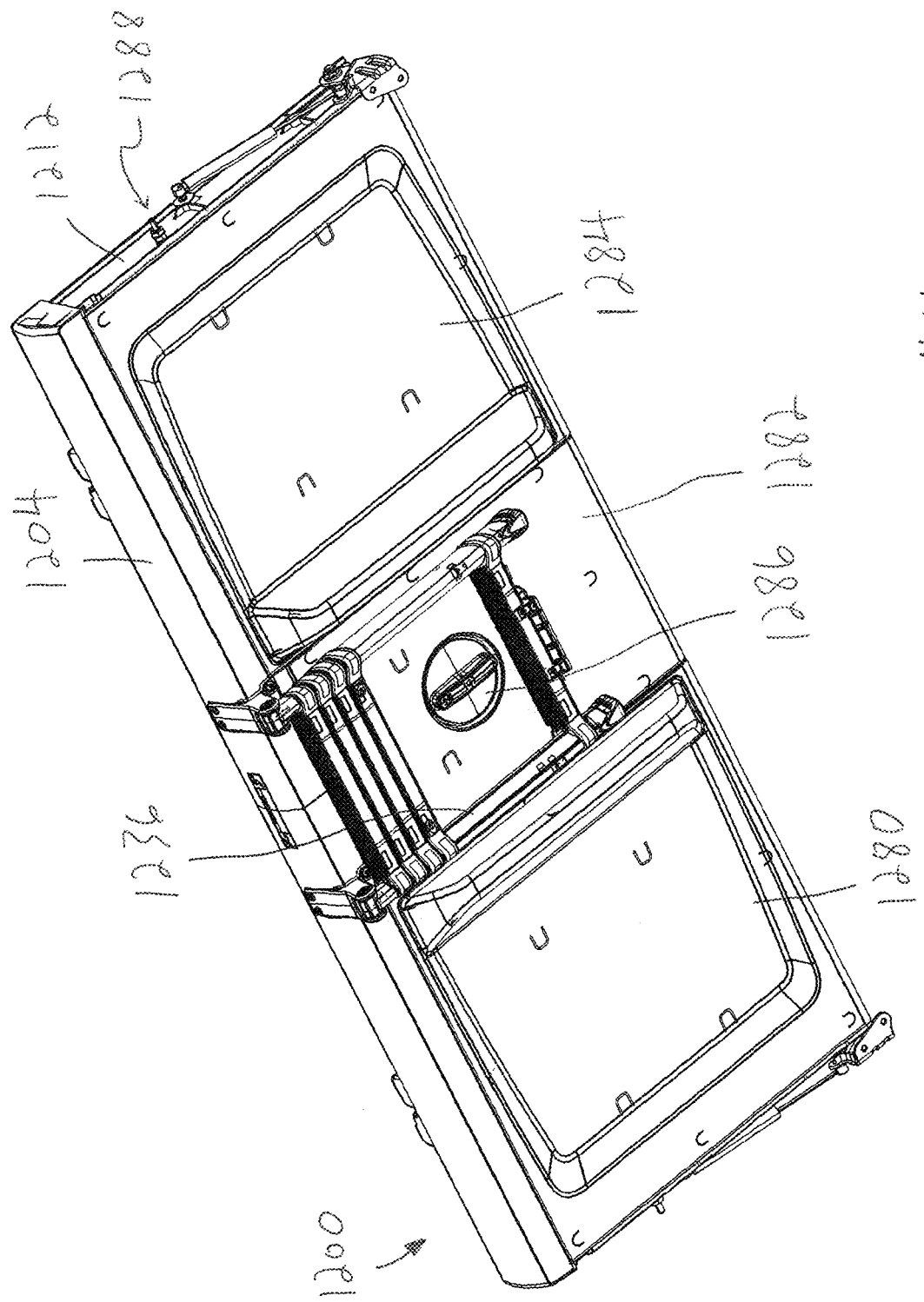
FIG. 44 is a bottom perspective view of the upper sleeper bunk of FIG. 41 showing exterior panels of the upper sleeper bunk.

Regarding FIG. 44, the upper sleeper bunk 1200 includes exterior panels 1280, 1282, 1284 and an actuator 1286 for controlling a latch system 1288 of the upper sleeper bunk 1200.

Figure 45:
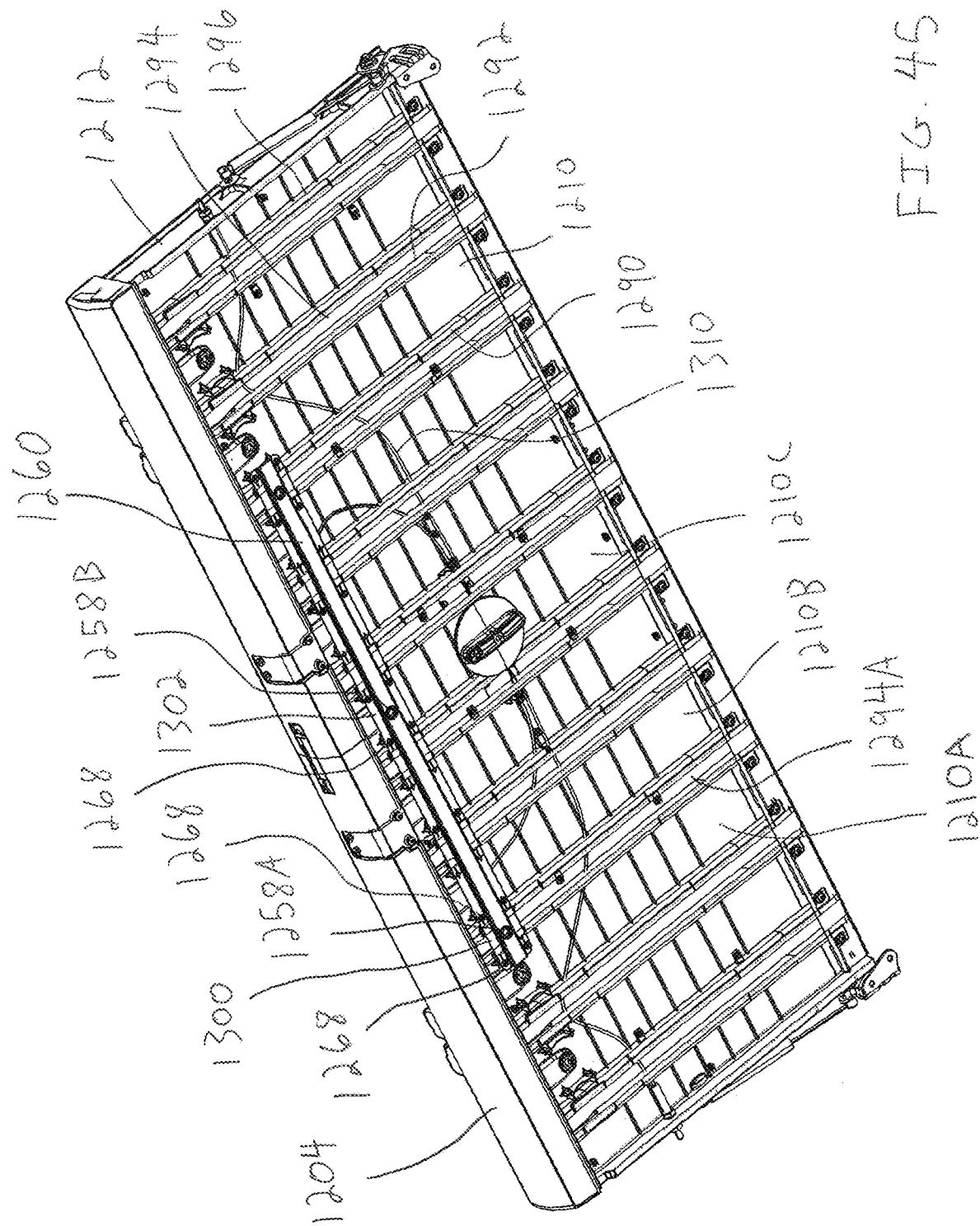
FIG. 45 is a view similar to FIG. 44 showing the exterior panels removed to illustrate the safety restraint bracket extending across multiple intermediate support members.

Regarding FIG. 45, the intermediate support members 1210 include side portions 1290, 1292 that are separated longitudinally by gaps 1294 from the side portions 1290, 1292 of adjacent intermediate support members 1210 or side portions 1296 of the end support members 1212. The gaps 1294 extend laterally across the upper sleeper bunk 1200.

Regarding intermediate support members 1210A and 1210B, there is a gap 1294A therebetween. The safety restraint bracket 1260 has an anchor portion 1300 with fasteners 1268 that secure the anchor portion 1300 to the intermediate support members 1210A, 1210B. The anchor portion 1300 includes a nut insert 1258 that is vertically aligned with the gap 1294A. The nut insert 1258 receives one of the bolts 1256 (see FIG. 43) of the safety restraint 1216.

With reference to FIG. 45, the safety restraint bracket 1260 includes anchor portion 1302 having fasteners 1268 that connect the anchor portion 1302 to the intermediate support member 1210C. Further, the nut insert 1258B is vertically aligned with the opening 1254 of the intermediate support member 1210C. The offset of the anchor portion 1300 between the intermediate support members 1210A, 1210B may be desirable for spacing in some situations. In other embodiments, all of the anchor portions 1300 are vertically aligned with one of the intermediate support members 1210 rather than having some of the anchor portions 1300 aligned with the gaps 1294.

Regarding FIG. 45, in one embodiment, the latch system 1288 includes one or more latch cable assemblies 1310 that extend longitudinally across the gaps 1294 and through one or more side portions 1290, 1292, and/or 1296 of the intermediate support members 1210 and/or the end support members 1212.

Figure 46:
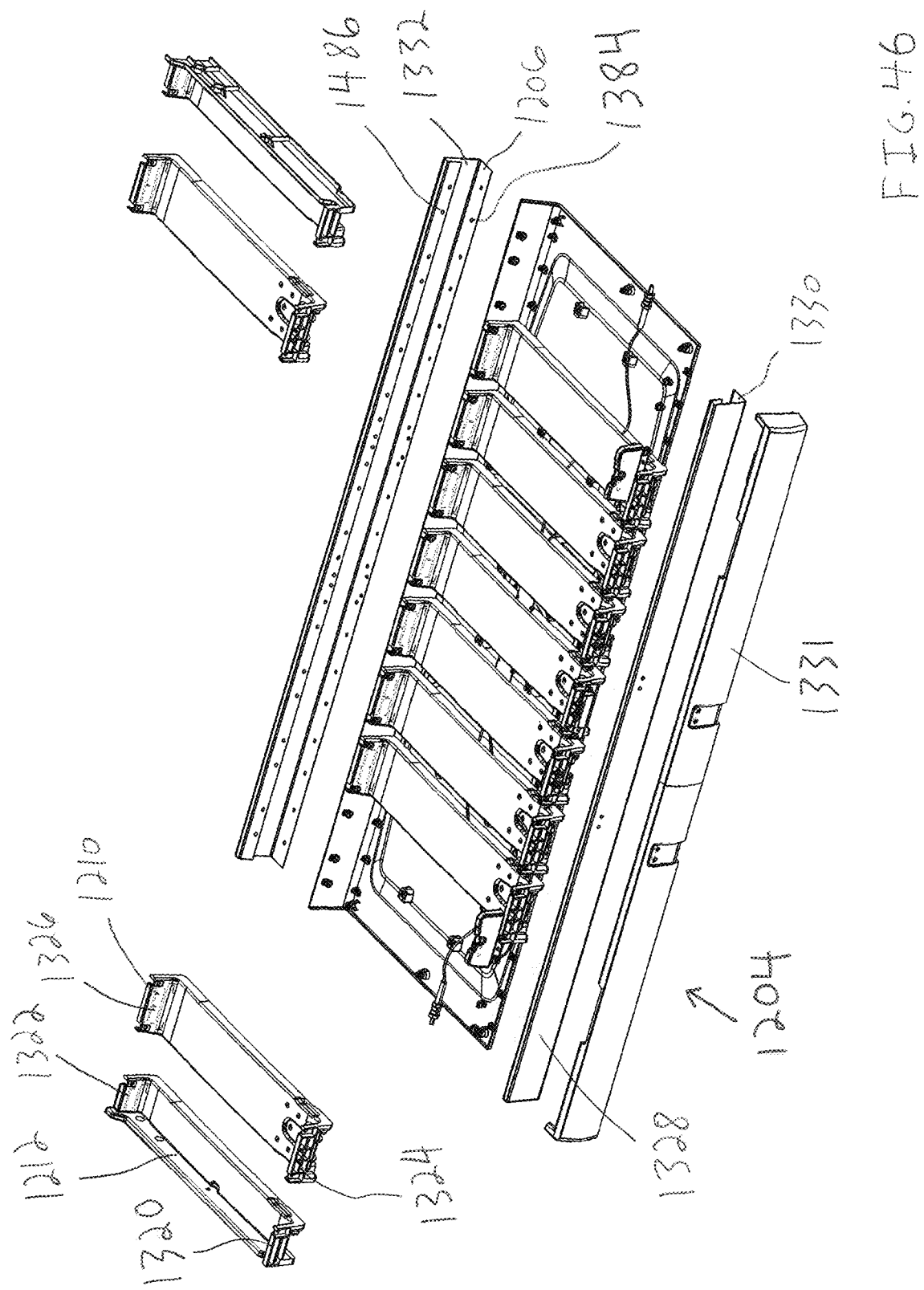
FIG. 46 is an exploded view of a portion of the upper sleeper bunk of FIG. 41 showing the front rail assembly including a front rail and a fascia that is connected to the front rail.

Regarding FIG. 46, the end walls 1212 each include a front wall 1320 and a rear wall 1322 and the intermediate support members 1210 each include a front wall 1324 and a rear wall 1326. The front rail assembly 1204 includes a front rail 1328 and a fascia 1330 that is connected thereto. The front rail 1328 may be made of a rigid material, such as a stamped metal, and the fascia 1330 may be made of more aesthetically pleasing material, such as a plastic. To connect the end support members 1212 and the intermediate support members 1210 to the front rail 1328, the front walls 1320, 1324 are slid longitudinally into a recess 1330 of the front rail 1328. Likewise, the rear walls 1322, 1326 are slid longitudinally into a recess 1332 of the rear rail 1206. Once the end support members 1212 and intermediate support members 1210 have reached the desired longitudinal positions along the front and rear rails 1328, 1206, the end support members 1212 and intermediate support members 1210 are fixed in position along the front and rear rails 1328, 1206 using one or more fasteners as discussed in greater detail below.

Figure 47:
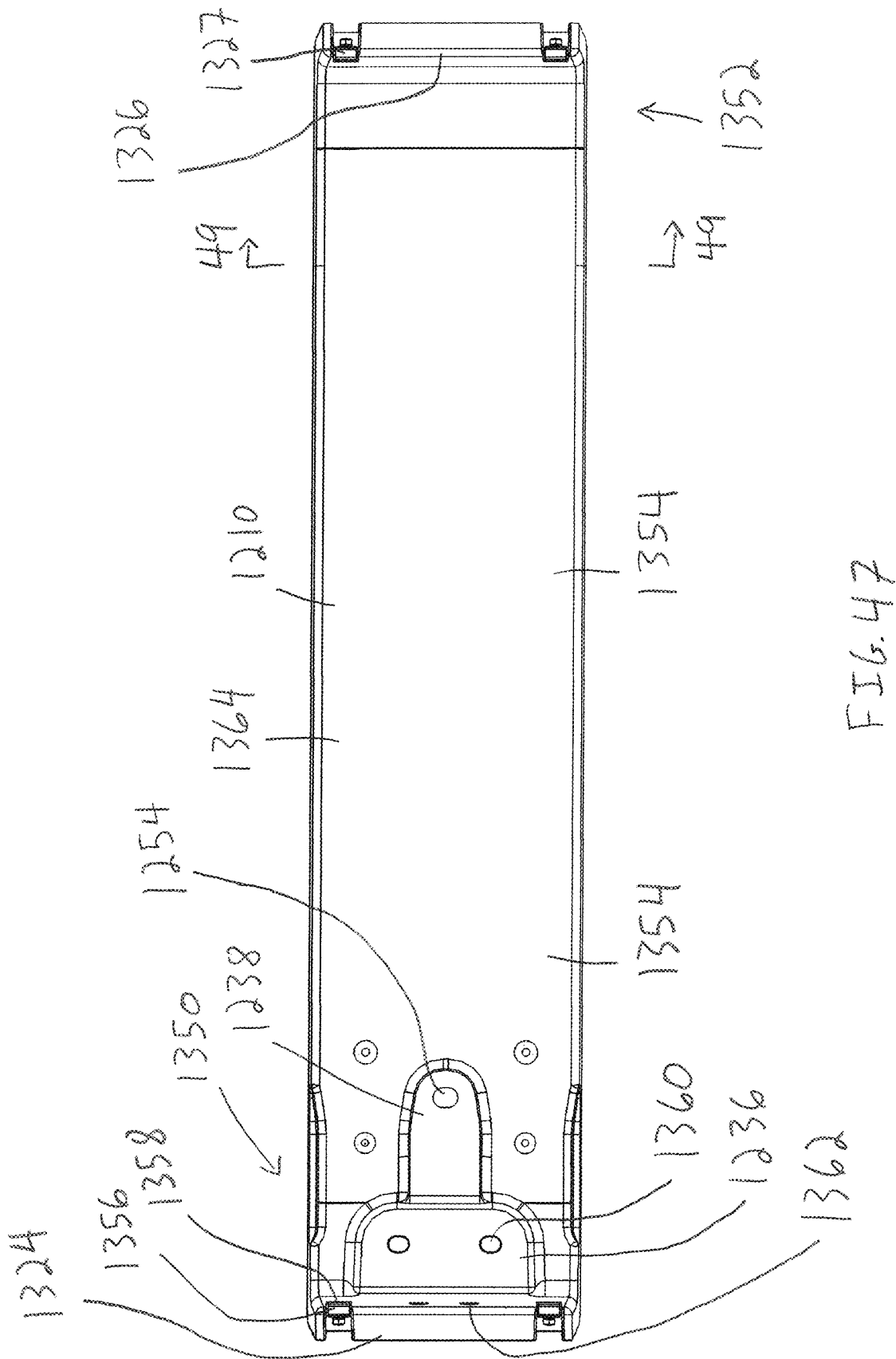
FIG. 47 is a top plan view of one of the intermediate support members of FIG. 46 showing the pocket structure of the intermediate support member including a wider, ladder bracket-receiving pocket and a narrower, safety restraint-receiving pocket.

Regarding FIG. 47, the intermediate support member 1210 includes a front end portion 1350 that includes the upper wall 1324 and a rear end portion 1352 that includes the rear wall 1326. The intermediate support member 1210 includes a body 1354 that may have a unitary, one-piece construction. The body 1354 may be made of a plastic material, such as injection molded plastic. The body 1354 may carry one or more fastener receiving elements, such as metal clips 1356, having one or more openings aligned with an opening 1358 (see FIGS. 47 and 50) of the front wall 1324 for receiving fasteners to secure the front wall 1324 to the front rail 1328. The front end portion 1350 further includes openings 1360 and 1362 for receiving fasteners 1240, 1244 (see FIG. 42) of the ladder bracket 1234. The body 1354 includes an upper surface 1364 for supporting a mead board and/or a mattress.

Figure 48:
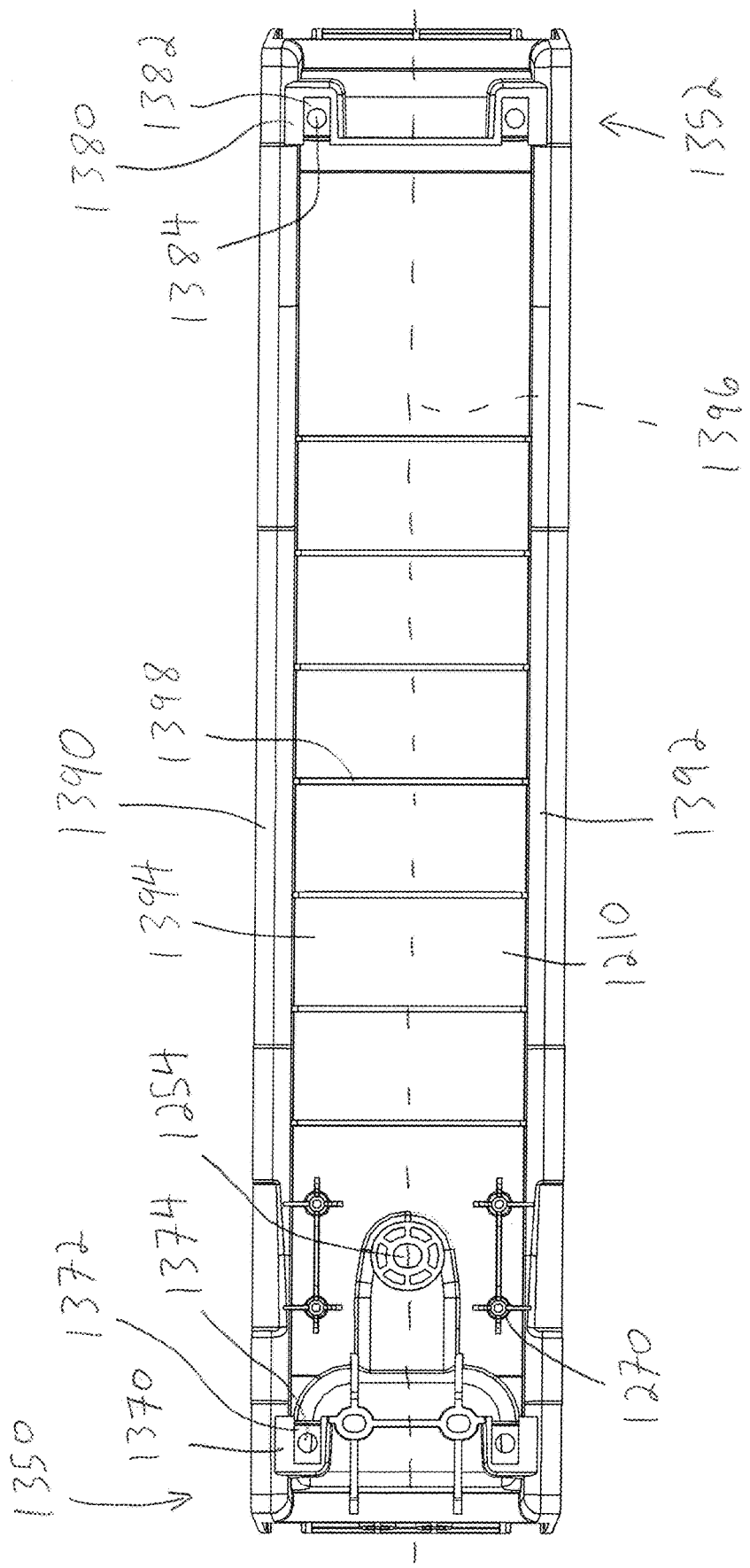
FIG. 48 is a bottom plan view of the intermediate support member of FIG. 47 showing a front end portion of the intermediate support member with connecting portions to receive fasteners for securing to the front rail, bosses for receiving fasteners of the safety restraint bracket, and a rear end portion with connecting portions to receive fasteners to secure to the rear rail.

Regarding FIG. 48, the front end portion 1350 includes one or more connecting portions, such as front doghouses 1370, clips 1372, and openings 1374 that receive fasteners to secure the bottom of the intermediate support member 1210 to the front rail 1328. Likewise, the rear end portion 1352 includes one or more connecting portions, such as rear doghouses 1380, clips 1382, and openings 1384 for receiving fasteners to secure the bottom of the intermediate support member 1210 to the rear rail 1206.

Figure 49:
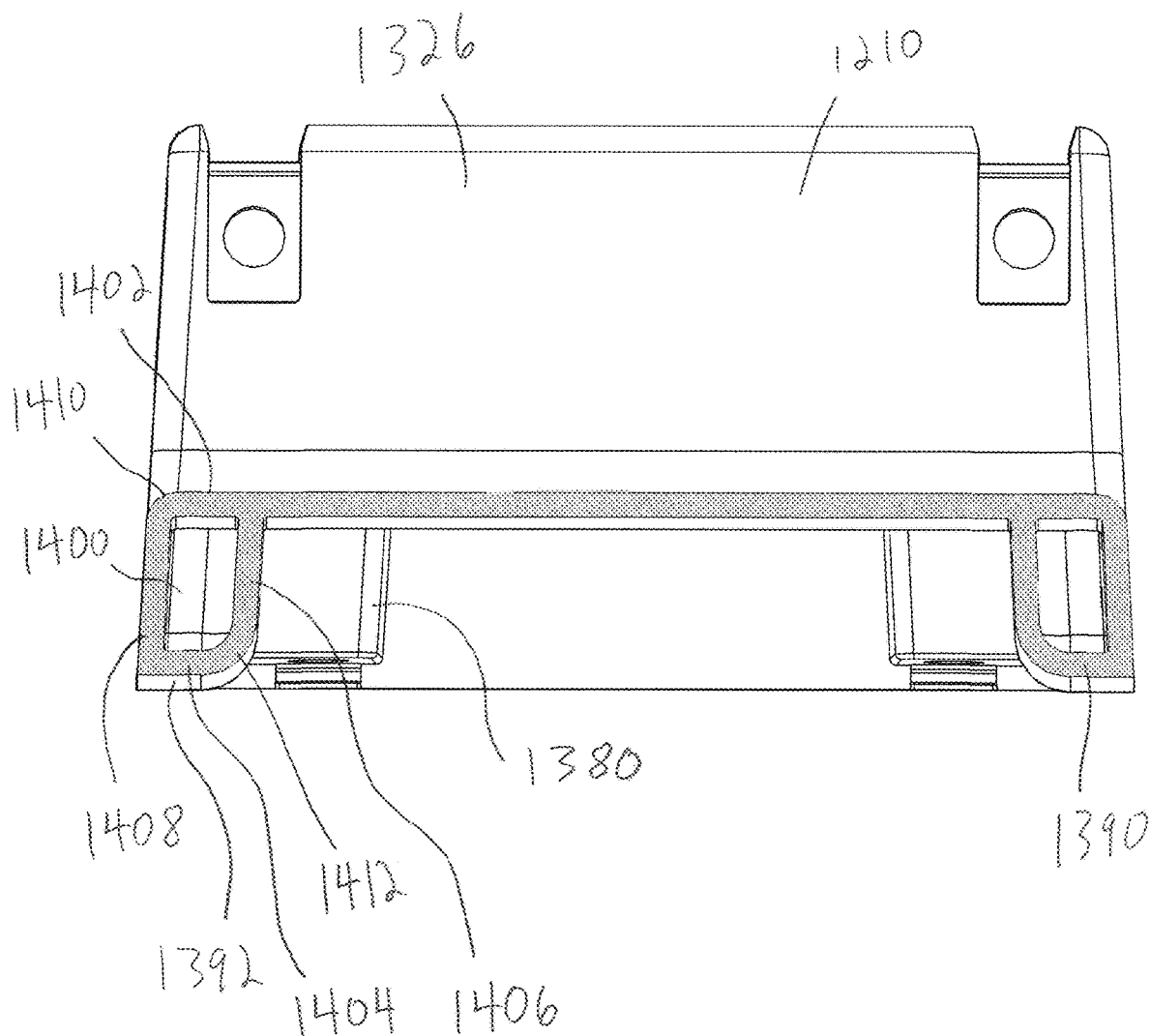
FIG. 49 is a cross-sectional view taken across line 49-49 in FIG. 47 showing a tubular cross-section of the beam portions of the intermediate support member.

Regarding FIGS. 48 and 49, the intermediate support members 1210 include one or more beam portions 1390, 1392 extending between, either partially or fully between, the front end portion 1350 and the rear end portion 1352. The intermediate support member 1210 further includes one or more web portions 1394 extending longitudinally between the laterally extending beam portions 1390, 1392. The intermediate support member 1210 further includes an axis 1396 and one or more transverse supports such as ribs 1398 reinforcing the web portion 1394.

Regarding FIG. 49, one or more of the beam portions 1390, 1392 include a cavity 1400 that is formed using gas- or water-assisted injection molding techniques. As discussed above, the gas or water utilized in these processes increases the cooling rate of the material of the intermediate support member 1210 in a mold which may reduce the time required to injection mold the intermediate support member 1210. For example, the beam portion 1392 includes an upper wall 1402, a lower wall 1404, an inner wall 1406, and an outer wall 1408. The beam portions 1390, 1392 may have curved corners 1410, 1412 connecting the walls 1402, 1408 and 1404, 1406 to reduce stress concentrators. In another approach, the intermediate support members 1210 may be made using a straight injection molding process.

Figure 50:
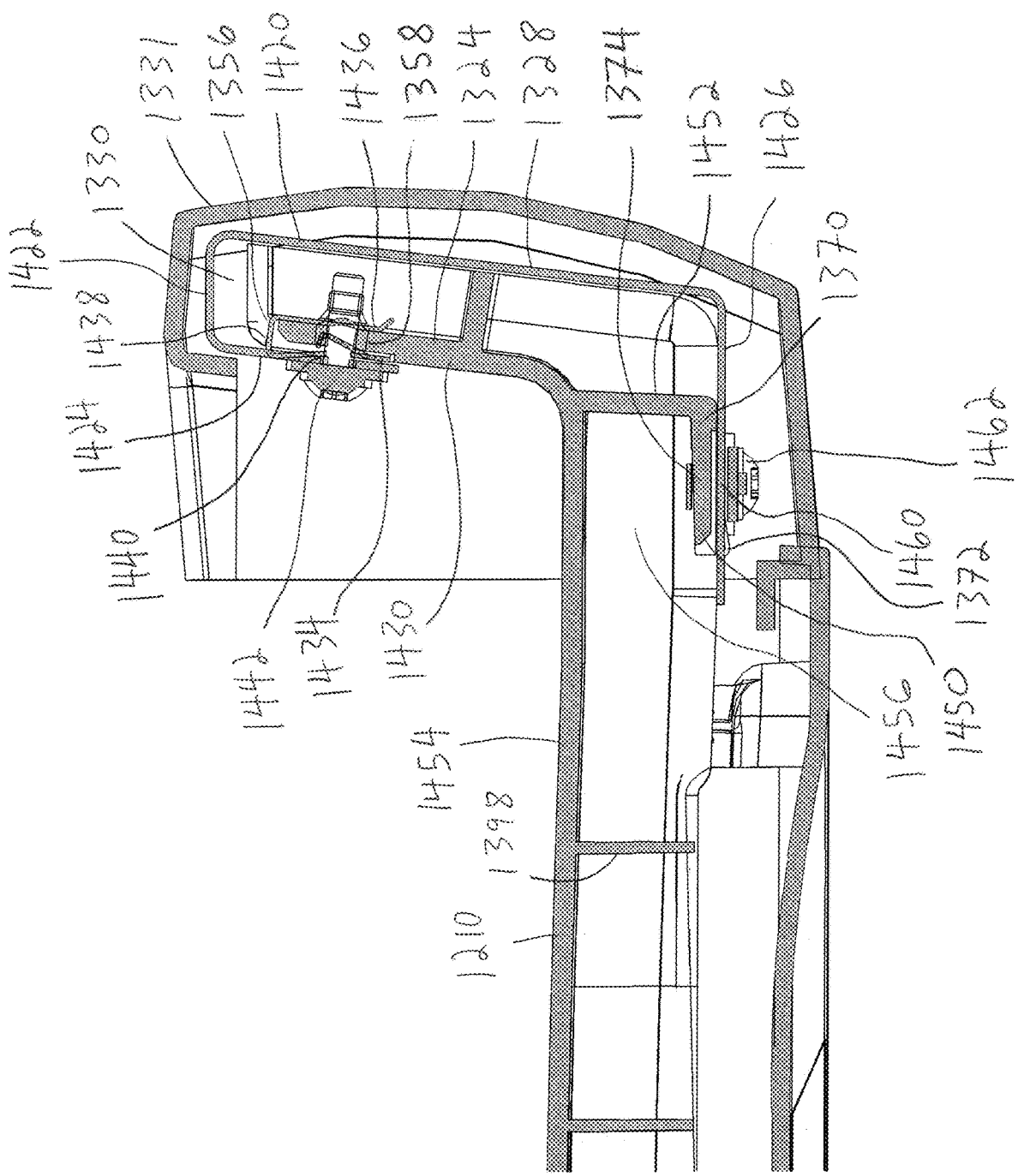
FIG. 50 is a cross-sectional view taken across line 50-50 in FIG. 41 showing a front wall of one of the intermediate support members received in a recess of the front rail and the fascia covering the front rail.

Regarding FIG. 50, the front wall 1324 of the intermediate support member 1210 is received in the recess 1330 of the front rail 1328. The front rail 1328 may be made of a stamped metal material. The front rail 1312 has a front wall 1420, an upper wall 1422, a front lip 1424, and a lower wall 1426. The front wall 1324 of the intermediate support member 1210 includes a front wall portion 1430 that may have at least a portion of the opening 1432 formed therein and may carry a clip 1356 thereon. The clip 1356 has a pair of plate portions 1434, 1436 and a bend 1438 connecting the plate portions 1434, 1436. The plate portions 1434, 1436 are on opposite sides of the front wall portion 1430. Further, the plate portion 1434 of the clip 1356 is sandwiched between the front lip 1424 of the front rail 1328 and the front wall portion 1430 of the intermediate support member 1210. The clip 1356 is carried on the front wall portion 1430 as the front wall 1324 is slid into the recess 1330 of the front rail 1328. Once the intermediate support member 1210 is at the desired location along the front rail 1310, the opening 1358 of the intermediate support member 1210 is aligned with an upper opening 1440 of the front lip 1424 of the front rail 1328. A fastener, such as a screw 1442 having a head, a retained washer, and a shank may be advanced through the upper opening 1440 and openings of the clip 1356 and the opening 1358 in the front wall portion 1430 of the intermediate support member 1210 to secure the front wall 1324 of the intermediate support member 1210 to the front lip 1424 of the front rail 1328.

Regarding FIG. 50, each of the front doghouses 1370 includes a lower wall 1450 and a side wall 1452 separating the lower wall 1450 from a platform portion 1454 of the intermediate support member 1210 to form a recess 1456. The lower wall 1450 includes the opening 1374 that aligns with an opening 1460 in the lower wall 1426 of the front rail 1328. A fastener, such as a screw 1462, is advanced through the aligned openings 1374, 1460 along with the opening(s) in the metal clip 1372 associated with the doghouse 1370 to connect the bottom of the intermediate support member 1210 to the lower wall 1426 of the front rail 1328.

Figure 51:
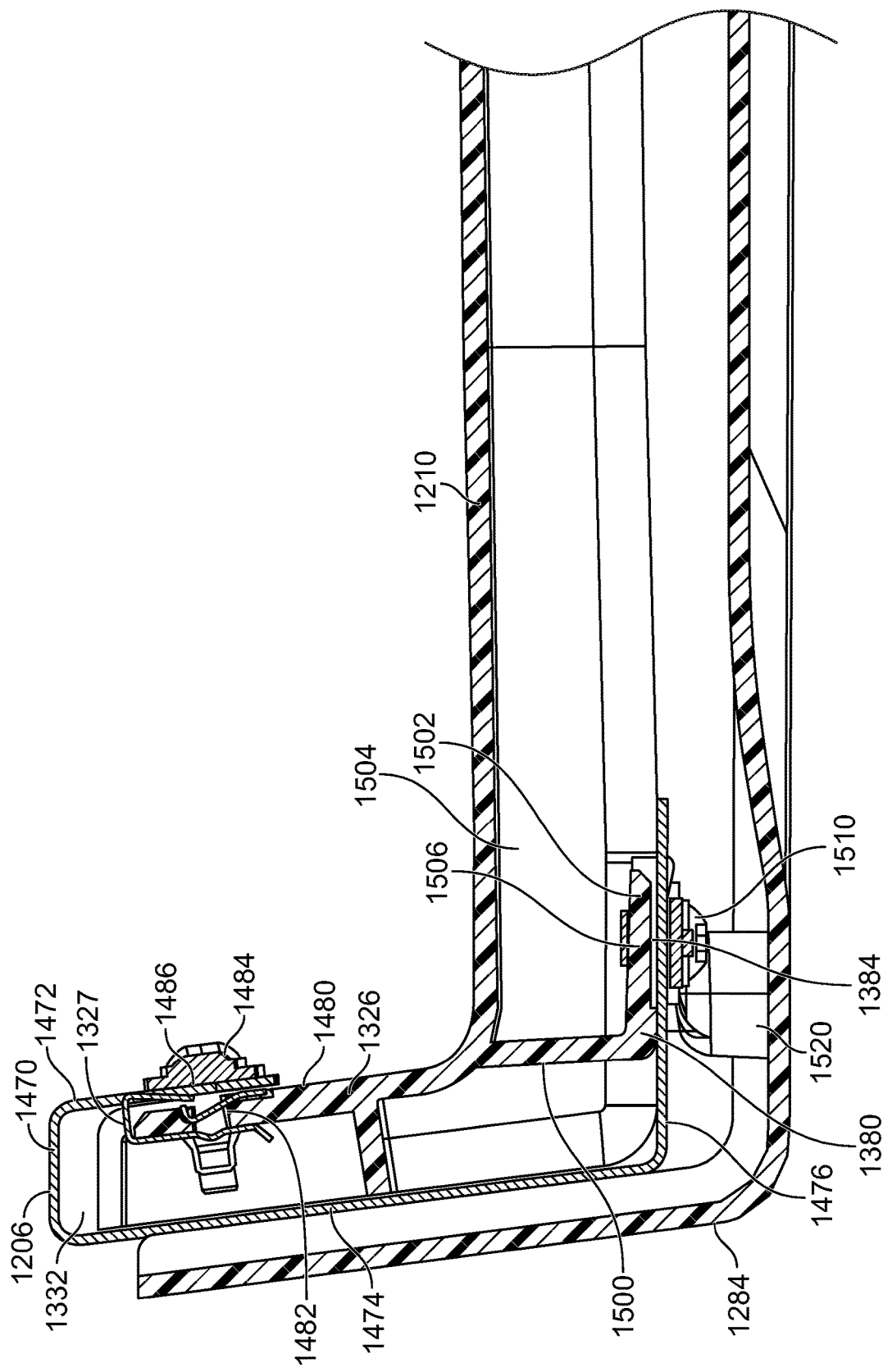
FIG. 51 is a cross-sectional view taken across line 51-51 in FIG. 41 showing a rear wall of one of the intermediate support members received in a recess of the rear rail.

Regarding FIG. 51, the rear wall 1326 of the intermediate support member 1210 is received in the recess 1332 of the rear rail 1206. The rear rail 1206 has an upper wall 1470, a rear lip 1472, a rear wall 1474, and a lower wall 1476. The rear wall 1326 of the intermediate support member 1210 includes a rear wall portion 1480 having an opening 1482 that receives a shank of a screw 1484. This screw 1484 extends through an opening 1486 in the rear lip 1472 and through openings in the clip 1327 which is carried on the rear wall portion 1480. Further, the rear doghouse 1380 includes a side wall 1500, a lower wall 1502, and a recess 1504. The lower wall 1502 includes an opening 1506 that is aligned with openings of the clip 1382 of the rear doghouse 1380 and receives a screw 1510 that extends through an opening 1384 of the lower wall 1476 (see also FIG. 46). Regarding FIG. 51, the exterior panel 1248 may be secured to the lower wall 1476 of the rear rail 1206 via a fastener and a connecting portion, such as a doghouse 1520, of the exterior panel 1284.

Figure 52:
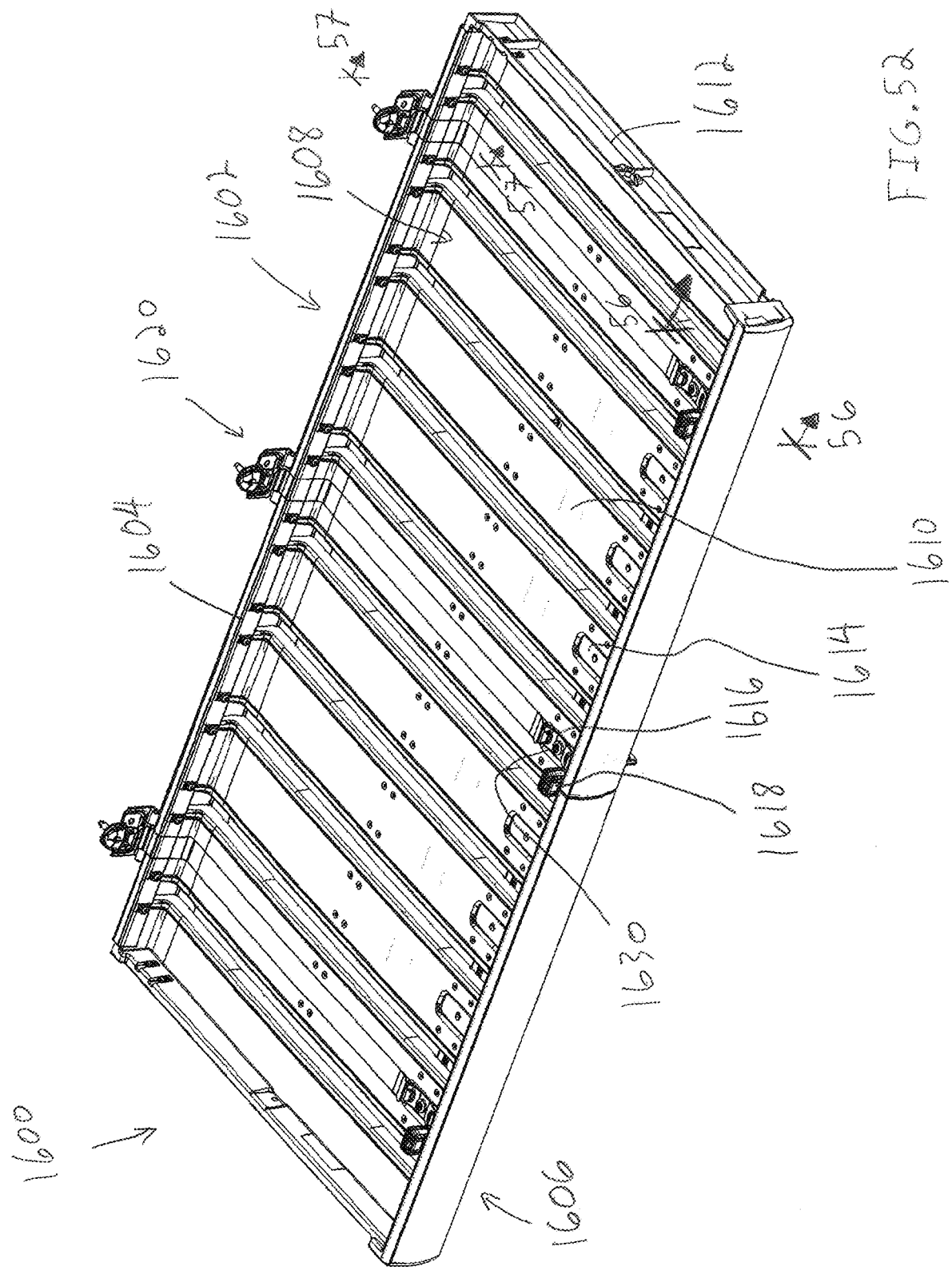
FIG. 52 is a top perspective view of a lower sleeper bunk having a front rail assembly, a rear rail, and support members extending laterally between the front rail assembly and the rear rail.

Regarding FIG. 52, a lower sleeper bunk 1600 is provided that is similar in many respects to the sleeper bunk 1200 discussed above such that differences will be highlighted. The lower sleeper bunk 1600 includes a frame 1602 including a rear rail 1604 and a front rail assembly 1606. The lower sleeper bunk 1600 includes one or more support members 1608 extending laterally between the front rail assembly 1606 and the rear rail 1604. The support members 1608 may include one or more intermediate support members 1610 and one or more end support members 1612. The intermediate support members 1610 include pockets 1614 that may receive an anchor 1616 associated with a buckle 1618 of a safety restraint 1620.

Figure 53:
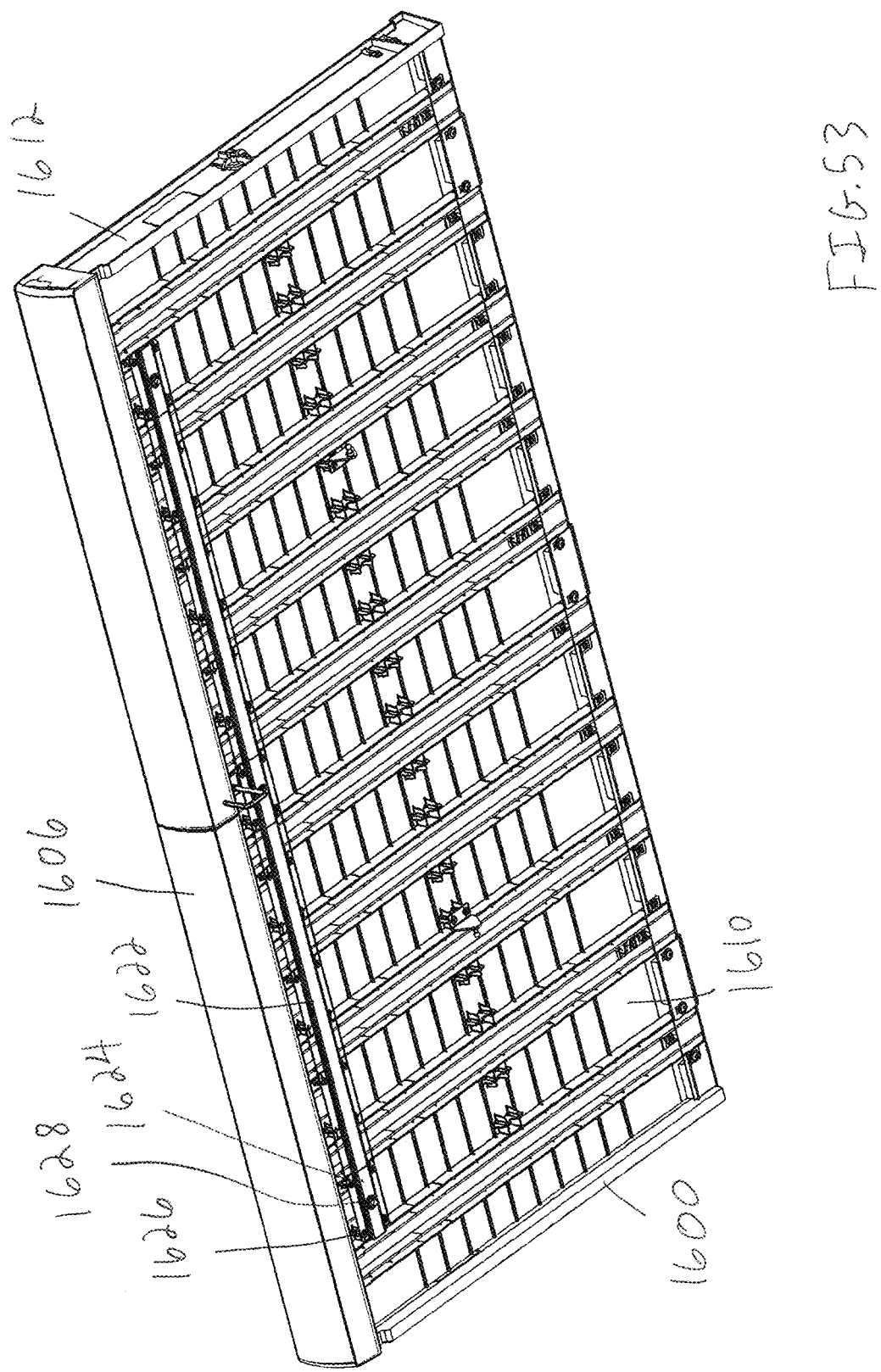
FIG. 53 is a bottom perspective view of the lower sleeper bunk of FIG. 52 showing a safety restraint bracket secured to multiple intermediate support members of the lower sleeper bunk.

Regarding FIG. 53, the lower sleeper bunk 1600 includes a safety restraint bracket 1622 having one or more anchor portions 1624 that are each vertically aligned with one of the intermediate support members 1610. In another embodiment, the safety restraint bracket 1622 includes two or more safety restraint brackets 1622 each mounted to a respective one of the intermediate support members 1610. The anchor portion 1624 has fasteners 1626 that connect the anchor portion 1624 to the associated intermediate support member 1610 and a nut insert 1628 that receives a bolt 1630 of the anchor 1616 (see FIG. 52).

Figure 54:
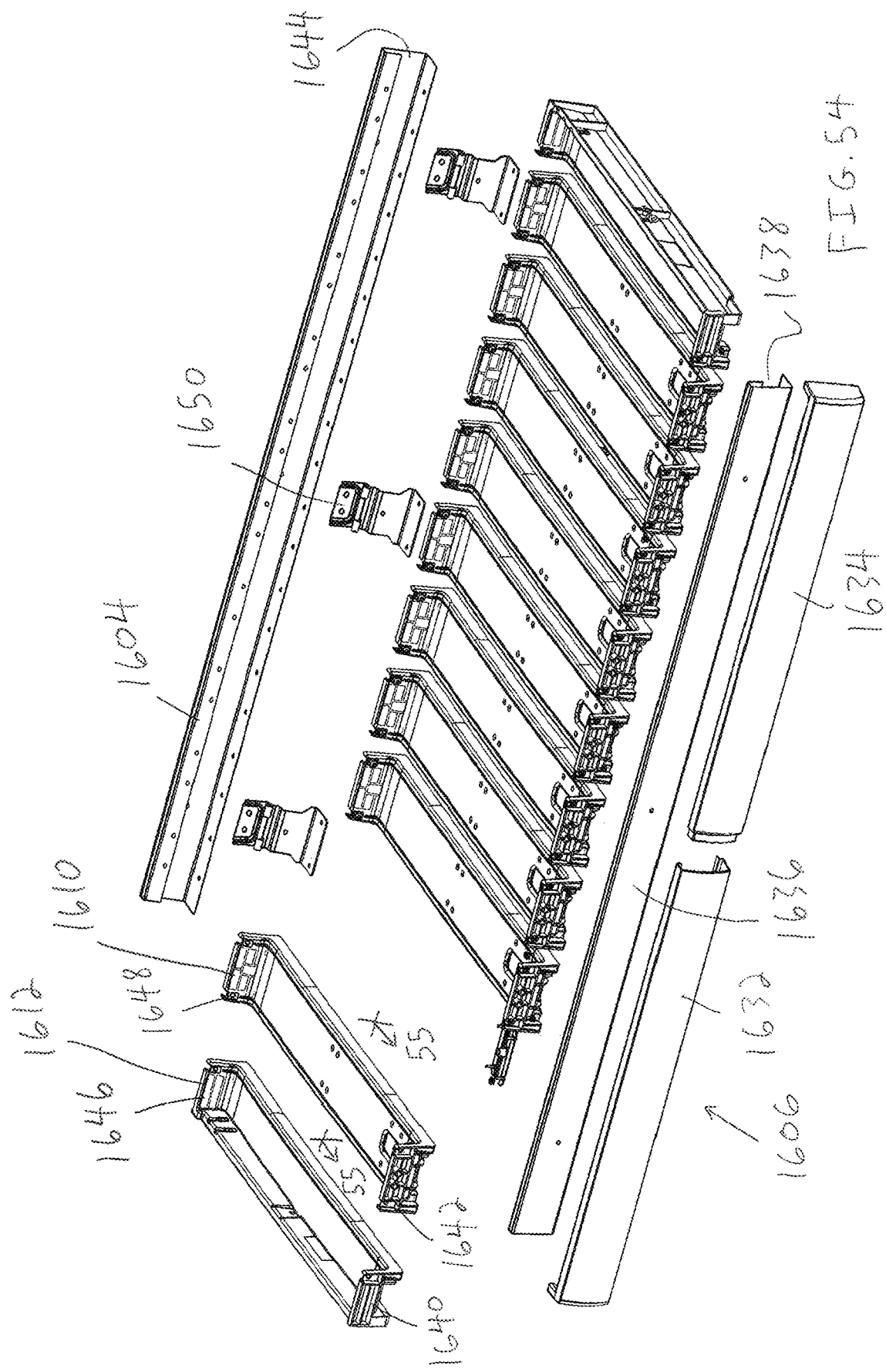
FIG. 54 is an exploded view of the lower sleeper bunk of FIG. 52 showing hinges of the lower sleeper bunk that are secured to the rear rail.

Regarding FIG. 54, the front rail assembly 1606 include a pair of fascia portions 1632, 1634 that may be connected together and to a front rail 1636. The front rail 1636 has a recess 1638 that receives front walls 1640, 1642 of the end support members 1612 and the intermediate support members 1610. Similarly, the rear rail 1604 has a recess 1644 that receives rear wall 1646, 1648 of the end support members 1612 and the intermediate support members 1610. The lower sleeper bunk 1600 further includes one or more hinges 1650 that connect the rear rail 1604 to a support structure, such as a wall of the vehicle. The hinges 1650 permit the lower sleeper bunk 1600 to be pivoted between different positions.

Figure 55:
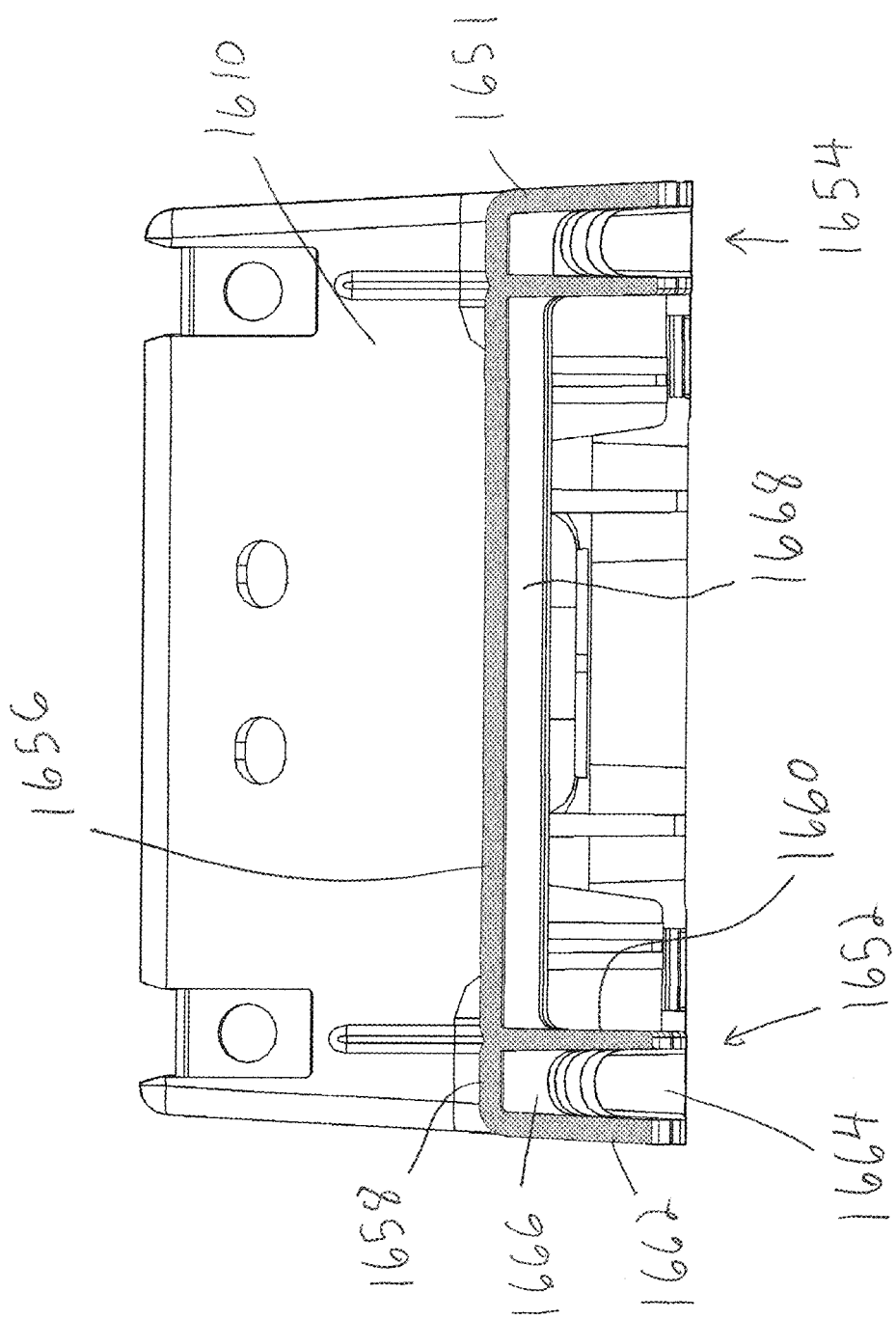
FIG. 55 is a cross-sectional view taken across line 55-55 in FIG. 54 showing a pair of spaced walls of the beam portions of the intermediate support member.

Regarding FIG. 55, the intermediate support member 1610 includes a body 1651 that may be made of a unitary, one-piece material, such as plastic. The body 1651 includes one or more beam portions 1652, 1654 and a web portion 1656 extending laterally therebetween. As another example, the intermediate support member 1610 may have a single beam portion and a pair of web portions extending longitudinally in opposite directions away from the beam portion.

The beam portions 1652, 1654 each include an upper wall 1658, an inner wall 1660, and an outer wall 1662. There is a gap 1664 between the inner and outer walls 1660, 1662 and one or more ribs 1666 connecting the inner and outer walls 1660, 1662. The ribs 1666 resist movement of the inner and outer walls 1660, 1662 relative to one another and stiffen the beam portions 1652, 1654. The intermediate support member 1610 further includes one or more ribs 1668 extending between the beam portions 1652, 1654.

Figure 56:
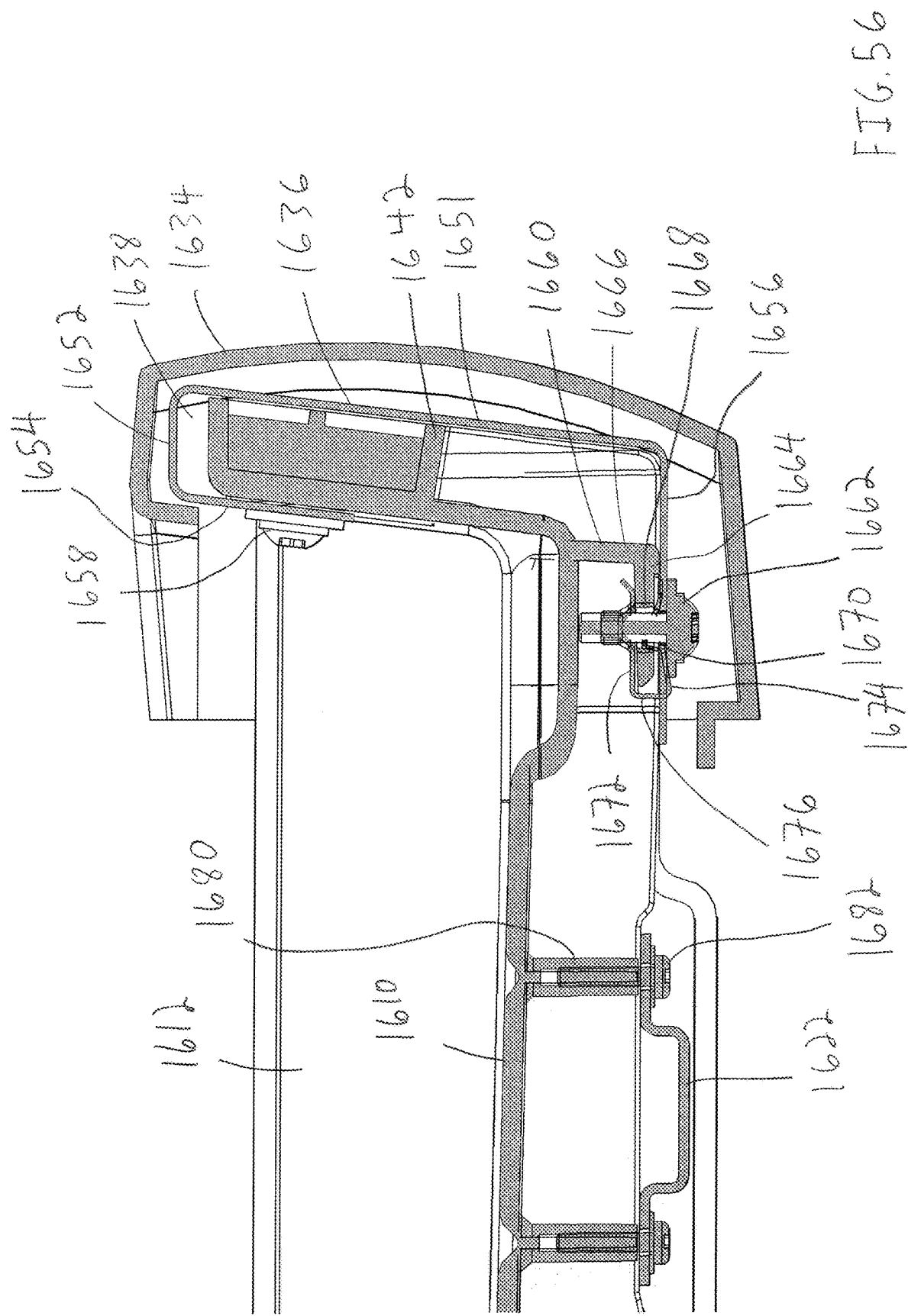
FIG. 56 is a cross-sectional view taken across line 56-56 in FIG. 52 showing fasteners connecting one of the intermediate support members to the front rail and the front fascia covering the front rail.

Regarding FIG. 56, the front wall 1642 of the intermediate support member 1610 is received in the recess 1638 of the front rail 1636. The front rail 1636 may be made of a stamped metal and may include a front wall 1651, an upper wall 1652, a front lip 1654, and lower wall 1656. The front wall 1642 of the intermediate support member 1610 has an upper connecting portion, such as one or more front wall portions with openings that receives fasteners, such as screws 1658, that connect the front wall 1642 of the intermediate support member 1610 to the front lip 1654 of the front rail 1636. For example, the connecting portion of the front wall 1643 may include a pair of wall portions similar to wall portions 1430 of FIG. 50.

Regarding FIG. 56, the intermediate support member 1610 further includes a lower connecting portion, such as one or more front doghouses 1660, for receiving fasteners such as screws 1662 that secure the intermediate support member 1610 to the lower wall 1656 of the front rail 1636. In one embodiment, the front doghouse 1660 includes a lower wall 1664, a side wall 1666, and an opening 1668 in the lower wall 1664 that is aligned with through openings 1670 formed in an upper plate portion 1672 and a lower plate portion 1674 of a clip 1676. The lower plate portion 1674 is clamped between the lower wall 1664 of the front doghouse 1660 and the lower wall 1656 of the front rail 1636. Continuing to refer to FIG. 56, the intermediate support member 1610 includes one or more bosses 1680 that receive screws 1682 for connecting the safety restraint bracket 1622 to the intermediate support member 1610.

Figure 57:
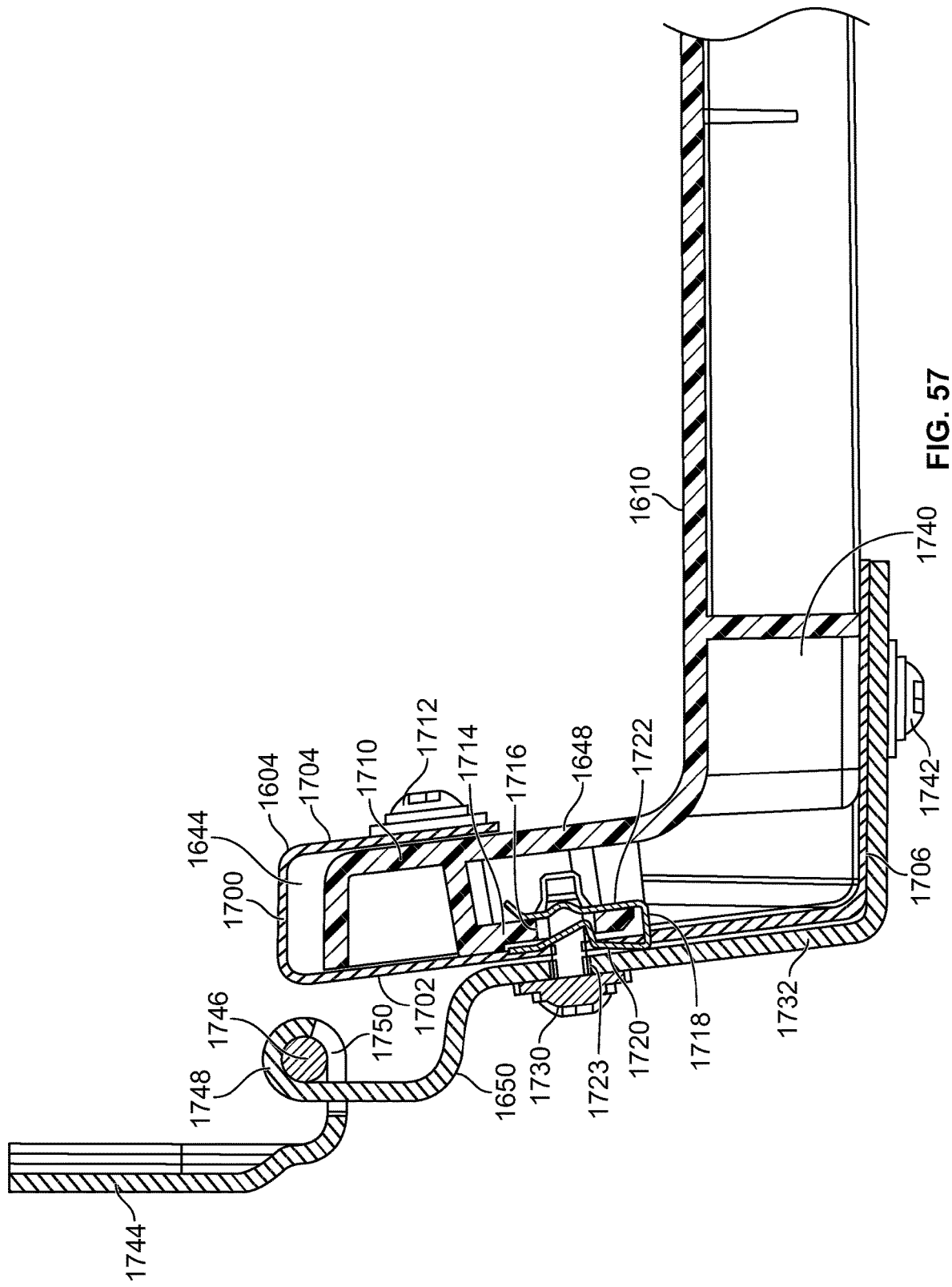
FIG. 57 is a cross-sectional view taken across line 57-57 in FIG. 52 showing fasteners connecting one of the intermediate support members to one of the hinges and the rear rail.

Regarding FIG. 57, the rear wall 1648 of the intermediate support member 1610 is received in the recess 1644 of the rear rail 1604. The rear rail 1604 includes an upper wall 1700, a rear wall 1702, and a rear lip 1704, and a lower wall 1706. The rear wall 1648 of the intermediate support member 1610 has a connecting portion 1710, such as a wall portion with a through opening and clip carried on the wall portion, that receives a screw 1712 to connect the rear wall 1648 of the intermediate support member 1610 to the rear lip 1704 of the rear rail 1604. For example, the connecting portion 1710 may include a pair of wall portions similar to wall portion 1480 of FIG. 51.

The rear wall 1648 of the intermediate support member 1610 further includes a connecting portion, such as an outer wall portion 1714 having an opening 1716 and a clip 1718 carried on the outer wall portion 1714. The clip 1718 has plate portions 1720, 1722 with through openings that are aligned with the opening 1716 of the outer wall portion 1714.

The hinges 1650 each include one or more fasteners, such as a screw 1730, that extends through an opening 1723 of the rear rail rear wall 1702, openings of the clip plate portions 1720, 1722, and the opening 1716 of the intermediate support member rear wall portion 1714. The screw 1730 thereby connects a rail portion 1732 of the hinge 1650 to the rear wall 1702 of the rear rail 1604 and to the outer wall portion 1714 of the intermediate support member 1610.

The intermediate support member 1610 further includes a connecting portion 1740 that receives a fastener, such as a screw 1742, that connects the hinge rail portion 1732, rear rail lower wall 1706, and intermediate support member 1610. In one embodiment, the connecting portion 1740 may include a doghouse having a metal clip thereon. The hinge 1650 includes a mounting portion 1744 that may be secured to a structure, such as a wall of a vehicle, and a pin 1746 that extends between loop portions 1748, 1750 and forms a pivotal connection between the mounting portion 1744 and the rail portion 1732.

Figure 58:
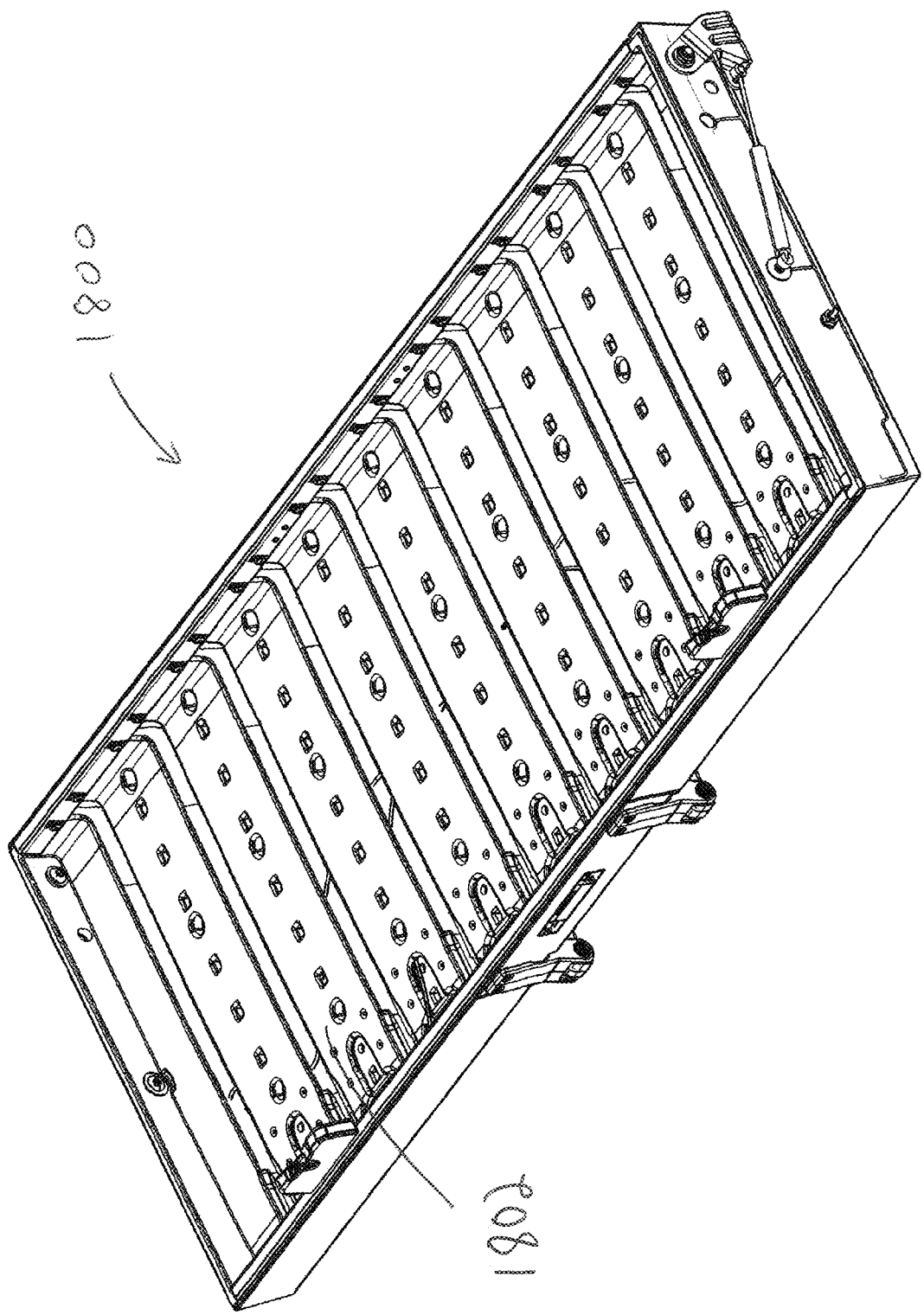
FIG. 58 is a top perspective view of an upper sleeper bunk having intermediate support members.
Figure 59:
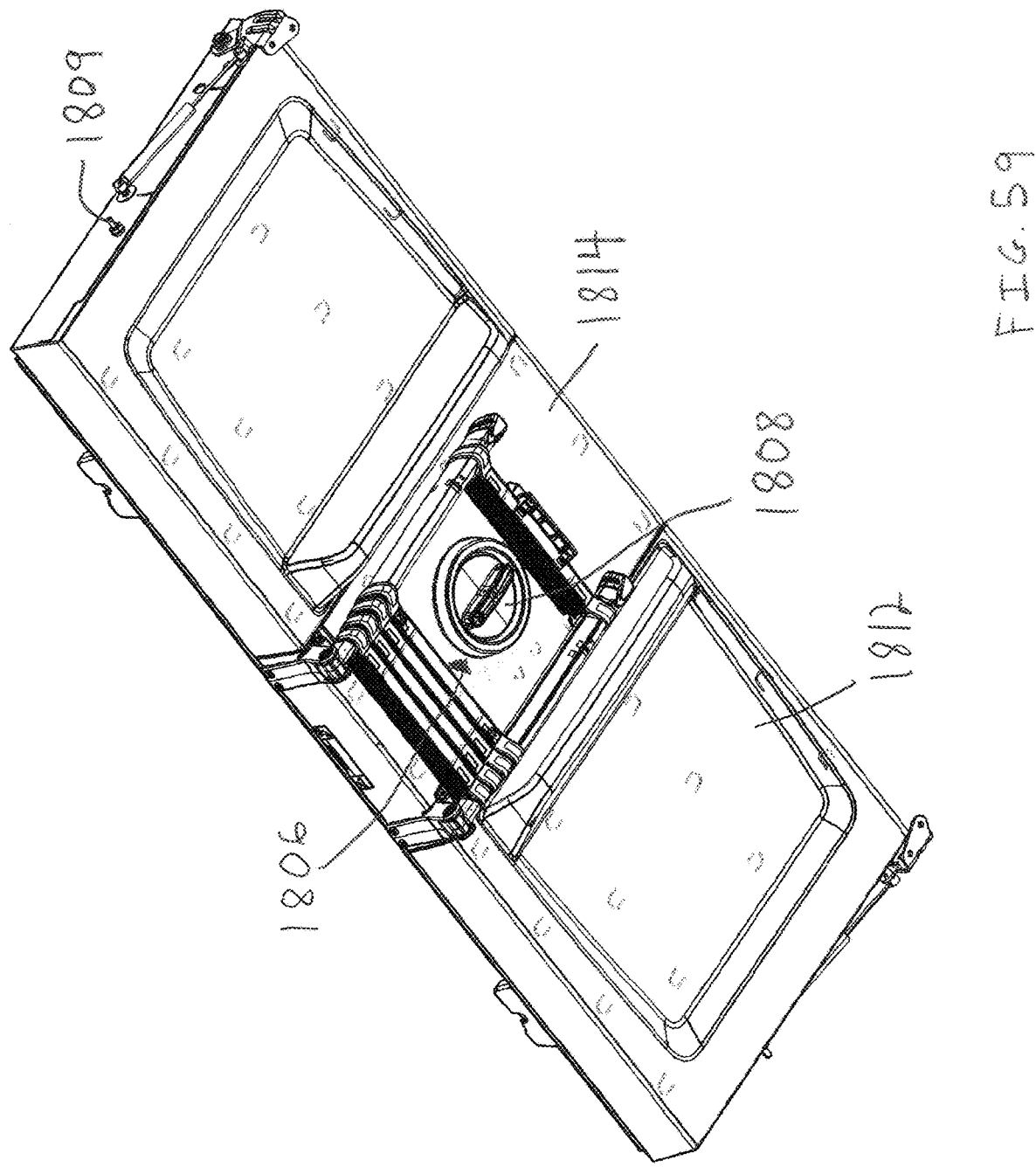
FIG. 59 is a bottom perspective view of the upper sleeper bunk of FIG. 58 showing exterior panels and an actuator of a latch system of the upper sleeper bunk.

Regarding FIGS. 58 and 59, an upper sleeper bunk 1800 is provided that is similar in many respects to the sleeper bunks discussed above such that differences will be highlighted. The upper sleeper bunk 1800 includes intermediate support members 1802 and a latch system 1806 with an actuator 1808 that may be manipulated to shift latch members or strikers 1809 of the latch system 1804 between locked and unlocked positions. The upper sleeper bunk 1800 also includes a facia such as side exterior panels 1812 and a center exterior panel 1814.

Figure 60:
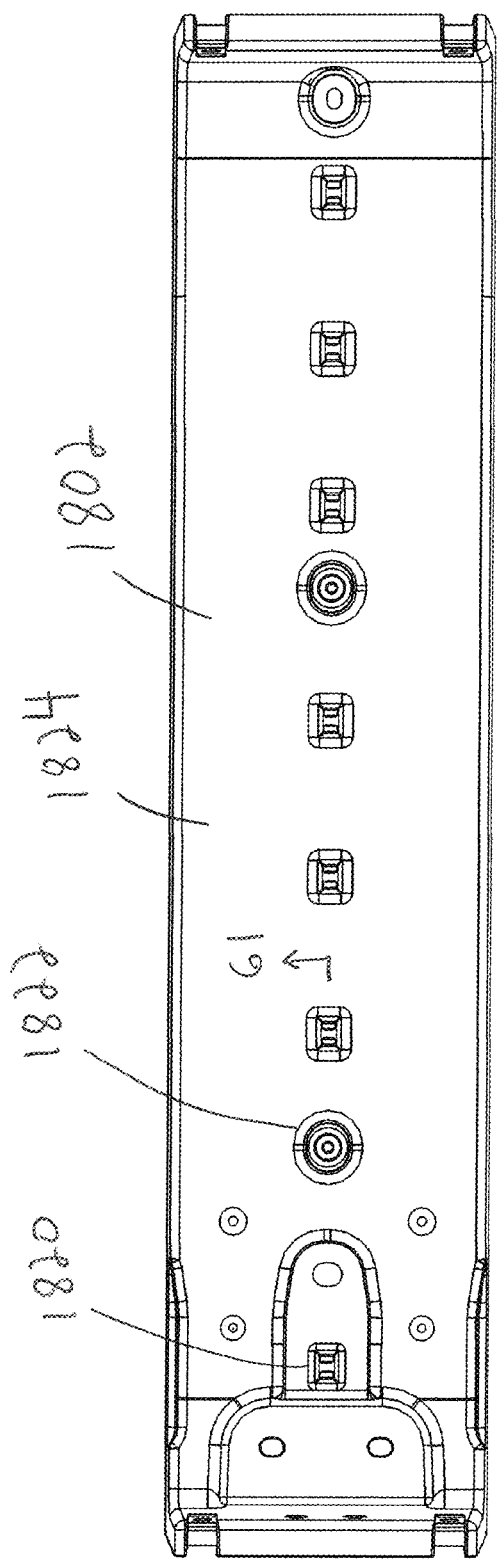
FIG. 60 is a top plan view of one of the intermediate support members of FIG. 58 showing circular and rectangular protrusions extending downwardly from an upper surface of the intermediate support member.
Figure 61:
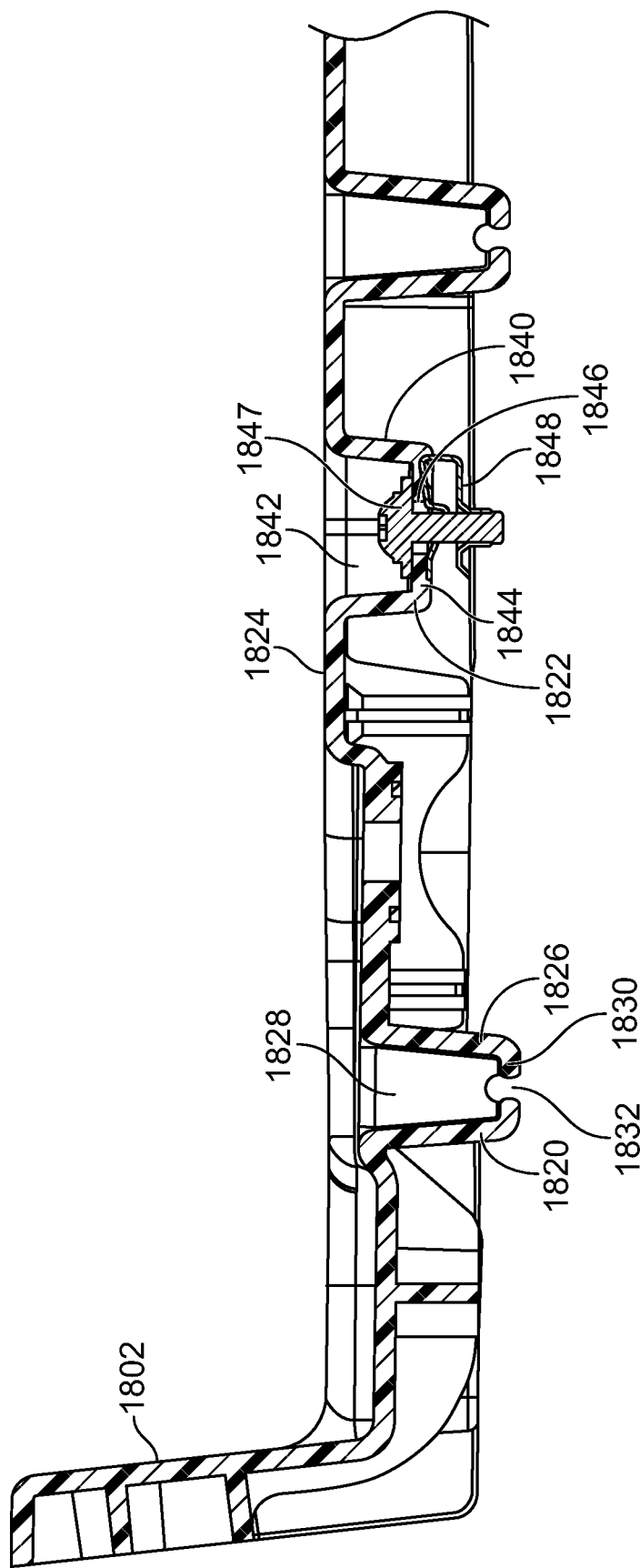
FIG. 61 is a cross-sectional view taken across line 61-61 in FIG. 60 showing one of the rectangular protrusions having an aperture for receiving a latch cable assembly of the latch system and one of the circular protrusions receiving a fastener that connects one of the exterior panels to the intermediate support member.

Regarding FIG. 60, the intermediate support members 1802 each include one or more latch cable holder protrusions 1820 and one or more exterior panel connector protrusions 1822 extending downward (into the page in FIG. 60) from an upper surface 1824 of the intermediate support member 1802. Regarding FIG. 61, the cable holder protrusions 1820 include one or more side walls 1826 defining a recess 1828 and gripping portions 1830 forming one or more apertures 1832. The latch system 1806 has latch cable assemblies including latch cables extending between the actuator 1808 and the strikers 1809 and sleeves or tubes surrounding the latch cables. One tube with a latch cable slidably received therein may be snapped into the apertures 1832 of the gripping portions 1830. The tube may have a diameter slightly larger than the distance across aperture 1832 so that the gripping portions 1830 frictionally retain the latch cable assembly in the cable holder protrusion 1820.

The exterior panel connector 1822 includes one or more side walls 1840 defining a recess 1842 and a bottom wall 1844 having an opening 1846 therein. The opening 1846 receives a fastener 1847, such as a M6 bolt, having a shank that threadingly engages a metal clip 1848 carried on a doghouse of one of the exterior panels 1812, 1814. The exterior panel connectors 1822 are uniform for the intermediate support members 1802 so that any of the intermediate support members 1802 may be connected to either of the exterior panel 1812, 1814.

Figure 62:
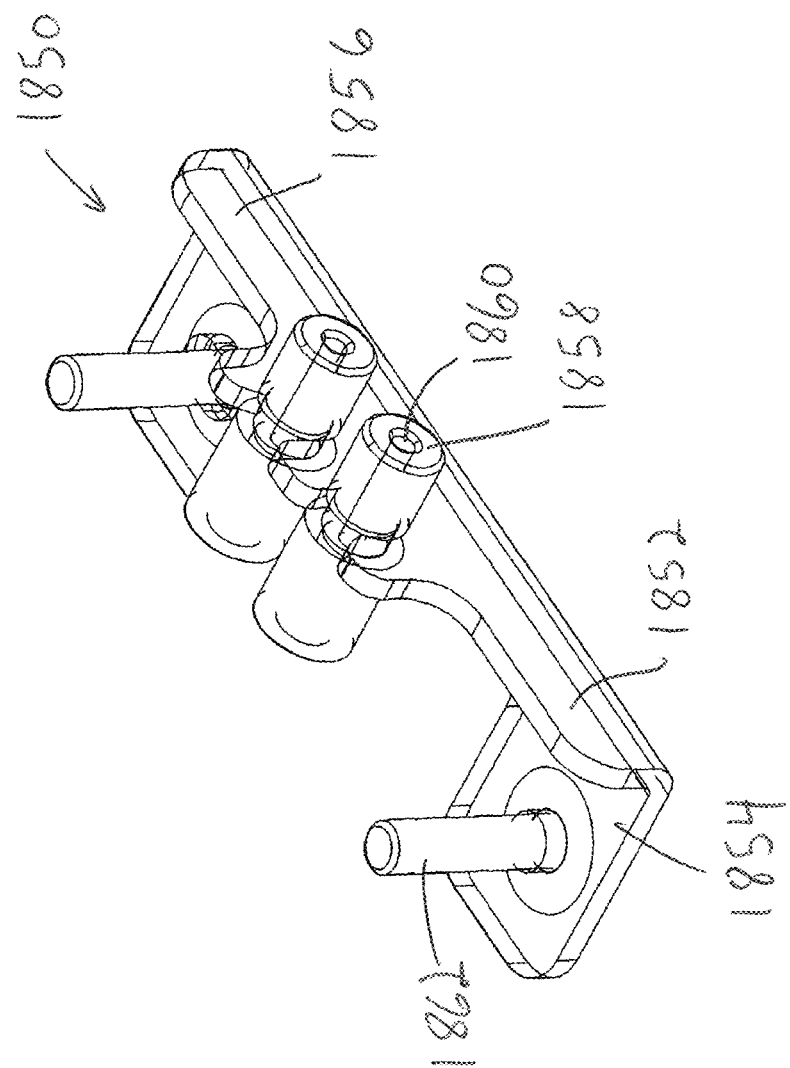
FIG. 62 is a perspective view of a latch cable routing apparatus having through openings that receive latch cables connected to the actuator of FIG. 59.

Regarding FIG. 62, the upper sleeper bunk 1800 includes a cable router 1850 including a bracket 1852 with one or more base portions 1854 and a holder portion 1856. The holder portion 1856 supports one or more sleeves 1858 with through openings 1860. The through openings 1860 receive latch cables of the latch system 1804. In one embodiment, one or more cable routers 1850 are mounted to the center exterior panel 1814 via one or more fasteners 1862 that connect to bosses of the center exterior panel 1814.

Figure 63:
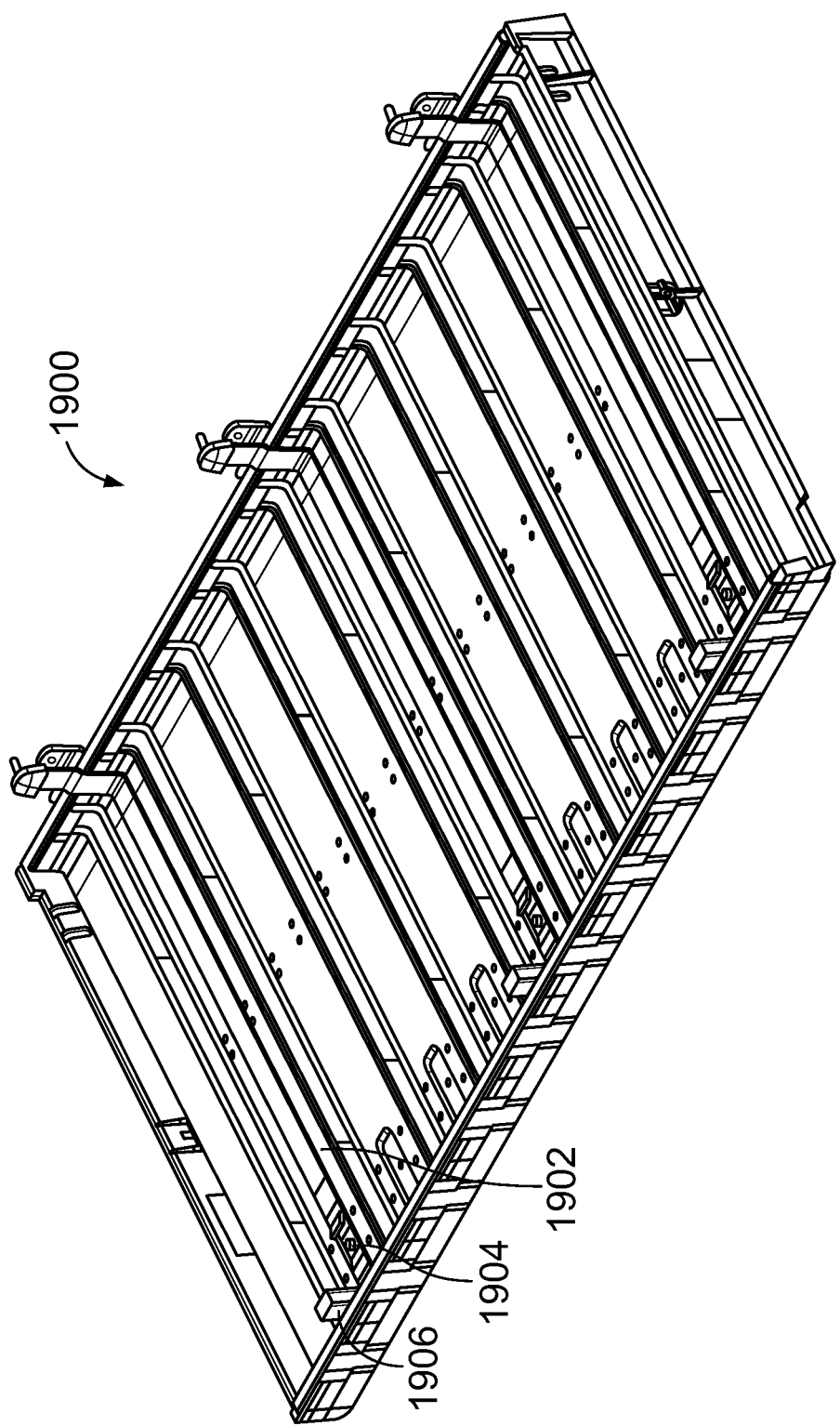
FIG. 63 is a top perspective view of a lower sleeper bunk.
Figure 64:
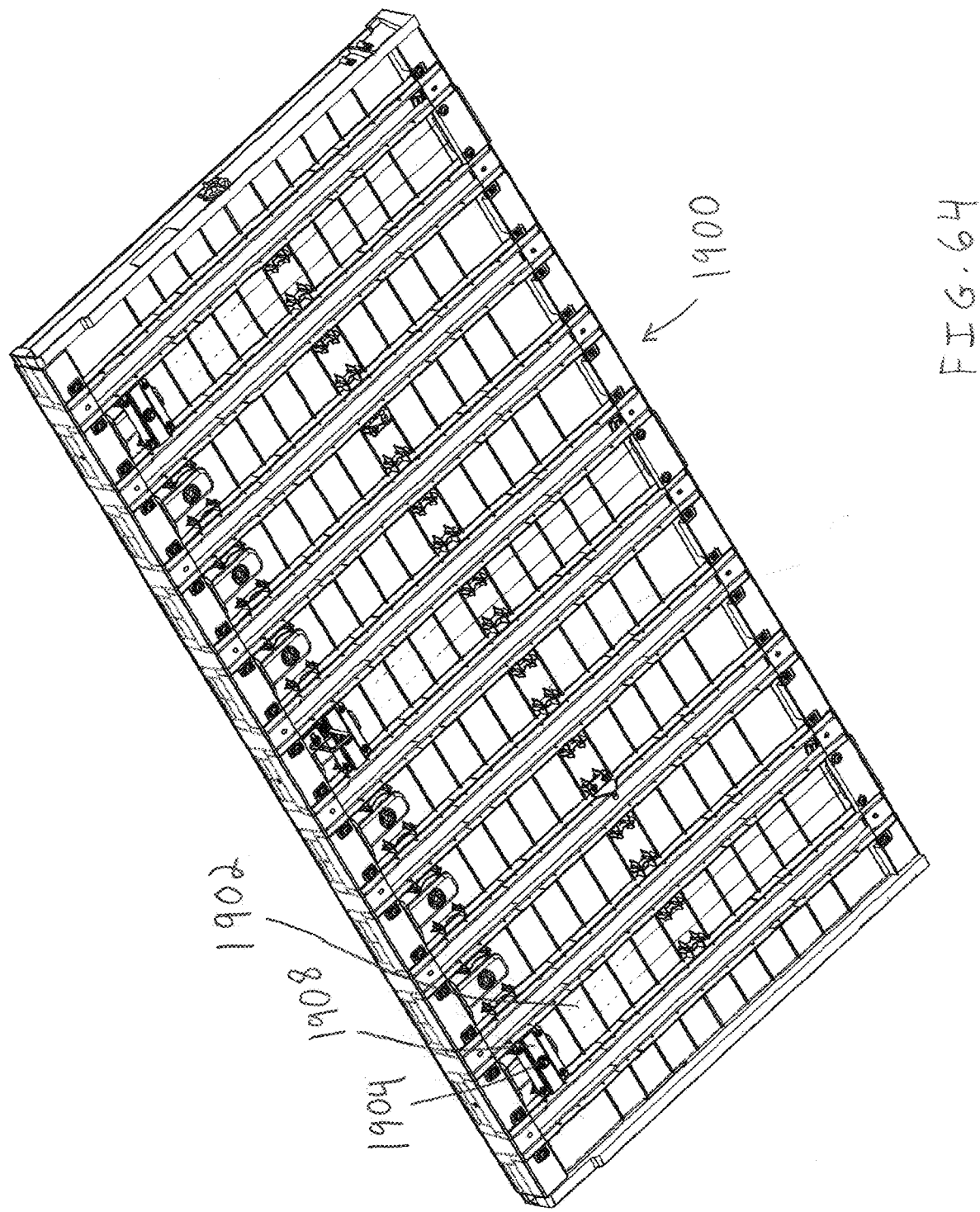
FIG. 64 is a bottom perspective view of the lower sleeper bunk of FIG. 63 showing three safety restraint brackets secured to the undersides of three different intermediate support members of the lower sleeper bunk.

Turning to FIGS. 63 and 64, a lower sleeper bunk 1900 is provided that is similar in many respects to the sleeper bunks discussed above such that difference will be highlighted. The lower sleeper bunk 1900 includes intermediate support members 1902 and anchors 1904 that secure buckles 1906 to the intermediate support members 1902. The lower sleeper bunk 1900 includes three separate safety restraint brackets 1908 secured to the undersides of three respective intermediate support members 1902. The anchors 1904 are each secured to one of the safety restraint brackets 1908.

Figure 65:
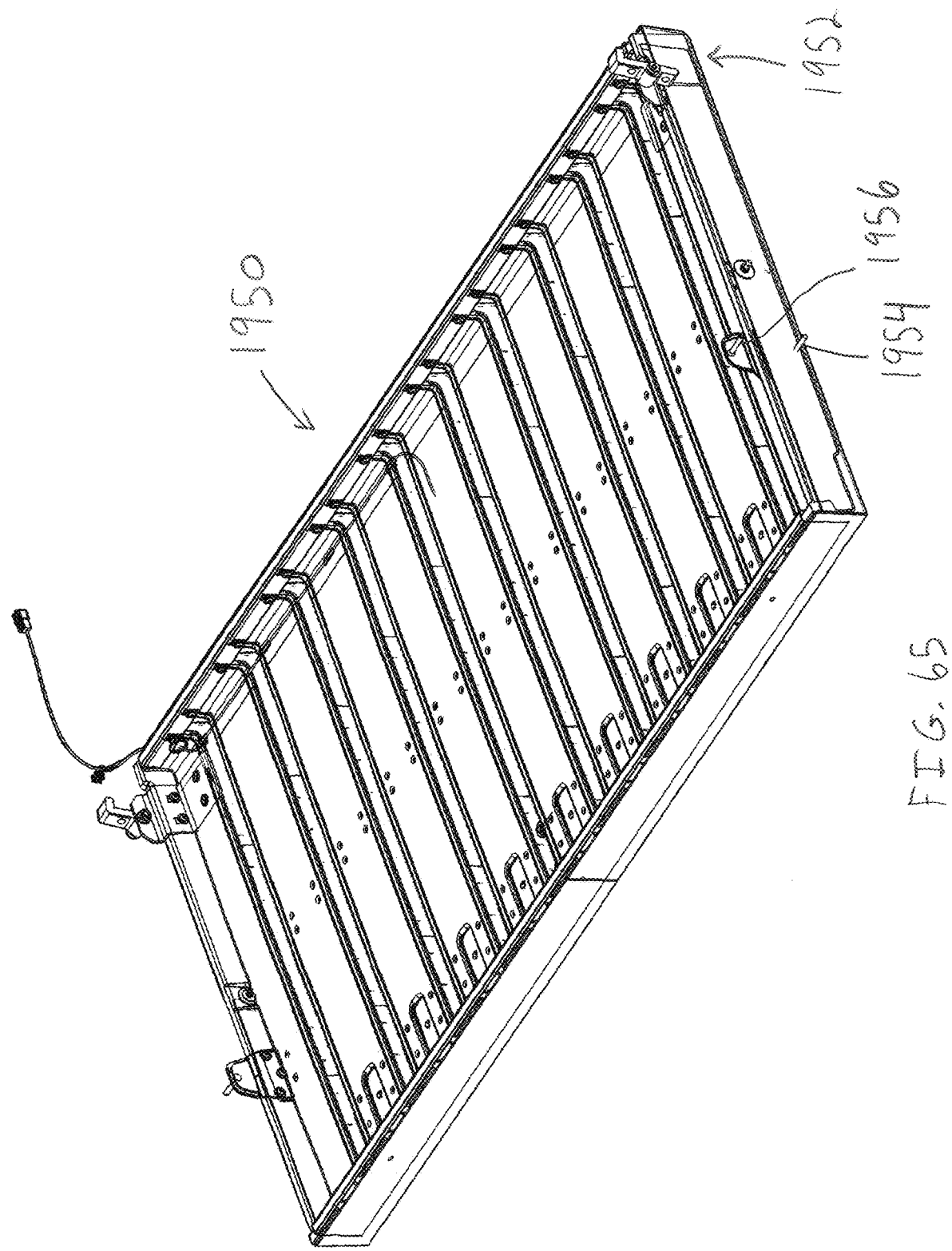
FIG. 65 is a top perspective view of a lower sleeper bunk.
Figure 66:
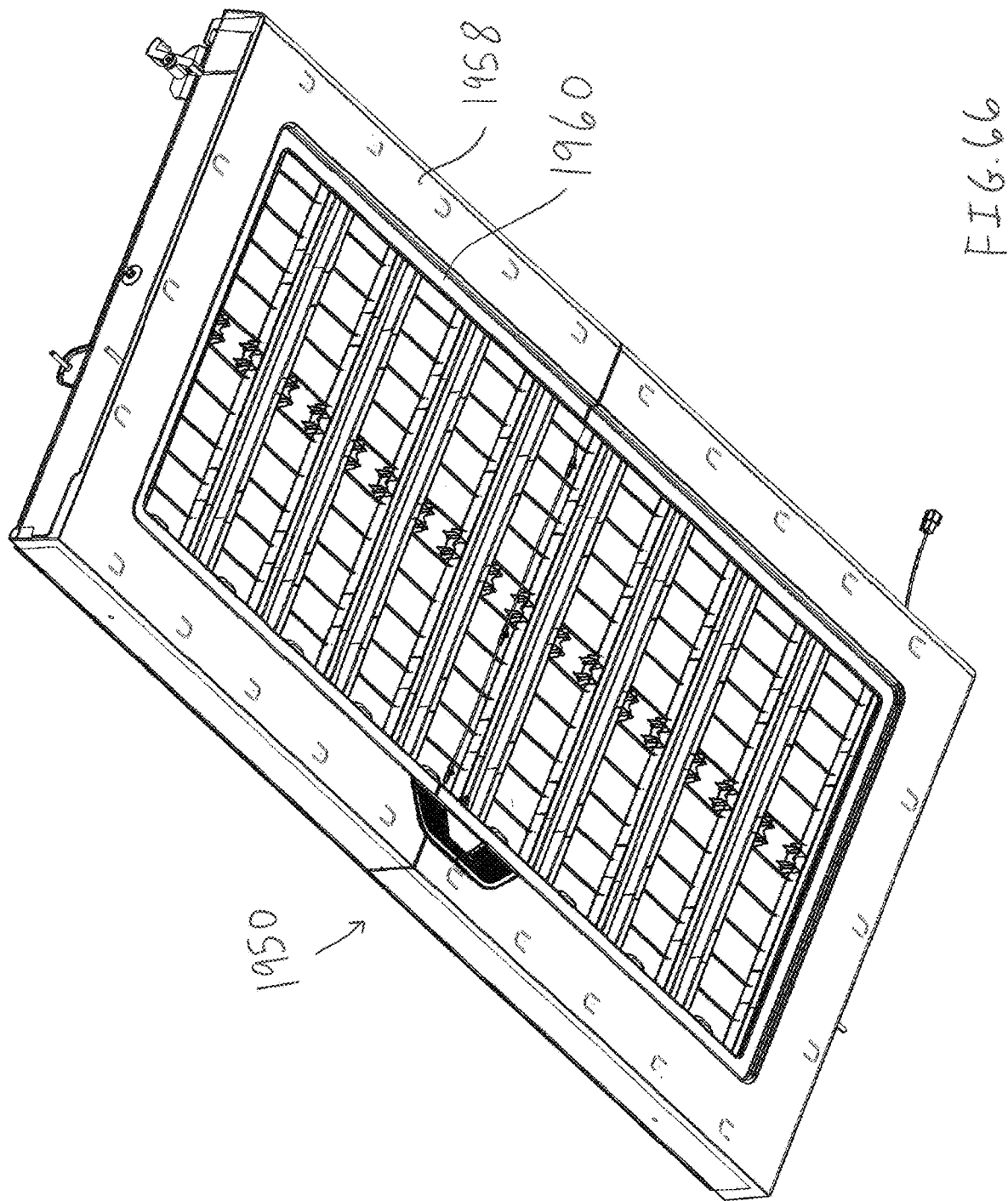
FIG. 66 is a bottom perspective view of the lower sleeper bunk of FIG. 65 showing an opening in a lower exterior panel that may be closed with a branded trim piece.

Regarding FIGS. 65 and 66, a lower sleeper bunk 1950 is provided that is similar in many respects to the sleeper bunks discussed above such that differences will be highlighted. The sleeper bunk 1950 includes hinges 1952 that permit the sleeper bunk 1950 to move from a horizontal open position to a vertical closed position. The lower sleeper bunk 1950 further includes a pair of strikers or latch members 1954, 1956. One of the latch members 1954 is engaged by a latch of the vehicle when the lower sleeper bunk 1950 is in the horizontal position and the other latch member 1954 is engaged by a latch of the vehicle when the lower sleeper bunk 1950 is in the vertical position.

Regarding FIG. 66, the lower sleeper bunk 1950 includes one or more exterior panels 1958 that form an opening 1960 therein. The opening 1960 may remain open, or a vehicle manufacturer may install a trim piece with the manufacturer's logo (as an example) to close the opening 1960.

Figure 67:
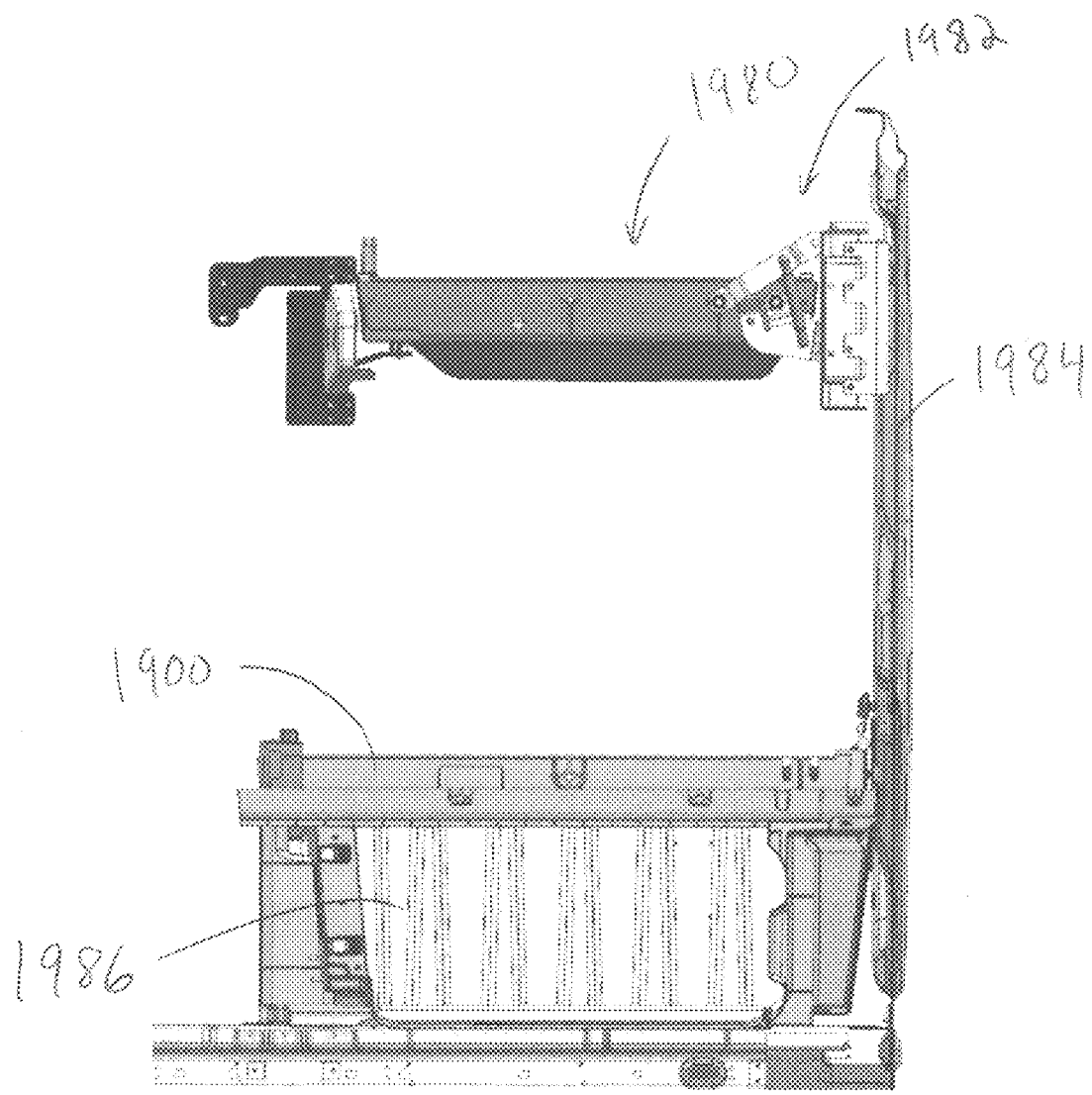
FIG. 67 is a side elevational view of an upper sleeper bunk and the lower sleeper bunk of FIG. 63 in horizontal orientations.
Figure 68:
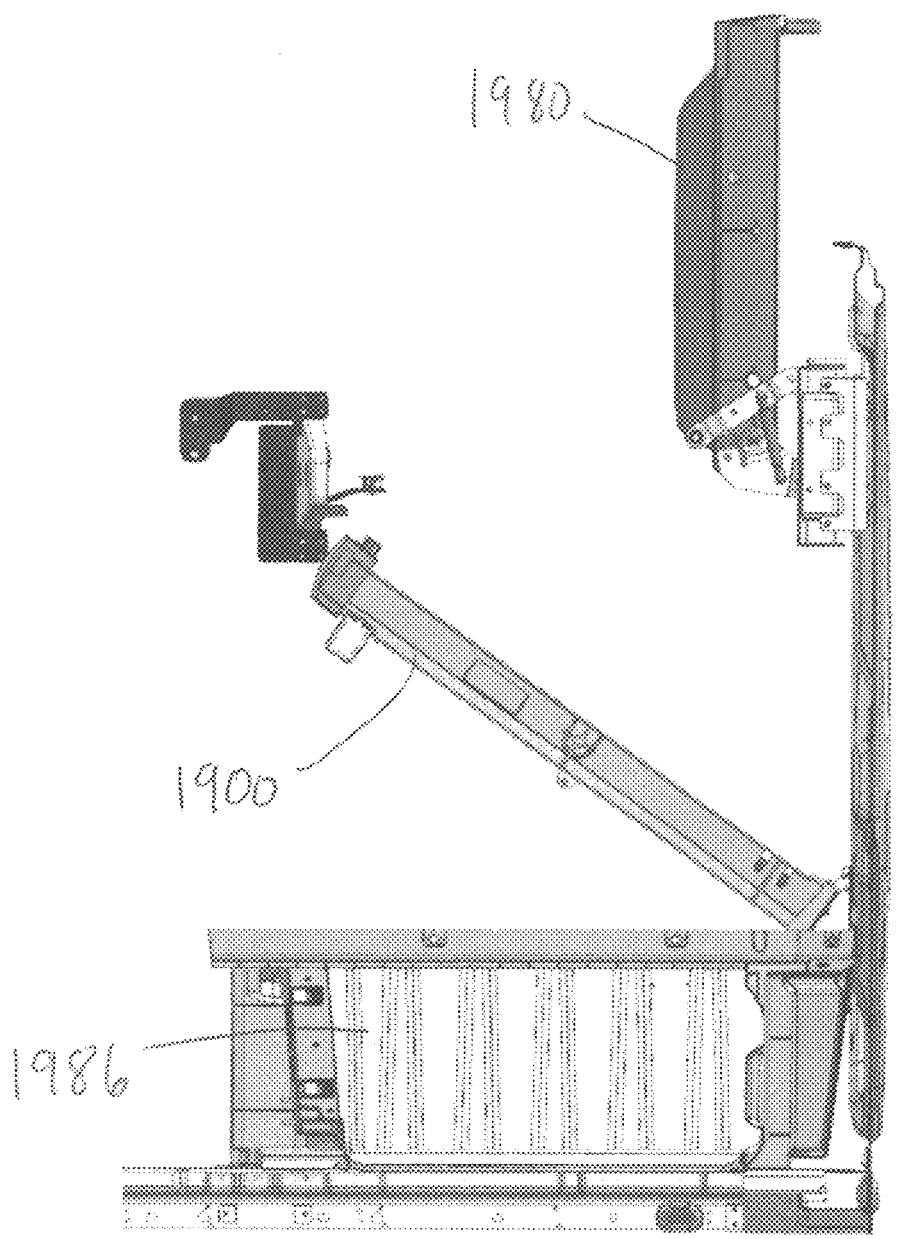
FIG. 68 is a side elevational view similar to FIG. 67 showing the upper sleeper bunk in a raised, vertical orientation and the lower sleeper bunk in a raised orientation.

With reference to FIG. 67, a portion of a sleeper area of a vehicle is shown that includes an upper sleeper bunk 1980 having a mount 1982 that connects the upper sleeper bunk 1980 to a structure such as a wall 1984 of the vehicle. The sleeper area further includes the lower sleeper bunk 1900 mounted to the wall 1984 and covering a bulkhead 1986. The upper sleeper bunk 1980 and lower sleeper bunk 1900 are shown in horizontal, open positions. In FIG. 69, the lower sleeper bunk 1900 has been moved to a raised position to permit access to the bulkhead 1986. The upper sleeper bunk 1980 has been moved to a vertical closed position.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

Terms of orientation such as vertical, horizontal, etc. are intended to refer to the relative orientation of a component rather than an absolute position, e.g., with reference to the earth. Further, the term substantially is intended to encompass values+/−10%, such as +/−5%, of a given value.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A sleeper bunk system comprising:
   a support of a first material for supporting a mattress;
   at least one mount configured to pivotally connect the support to a vehicle surface, the at least one mount facilitating pivoting of the support between an upper orientation and a lower orientation;
   the support including an assembly of support portions side-by-side one another in a first direction, the support portions connected together to resist a load from the mattress in a second direction transverse to the first direction with the support in the lower orientation;
   at least one frame member of a second material different than the first material, the frame member connected to the support portions and resisting relative movement of the support portions; and
   wherein the support portions include overlapping portions that overlap in the second direction.

2. The sleeper bunk system of claim 1 wherein the at least one frame member includes a pair of frame members connected to the support portions at locations that are spaced apart from one another.

3. The sleeper bunk system of claim 1 wherein the support is elongated along an axis and has an axial length sized to receive the mattress; and
   wherein the frame member extends axially along the support portions.

4. The sleeper bunk system of claim 3 wherein the at least one frame member includes a pair of frame members on opposite sides of the support.

5. The sleeper bunk system of claim 1 wherein the support portions form at least one lap joint therebetween.

6. The sleeper bunk system of claim 1 wherein the support portions include walls extending transverse to the first direction and arranged to abut to limit relative movement of the support portions.

7. The sleeper bunk system of claim 1 wherein the first material is a plastic material and the second material is a metallic material.

8. The sleeper bunk system of claim 1 wherein the support portions each include lattice members and vertices connecting the lattice members; and
   wherein the vertices include openings and annular walls extending about the openings.

9. The sleeper bunk system of claim 1 wherein the frame member is elongated and has a length; and
   wherein the length of the frame member is parallel to the first direction such that the support portions are side-by-side one another along the length of the frame member.

10. The sleeper bunk system of claim 1 wherein the frame member is elongated and has a length; and
    wherein the support portions are secured to the frame member at spaced apart locations along the length of the frame member.

11. The sleeper bunk of claim 1 wherein the support portions each have a unitary, one-piece construction and are made of plastic.

12. The sleeper bunk system of claim 1 wherein the frame member includes a lower wall portion having an upper surface to support lower surfaces of the support portions;
    wherein the frame member includes an upper wall portion;
    wherein the frame member includes an intermediate wall portion connecting the lower wall portion and the upper wall portion; and
    wherein the intermediate wall portion extends transverse to the lower wall portion.

13. The sleeper bunk of claim 1 wherein the support portions include mating projections and recesses to transfer loading between the support portions.

14. The sleeper bunk system of claim 1 further comprising at least one latch to contact a striker and an actuator operable to shift the latch between engaged and disengaged positions.

15. The sleeper bunk system of claim 1 further comprising:
    the mattress; and
    a mattress base having a lower surface and an upper surface opposite the lower surface;
    wherein the mattress base lower surface is supported on upper surfaces of the support portions; and
    wherein the mattress is supported on the mattress base upper surface.

16. The sleeper bunk of claim 1 wherein the first and second directions are perpendicular to one another.

17. The sleeper bunk of claim 1 wherein at least one of the support portions includes a through opening, the sleeper bunk further comprising:
- at least one latch to contact a striker;
- an actuator;
- a cable operatively connected to the at least one latch and the actuator, the cable extending in the through opening of the at least one of the support portions; and
- wherein the actuator is operable to shift the latch between engaged and disengaged positions via the cable.

18. The sleeper bunk of claim 1 wherein the support portions are injection molded plastic parts.

19. The sleeper bunk of claim 1 further comprising one or more storage compartments mounted to an underside of the support portions.

20. The sleeper bunk of claim 1 further comprising a ladder pivotally mounted to the frame member.

21. A sleeper bunk comprising:
- a support of a first material for supporting a mattress;
- at least one mount configured to pivotally connect the support to a vehicle surface, the at least one mount facilitating pivoting of the support between an upper orientation and a lower orientation;
- the support including an assembly of support portions side-by-side one another in a first direction, the support portions connected together to resist a load from the mattress in a second direction transverse to the first direction with the support in the lower orientation;
- at least one frame member of a second material different than the first material, the frame member connected to the support portions and resisting relative movement of the support portions;
- wherein the at least one frame member comprises a first elongate frame member and a second elongate frame member;
- wherein the support portions each include a base portion, a front wall portion upstanding from the base portion, and a rear wall portion upstanding from the base portion; and
- wherein the front wall portion is secured to the first elongate frame member and the rear wall portion is secured to the second elongate frame member.

22. The sleeper bunk of claim 21 wherein the first and second elongate frame members includes openings;
- wherein the front wall portions and rear wall portions of the support members include openings aligned with the openings of the first and second elongate frame members; and
- fasteners extending through the openings of the first and second elongate frame members and the openings of the front wall portions and rear wall portions to secure the support portions to the first and second elongate frame members.

23. The sleeper bunk of claim 21 wherein the base portion of each support portion has an upper surface to support the mattress;
- wherein the first and second elongate frame members each include a lower wall portion to support lower surfaces of the base portions of the support portions and an intermediate wall extending transverse to the lower wall portion;
- wherein the base portions of the support members include lower openings;
- wherein the lower wall portions of the first and second elongate frame members include lower openings aligned with the lower openings of the support members; and
- fasteners extending through the lower openings of the first and second elongate frame members and the lower openings of the base portions of the support portions.

24. A sleeper bunk comprising:
- a support of a first material for supporting a mattress;
- at least one mount configured to pivotally connect the support to a vehicle surface, the at least one mount facilitating pivoting of the support between an upper orientation and a lower orientation;
- the support including an assembly of support portions side-by-side one another in a first direction, the support portions connected together to resist a load from the mattress in a second direction transverse to the first direction with the support in the lower orientation;
- at least one frame member of a second material different than the first material, the frame member connected to the support portions and resisting relative movement of the support portions;
- wherein the support portions include a first end support portion and a second end support portion;
- wherein each of the first end support portion and the second end support portion includes a base portion, a front wall portion upstanding from the base portion, a rear wall portion upstanding from the base portion, and a side wall portion connecting the front wall portion and the rear wall portion; and
- wherein the at least one mount comprises two mounts, each mount secured to the side wall portion of one of the first and second end support portions.

25. The sleeper bunk of claim 24 wherein the frame member has a plurality of first openings;
- wherein the front wall portion or the rear wall portion of the support portions have second openings; and
- fasteners extend through the first and second openings to connect the frame member and the support portions.

26. The sleeper bunk of claim 24 wherein the at least one frame member comprises a front frame member having front frame through openings and a rear frame member having rear frame through openings;
- wherein the front wall portions of the support portions have front wall openings and the rear wall portions of the support portions have rear wall openings; and
- front fasteners extend in the front frame through openings and the front wall openings to connect the front frame member and the front wall portions; and
- rear fasteners extend in the rear frame through openings and the rear wall openings to connect the rear frame member and the rear wall portions.

27. The sleeper bunk of claim 24 wherein the first and second directions are perpendicular to one another; and
- wherein the support portions overlap in the second direction.

28. A sleeper bunk comprising:
- a support of a first material for supporting a mattress;
- at least one mount configured to pivotally connect the support to a vehicle surface, the at least one mount facilitating pivoting of the support between an upper orientation and a lower orientation;
- the support including an assembly of support portions side-by-side one another in a first direction, the support portions connected together to resist a load from the mattress in a second direction transverse to the first direction with the support in the lower orientation;
- at least one frame member of a second material different than the first material, the frame member connected to the support portions and resisting relative movement of the support portions;

wherein the support portions include end support portions and at least one intermediate support portion intermediate the end support portions along the first direction; and wherein the end support portions each include a base portion, a front wall portion upstanding from the base portion, a rear wall portion upstanding from the base portion, and a side wall portion upstanding from the base portion and connecting the front wall portion and the rear wall portion.

29. The sleeper bunk of claim 28 wherein the frame member has a plurality of first openings;

wherein the front wall portion or the rear wall portion of the end support portions has second openings; and fasteners extend through the first and second openings to connect the frame member and the end support portions.

30. The sleeper bunk of claim 28 wherein the at least one frame member comprises a front frame member having front frame through openings and a rear frame member having rear frame through openings;

wherein the front wall portions of the end support portions have front wall openings and the rear wall portions of the end support portions have rear wall openings; and front fasteners extend in the front frame through openings and the front wall openings to connect the front frame member and the front wall portions; and rear fasteners extend in the rear frame through openings and the rear wall openings to connect the rear frame member and the rear wall portions.

31. The sleeper bunk of claim 28 wherein the first and second directions are perpendicular to one another; and wherein the support portions overlap in the second direction.

32. A sleeper bunk comprising:

a support of a first material for supporting a mattress;

at least one mount configured to pivotally connect the support to a vehicle surface, the at least one mount facilitating pivoting of the support between an upper orientation and a lower orientation;

the support including an assembly of support portions side-by-side one another in a first direction, the support portions connected together to resist a load from the mattress in a second direction transverse to the first direction with the support in the lower orientation;

at least one frame member of a second material different than the first material, the frame member connected to the support portions and resisting relative movement of the support portions; and wherein the support portions include a first support portion having a channel and a second support portion having a protrusion overlapping the channel in the second direction and extending in the channel to transfer loading between the first and second support portions.

33. The sleeper bunk of claim 32 wherein the first and second directions are perpendicular to one another.

34. The sleeper bunk of claim 32 wherein the at least one frame member comprises a pair of elongate frame members spaced apart from one another by a gap; and wherein the support portions span the gap between the elongate frame members.

35. The sleeper bunk of claim 32 wherein the at least one frame member has a plurality of first openings;

wherein the support portions have second openings; and fasteners extend through the first and second openings to connect the frame member and the support portions.

36. The sleeper bunk of claim 32 wherein the at least one frame member comprises a pair of elongate frame members each having a plurality of openings, the sleeper bunk further comprising:

fasteners extending in the openings of the elongate frame members and connecting the elongate frame members and the support portions.

37. The sleeper bunk of claim 32 wherein the first material is plastic; and wherein the at least one frame member comprises an elongate metallic rail.

38. The sleeper bunk of claim 32 further comprising one or more exterior panels secured to an underside of the support.

* * * * *